(12) United States Patent
Yamazaki

(10) Patent No.: US 8,646,869 B2
(45) Date of Patent: Feb. 11, 2014

(54) RECORDING POSITION ERROR MEASUREMENT APPARATUS AND METHOD, IMAGE FORMING APPARATUS AND METHOD, AND COMPUTER-READABLE MEDIUM

(75) Inventor: Yoshirou Yamazaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 125 days.

(21) Appl. No.: 13/432,214

(22) Filed: Mar. 28, 2012

(65) Prior Publication Data

US 2012/0250040 A1 Oct. 4, 2012

(30) Foreign Application Priority Data

Mar. 29, 2011 (JP) ................................. 2011-072574

(51) Int. Cl.
*B41J 29/393* (2006.01)
(52) U.S. Cl.
USPC .......................................................... 347/19
(58) Field of Classification Search
USPC .................. 347/15, 19; 358/1.2, 1.9
See application file for complete search history.

(56) References Cited

U.S. PATENT DOCUMENTS

| | | | |
|---|---|---|---|
| 6,491,373 B1 * | 12/2002 | Fujita et al. ................ | 347/41 |
| 6,598,953 B2 * | 7/2003 | Bland ........................... | 347/19 |
| 6,739,699 B1 * | 5/2004 | Sender et al. .................. | 347/43 |
| 7,726,760 B2 | 6/2010 | Ikefuji et al. | |

FOREIGN PATENT DOCUMENTS

| | | |
|---|---|---|
| JP | 2004-9474 A | 1/2004 |
| JP | 2006-69027 A | 3/2006 |
| JP | 2007-54970 A | 3/2007 |

* cited by examiner

*Primary Examiner* — Lamson Nguyen
(74) *Attorney, Agent, or Firm* — Birch, Stewart, Kolasch & Birch, LLP

(57) ABSTRACT

A recording position error measurement apparatus includes a read image signal acquisition device and a signal processing device having: a dividing device which divides pixel series of the read image signal into sequences having different remainder values so as to generate image signals of the respective sequences; a prediction signal generation device which calculates regular prediction signals which are predicted with respect to the respective sequences, according to the read image signal; a threshold value determination device which determines tone value differences corresponding to respective distances representing recording position errors from the prediction signals, and which determines threshold values corresponding respectively to the recording position errors, from the tone value differences; a change signal calculation device which calculates a change signal indicating a difference between the prediction signal and the image signal of each of the sequences; and an error distance calculation device which specifies the recording position errors of the plurality of recording elements in the recording head according to comparing the change signal with each of the threshold values.

12 Claims, 51 Drawing Sheets

APPROX. 53.2 μm   APPROX. 15 μm

RECORDING POSITION ERROR MEASUREMENT APPARATUS AND METHOD, IMAGE FORMING APPARATUS AND METHOD, AND COMPUTER-READABLE MEDIUM

BACKGROUND OF THE INVENTION

1. Field of the Invention

The present invention relates to a detecting technique for measuring recording position error from a test pattern recording result recorded with a recording head (for example, an inkjet head) having a plurality of recording elements, and an image forming technique to which the detecting technique is applied.

2. Description of the Related Art

Methods of recording an image on a recording medium such as a recording paper include an inkjet drawing system in which ink drops are ejected from a recording head in accordance with an image signal and the ink drops are deposited on the recording medium. An example of an image drawing apparatus using such an inkjet drawing system is a full-line head image rendering apparatus in which an ejecting unit (a plurality of nozzles) that ejects ink drops is linearly disposed to correspond to an entire area of one side of a recording medium, and the recording medium is conveyed in a direction perpendicular to the ejecting unit in order to enable an image to be recorded on an entire area of the recording medium. Since a full-line head image rendering apparatus is capable of rendering an image on an entire area of a recording medium by conveying the recording medium without moving an ejecting unit, the full-line head image rendering apparatus is suitable for increasing recording speed.

However, with a full-line head image rendering apparatus, a deviation of an actual dot position that is recorded on a recording medium from an ideal dot position due to various reasons such as production variation, deterioration with age, or the like of recording elements (nozzles) constituting an ejecting unit may cause a recording position error (deposited position error). As a result, a problem that streaky artifacts occur in an image recorded on the recording medium arises. In addition to artifacts due to such a recording position error, there are phenomena in which streaky artifacts occur in a recorded image on the recording medium due to failures in a recording element such as an abnormality in which droplets are not ejected (non-ejection), an abnormality in volume of ejected droplets, and an abnormality in shape of ejected droplets (splash). Such recording elements which cause a decline in recording quality are collectively referred to as "defective ejection nozzles" or "defective recording elements".

A length of a full-line recording head is equivalent to a width of a recording paper. For example, when recording resolution is 1200 DPI, an apparatus that can deal with a recording paper having a paper width similar to that of half Kiku size (636 mm by 469 mm) has approximately 30,000 nozzles/ink as the recoding elements. In such a large number of recording elements, defective ejection nozzles may occur at various timings. More specifically, a nozzle may become defective at the time of manufacture of a recording head, a nozzle may become defective due to deterioration with age, a nozzle may become defective during maintenance (in case of maintenance-induced, the nozzle is often restored to a normal nozzle by a next maintenance), and a recording element may become a defective ejection nozzle midway through continuous printing.

A technique is known in which, when a defective ejection nozzle occurs, usage of the defective ejection nozzle is suspended (ejection suspension) and then other surrounding nozzles (nozzles capable of normal ejection) are used in order to correct an image. Applying the correction technique, it is important that a defective ejection nozzle is accurately identified.

As techniques for identifying a defective ejection nozzle, Japanese Patent Application Publication No. 2004-009474, Japanese Patent Application Publication No. 2006-069027, and Japanese Patent Application Publication No. 2007-054970 describe methods of identifying a defective ejection nozzle by printing a predetermined test pattern aimed at detection of a defective ejection nozzle, reading a printing result with an image reading apparatus, and analyzing obtained read image data.

Japanese Patent Application Publication No. 2004-009474 discloses technology using a so-called 1-on N-off detection test pattern. A reading apparatus (scanner) has a resolution equal to or greater than the printing resolution and detects non-ejecting nozzles by binarizing the read result.

Furthermore, Japanese Patent Application Publication No. 2006-069027 discloses technology which detects a defective nozzle position on the basis of an average value of read results of one row which is under consideration in a test pattern, and an average value of read results of m rows of the left and right from the row under consideration. Here, it is desirable that the reading resolution of the image reading unit should be n times the resolution of the line head (where n is a natural number not less than 2).

However, Japanese Patent Application Publication No. 2004-009474 and Japanese Patent Application Publication No. 2006-069027 do not disclose detection technology which addresses the issue of using a reading apparatus having a lower resolution than the print resolution of the line head.

In respect of this issue, Japanese Patent Application Publication No. 2007-054970 discloses technology for detecting defective nozzles by using a scanner which reads at a lower resolution than the resolution of a recording head and applying interpolation processing to the read data.

However, in the technology disclosed in Japanese Patent Application Publication No. 2007-054970, under conditions where the line width formed by dots on a test pattern does not satisfy the sampling theorem, the line position retains a certain amount of error (estimated error in the line profile formed by the dots), and thus there is a possibility that accuracy of the detection cannot be achieved to the high point.

SUMMARY OF THE INVENTION

In light of these circumstances, the present invention has been derived for an object of providing a recording position error measurement apparatus and method whereby recording position errors of recording elements in a recording head can be measured accurately, even if using a reading apparatus having a resolution lower than the recording resolution. A further object of the present invention is to provide an image forming apparatus and method, and a program, which are based on this measurement method.

One aspect of the invention is directed to a recording position error measurement apparatus, comprising: a read image signal acquisition device which acquires a read image signal of a test pattern recorded on a recording medium by a plurality of recording elements while causing relative movement between the recording medium and a recording head in which the plurality of recording elements are arranged; and a signal processing device which carries out processing for analyzing the read image signal so as to identify recording position errors of the plurality of recording elements, wherein: the test pattern includes line-shaped patterns which are recorded by operating the recording elements corresponding to projected recording elements selected at an interval of a fixed detection pitch number PP, from among an alignment of projected recording elements obtained by projecting the plurality of recording elements of the recording head onto a straight line parallel to a first direction that is orthogonal to a direction of the relative movement; when an interval between the projected recording elements aligned in the first direction is represented by a recording pixel pitch WP, a pixel size in the first direction of read image data acquired by the read image signal acquisition device is represented by a read pixel pitch WS, and a group of a plurality of read pixels aligned continuously in the first direction which forms an analysis unit for analyzing the read image signal is represented by an analysis pitch number PS, then a period T determined by $T=WP\times PP \div |WS \times PS - WP \times PP|$ is three or greater in units of pixels of the read image signal; and the signal processing device has: a dividing device which divides pixel series of the read image signal into sequences having different remainder values so as to generate image signals of the respective sequences, the remainder values being obtained respectively by dividing read pixel numbers by the analysis pitch number PS, the read pixel numbers being respectively assigned as consecutive integers, in alignment sequence, to pixels which are aligned in the first direction with respect to the acquired read image signal; a prediction signal generation device which calculates regular prediction signals which are predicted with respect to the respective sequences, according to the read image signal; a threshold value determination device which determines tone value differences corresponding to respective distances representing recording position errors from the prediction signals, and which determines threshold values corresponding respectively to the recording position errors, from the tone value differences; a change signal calculation device which calculates a change signal indicating a difference between the prediction signal and the image signal of each of the sequences; and an error distance calculation device which specifies the recording position errors of the plurality of recording elements in the recording head according to comparing the change signal with each of the threshold values.

Another aspect of the invention is directed to a recording position error measurement method, comprising: a read image signal acquisition step of acquiring a read image signal of a test pattern recorded on a recording medium by a plurality of recording elements while causing relative movement between the recording medium and a recording head in which the plurality of recording elements are arranged; and a signal processing step of carrying out processing for analyzing the read image signal so as to identify recording position errors of the plurality of recording elements, wherein: to the test pattern includes line-shaped patterns which are recorded by operating the recording elements corresponding to projected recording elements selected at an interval of a fixed detection pitch number PP, from among an alignment of projected recording elements obtained by projecting the plurality of recording elements of the recording head onto a straight line parallel to a first direction that is orthogonal to a direction of the relative movement; when an interval between the projected recording elements aligned in the first direction is represented by a recording pixel pitch WP, a pixel size in the first direction of read image data is represented by a read pixel pitch WS, and a group of a plurality of read pixels aligned continuously in the first direction which forms an analysis unit for analyzing the read image signal is represented by an analysis pitch number PS, then a period T determined by $T=WP\times PP \div |WS\times PS-WP\times PP|$ is three or greater in units of pixels of the read image signal; and the signal processing step includes: a dividing step of dividing pixel series of the read image signal into sequences having different remainder values so as to generate image signals of the respective sequences, the remainder values being obtained respectively by dividing read pixel numbers by the analysis pitch number PS, the read pixel numbers being respectively assigned as consecutive integers, in alignment sequence, to pixels which are aligned in the first direction with respect to the acquired read image signal; a prediction signal generating step of calculating regular prediction signals which are predicted with respect to the respective sequences, according to the read image signal; a threshold value determination step of determining tone value differences corresponding to respective distances representing recording position errors from the prediction signals, and determining threshold values corresponding respectively to the recording position errors, from the tone value differences; a change signal calculation step of calculating a change signal indicating a difference between the prediction signal and the image signal of each of the sequences; and an error distance calculation step of specifying the recording position errors of the plurality of recording elements in the recording head according to comparing the change signal with each of the threshold values.

Another aspect of the invention is directed to an image forming apparatus, comprising: a recording head in which a plurality of recording elements are arranged; a medium conveyance device which causes relative movement between a recording medium and the recording head; a test pattern output control device which controls a recording operation of the recording head in such a manner that a test pattern is formed on the recording medium by the recording head; an image reading device which reads the test pattern recorded on the recording medium and generates a read image signal, wherein: the test pattern includes line-shaped patterns which are recorded by operating the recording elements corresponding to projected recording elements selected at an interval of a fixed detection pitch number PP, from among an alignment of projected recording elements obtained by projecting the plurality of recording elements of the recording head onto a straight line parallel to a first direction that is orthogonal to a direction of the relative movement; when an interval between the projected recording elements aligned in the first direction is represented by a recording pixel pitch WP, a pixel size in the first direction of read image data is represented by a read pixel pitch WS, and a group of a plurality of read pixels aligned continuously in the first direction which forms an analysis unit for analyzing the read image signal is represented by an analysis pitch number PS, then a period T determined by $T=WP\times PP \div |WS\times PS-WP\times PP|$ is three or greater in units of pixels of the read image signal; and the image forming apparatus further comprises: a dividing device which divides pixel series of the read image signal into sequences having different remainder values so as to generate image signals of the respective sequences, the remainder values being obtained respectively by dividing read pixel numbers by the analysis pitch number PS, the read pixel numbers being respectively assigned as consecutive integers, in alignment sequence, to pixels which are aligned in the first direction with respect to the acquired read image signal; a prediction signal generation device which calculates regular prediction signals which are predicted with respect to the respective sequences, according to the read image signal; a threshold value determination device which determines tone value differences corresponding to respective distances representing recording position errors from the prediction signals, and which determines threshold values corresponding respectively to the recording position errors, from the tone value differences; a change signal calculation device which calculates a change signal indicating a difference between the prediction signal and the image signal of each of the sequences; an error distance calculation device which specifies the recording position errors of the plurality of recording elements in the recording head according to comparing the change signal with each of the threshold values; an image correction device which corrects the image data according to information about the recording position errors specified by the error distance calculation device; and a recording control device which implements image recording by controlling a recording operation of the recording elements of the recording head in accordance with the image data which has been corrected by the image correction device.

Another aspect of the invention is directed to an image forming method of forming an image on a recording medium by a recording head while causing relative movement between the recording medium and the recording head in which a plurality of recording elements are arranged, the image forming method comprising: a test pattern output control step of controlling a recording operation of the recording head in such a manner that a test pattern is formed on the recording medium by the recording head; and an image reading step of reading the test pattern recorded on the recording medium and generating a read image signal, wherein: the test pattern includes line-shaped patterns which are recorded by operating the recording elements corresponding to projected recording elements selected at an interval of a fixed detection pitch number PP, from among an alignment of projected recording elements obtained by projecting the plurality of recording elements of the recording head onto a straight line parallel to a first direction that is orthogonal to a direction of the relative movement; when an interval between the projected recording elements aligned in the first direction is represented by a recording pixel pitch WP, a pixel size in the first direction of read image data is represented by a read pixel pitch WS, and a group of a plurality of read pixels aligned continuously in the first direction which forms an analysis unit for analyzing the read image signal is represented by an analysis pitch number PS, then a period T determined by T=WP×PP÷|WS×PS−WP×PP| is three or greater in units of pixels of the read image signal; and a dividing step of dividing pixel series of the read image signal into sequences having different remainder values so as to generate image signals of the respective sequences, the remainder values being obtained respectively by dividing read pixel numbers by the analysis pitch number PS, the read pixel numbers being respectively assigned as consecutive integers, in alignment sequence, to pixels which are aligned in the first direction with respect to the acquired read image signal; a prediction signal generating step of calculating regular prediction signals which are predicted with respect to the respective sequences, according to the read image signal; a threshold value determination step of determining tone value differences corresponding to respective distances representing recording position errors from the prediction signals, and determining threshold values corresponding respectively to the recording position errors, from the tone value differences; a change signal calculation step of calculating a change signal indicating a difference between the prediction signal and the image signal of each of the sequences; an error distance calculation step of specifying the recording position errors of the plurality of recording elements in the recording head according to comparing the change signal with each of the threshold values; an image correction step of correcting the image data according to information about the recording position errors specified in the error distance calculation step; and a recording control step of implementing image recording by controlling a recording operation of the recording elements of the recording head in accordance with the image data which has been corrected in the image correction step.

Another aspect of the invention is directed to a computer-readable medium containing programming instructions that cause a computer processor to perform the read image signal acquisition device and the signal processing device having the dividing device, the prediction signal generation device, the threshold value determination device, the change signal calculation device and the error distance calculation device of the recording position error measurement apparatus defined above.

Further modes of the present invention will be apparently indicated from the description of the present specification and the drawings.

According to the present invention, a prediction signal is calculated from a read image signal obtained by reading a test pattern, and the regularity (periodicity) of the line-shaped pattern is used to ascertain the relationship between the signal change and the error (distance) between the recording position and this prediction signal. Then respective threshold values are specified for each measurement distance. By this means, it is possible accurately to identify the recording position errors of recording elements, from a read image signal having a lower resolution than the recording resolution of the recording head.

Moreover, since the threshold values for judgment are specified on the basis of the prediction signal which is calculated from the read image signal, it is possible to achieve high-precision measurement having excellent robustness, which means that a measurement is not affected by the characteristics of the reading apparatus, the recording conditions of the test pattern, or the like.

BRIEF DESCRIPTION OF THE DRAWINGS

A preferred embodiment of this invention as well as other objects and benefits thereof, will be explained in the following with reference to the accompanying drawings, in which like reference characters designate the same or similar parts throughout the figures and wherein:

FIGS. 15A and 15B are charts showing the pitch difference and period for respective combinations of the detection pitch number and the analysis pitch number;

FIGS. 16A and 16B are charts showing the pitch difference and period for respective combinations of the detection pitch number and the analysis pitch number;

DETAILED DESCRIPTION OF THE PREFERRED EMBODIMENTS

Description of Depositing Position Error

Figure 1A:
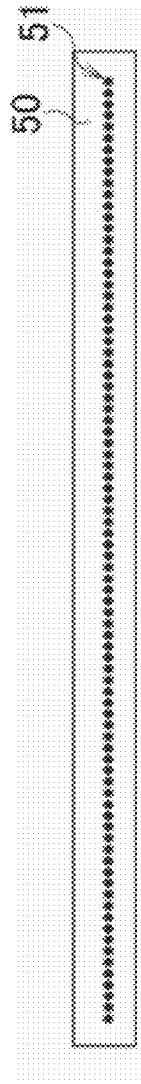
FIGS. 1A to 1C are diagrams showing schematic views of a state where depositing positions of ink droplets ejected from nozzles on a recording medium deviate from ideal depositing positions.
Figure 1B:
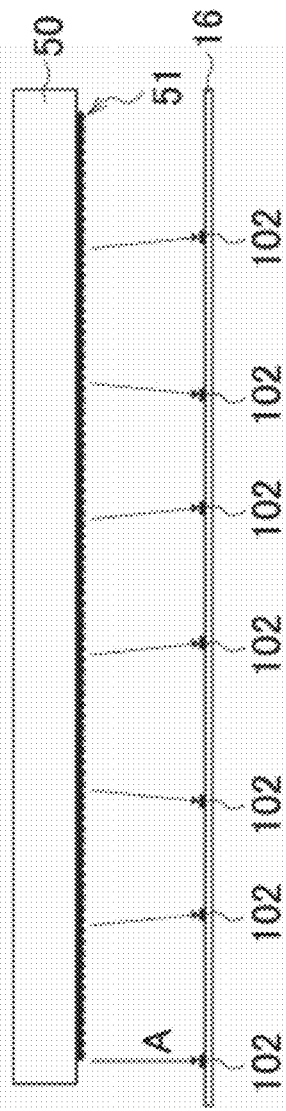
Figure 1C:
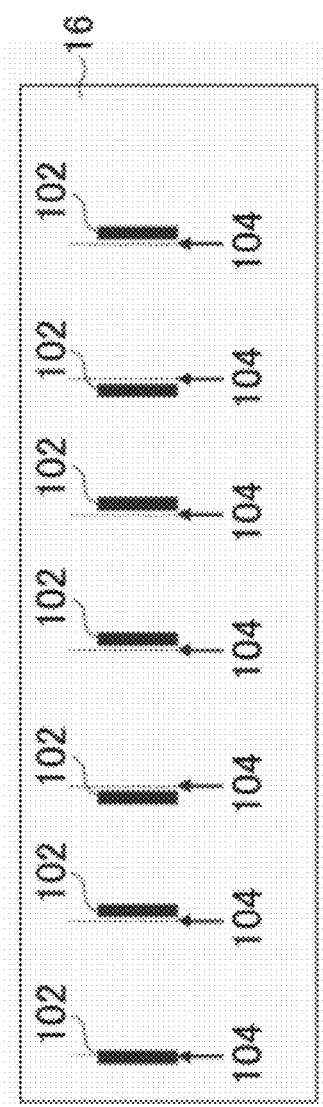

Firstly, error in the depositing position (recording position) will be described as one example of a defective ejection nozzle in an inkjet head. FIGS. 1A to 1C are diagrams showing schematic views of a state where the depositing positions on a recording medium of ink droplets ejected from nozzles have deviated from the ideal depositing positions. FIG. 1A is a plan diagram showing a line arrangement of a plurality of nozzles 51 in a head 50. FIG. 1B is a diagram showing a lateral view of a state where ink droplets are ejected from nozzles 51 toward recording paper (a recording medium) 16, and an approximate view of the ejection direction of the ink droplets from the nozzles 51 is depicted by the arrow A in FIG. 1B. Furthermore, FIG. 1C is a diagram showing a test pattern 102 formed on recording paper 16 by ink droplets ejected from nozzles 51, the ideal depositing positions (marked with reference numeral 104) being depicted by the dotted lines and the actual depositing positions (marked with reference numeral 102) being depicted by thick blank lines.

In FIGS. 1A and 1B, in order to simplify the drawings, a head 50 in which a plurality of nozzles 51 are aligned in one row is depicted, but the present invention can of course also be applied to a matrix head in which a plurality of nozzles are arranged in a two-dimensional configuration. In other words, by considering the effective nozzle row obtained by projecting a nozzle group in a two-dimensional arrangement to a straight line in a direction perpendicular to a direction of relative movement of the head and the recording medium, it is possible to treat the nozzle configuration effectively as being equivalent to a single nozzle row. For example, if the conveyance direction of the recording paper with respect to a line head corresponds to the "direction of relative movement", and this paper conveyance direction is taken as the "sub-scanning direction", then the paper width direction which is perpendicular to the sub-scanning direction is a "main scanning direction", and a nozzle row (projected nozzle row) obtained by orthogonal projection to a straight line parallel to the main scanning direction can be treated effectively as one nozzle row.

As shown in FIGS. 1A to 1C, the plurality of nozzles 51 in the head 50 include normal nozzles which display normal ejection characteristics and defective ejection nozzles of which the path of flight of the ejected ink droplets diverges excessively from the intended path. The line-shaped dot patterns (test patterns) 102 formed by the ink droplets ejected from the defective ejection nozzles and deposited on the recording paper 16 deviate from the ideal depositing positions 104, and thus cause deterioration in image quality.

In an inkjet recording apparatus (image forming apparatus) based on a single-pass recording method which is a high-speed recording technology, the number of nozzles corresponding to the width of the recording paper 16 is several tens of thousands per inch, and in the case of full-color recording, recording elements are also provided for each of the ink colors (for example, for the four colors of cyan, magenta, yellow and black).

In an image forming apparatus based on a single-pass recording method which is equipped with a large number of recording elements in this way, technology for accurately detecting defective recording elements (defective ejection nozzles) and technology for measuring the recording position error of the recording elements (depositing position error of the ejected droplets) is disclosed.

Example of Detection Test Pattern

Figure 2:
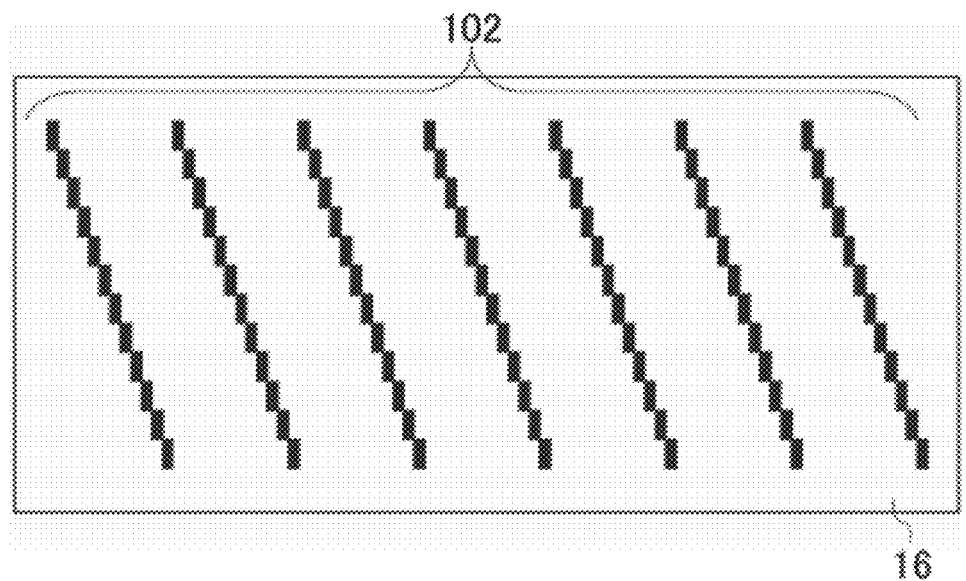
FIG. 2 is a diagram showing the basic shape of a test pattern recorded on recording paper.

FIG. 2 is a diagram showing the basic form of a pattern which is recorded on recording paper (recording medium) in order to detect defective ejection nozzles (hereinafter, called a "test pattern" or a "detection pattern").

The basic portion of the line-shaped test patterns 102 is created on the recording paper 16 by conveying the recording paper 16 with respect to the recording head and selecting and driving the plurality of nozzles of the recording head situated at a prescribed interval apart. In other words, the line-shaped test patterns 102 are formed by ejecting ink droplets from respective nozzle blocks each constituted by a group of nozzles situated at prescribed intervals apart, of the plurality of nozzles of the recording head, and the test patterns 102 are formed in zigzag style (staggered style) as shown in FIG. 2 by successively changing the nozzle block which ejects the ink droplets while conveying the recording paper 16.

The test patterns 102 shown in FIG. 2 are so-called "1-on n-off" type line patterns (n denotes natural numbers). In one line head, if nozzle numbers are assigned in order from the end in the paper width direction (x direction) to the sequence of nozzles which constitute a nozzle row aligned effectively in one row following the x direction (the effective nozzle row obtained by orthogonal reflection), then the nozzle groups which perform ejection simultaneously are divided up on the basis of the remainder "B" produced when the nozzle number is divided by an integer "A" of not less than 2 (B=0, 1, . . . A−1), and a 1-on n-off type of line pattern such as that shown in FIG. 2 is obtained by forming line groups produced by continuous droplet ejection from respective nozzles while altering the droplet ejection timing for each group of nozzle numbers: AN+0, AN+1, . . . , AN+B (where N is an integer not less than 0).

In other words, line-shaped patterns are formed by performing ejection from one nozzle of (n+1) nozzles aligned consecutively in the effective nozzle row obtained by orthogonal projection of the nozzles to an alignment in the x direction, and setting the other n number of nozzles not to be driven.

FIG. 2 is an example of a "1-on 11-off" pattern (A=12, B=0 to 11). Here, an example where A=12 is shown, but in general, the formula AN+B (B=0, 1, . . . , A−1) can be applied, where A is an integer not less than 2.

By using a 1-on n-off test pattern of this kind, there is no overlap between mutually adjacent lines within each line block, and it is possible respectively to form independent lines (for each nozzle) which can be distinguished from the other nozzles. Since the lines which constitute the test patterns 102 correspond to ejection of ink from respective nozzles, then by judging whether or not each respective line is formed appropriately, it is possible to detect whether or not ink droplets have been ejected appropriately from the corresponding nozzles.

In addition, except the line pattern of a so-called "1-on, n-off" type described above, the test pattern may also include other pattern elements, such as other line blocks (for example, a block for confirming relative positional error between line blocks) or horizontal lines (dividing lines) which divide between the line blocks, reference position determination lines, and the like.

Figure 3:
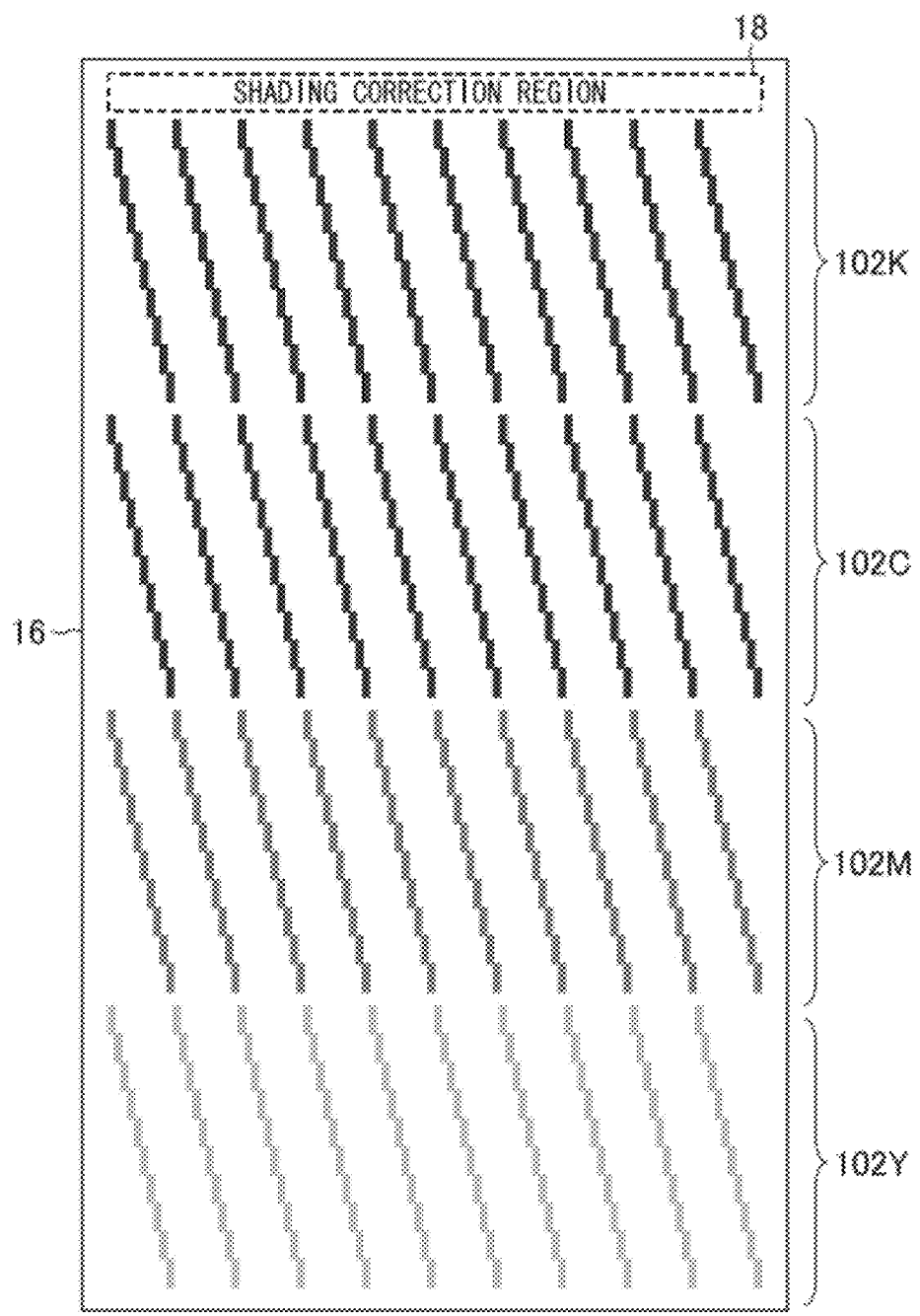
FIG. 3 is a diagram showing one concrete example of a test pattern.

FIG. 3 is a diagram showing a practical example of test patterns for detecting defective ejection nozzles. Here, 1-on n-off type patterns are formed by nozzles of all of the colors, using an inkjet printer including recording heads corresponding respectively to four ink colors, namely, cyan (C), magenta (M), yellow (Y) and black (K).

A shading correction region 18 is provided in the leading end portion of the recording paper 16. The shading correction region 18 is a non-printing region for acquiring data for shading correction by reading in a blank margin of the recording paper 16. Following the shading correction region 18 are formed a test pattern 102K by K ink, a test pattern 102C by C ink, a test pattern 102M by M ink and a test pattern 102Y by Y ink.

In this way, a shading correction region 18 is provided on the recording paper 16, and a plurality of patterns formed by inks of respective colors used by the inkjet recording apparatus (here, C, M, Y, K) are provided on the paper. As shown in the example in FIG. 3, it is possible to form patterns for all four colors on one sheet of paper, or to form the patterns over a plurality of sheets of paper.

Test Pattern Read Image

Figure 4:
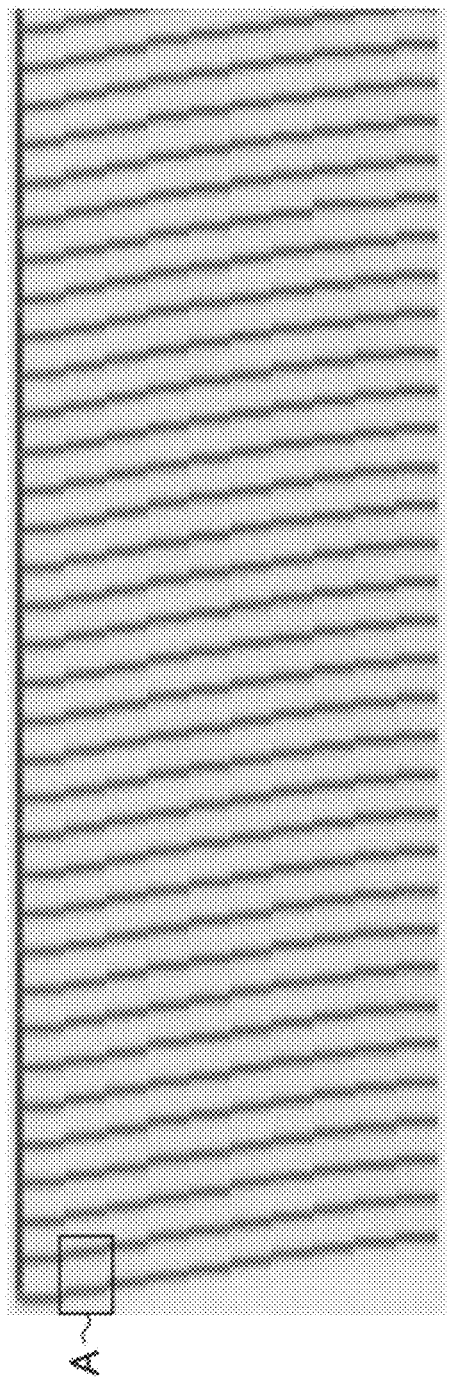
FIG. 4 is a diagram showing an example of an ideal read image obtained by reading in a test pattern.
Figure 5:
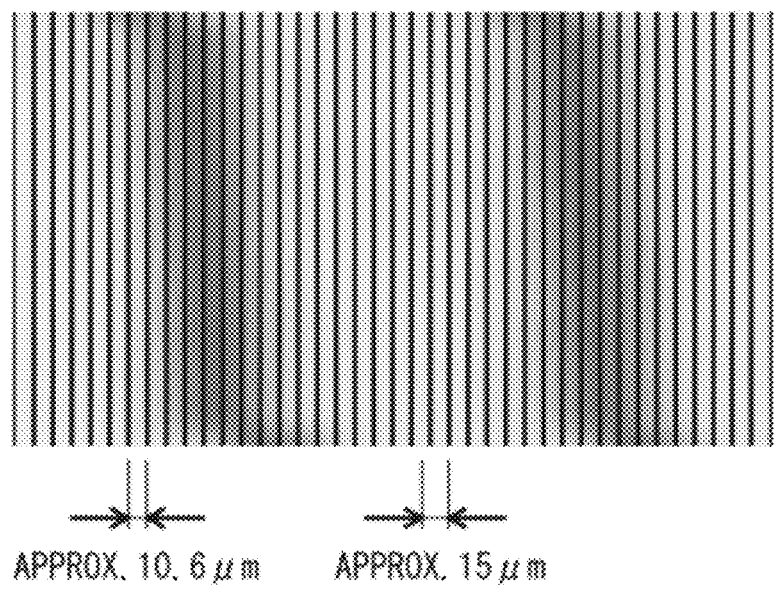
FIG. 5 is an enlarged view of portion A in FIG. 4.

FIG. 4 is an example of an ideal read image of a test pattern. Here, for reference purposes, an example using a scanner having higher resolution than the printing resolution is shown. FIG. 4 shows an example of a read image which is obtained by outputting a 1-on 10-off test pattern by means of an inkjet printer having a recording resolution of 1200 dpi (dots per inch) and reading in the test pattern with a flat-bed scanner having a reading resolution (horizontal-direction resolution) of 2400 dpi. FIG. 5 shows an enlarged diagram of the portion inside the rectangular frame indicated by reference symbol A in FIG. 4.

In FIG. 5, the straight vertical lines are lines indicating the boundaries corresponding to individual read pixels, and a long narrow rectangular region which is demarcated by two vertical lines and upper and lower horizontal lines corresponds to one read pixel. More specifically, if there is a reading resolution of 2400 dpi in the horizontal direction, then the width of one pixel is approximately 10.6 μm.

It is desirable to use the read image of this test pattern as a basis for determining and judging whether or not the depositing position errors of each nozzle (recording position errors)

are greater than a prescribed distance (for example, approximately 15 μm). In the case of a 2400 dpi reading resolution, it is possible to judge depositing position errors of 15 μm.

On the other hand, an actual reading apparatus (in-line sensor) which is installed in the paper conveyance path of an inkjet recording apparatus, and the like, often has a reading resolution which is lower than the printing resolution.

Figure 6:
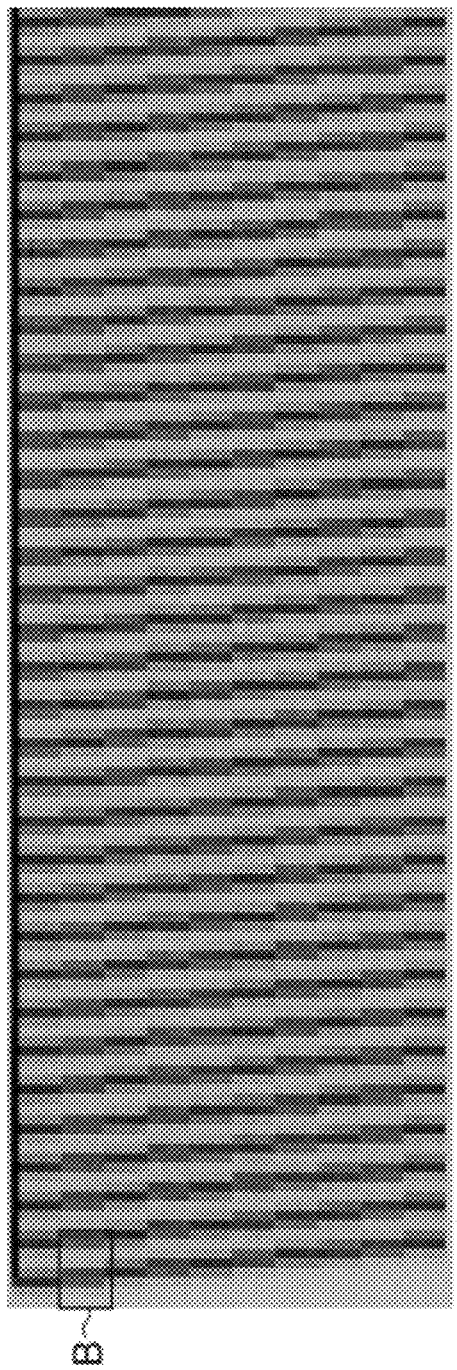
FIG. 6 is a diagram showing an example of an actual read image obtained by reading a test pattern using a reading apparatus having low resolution (477 dpi)
Figure 7:
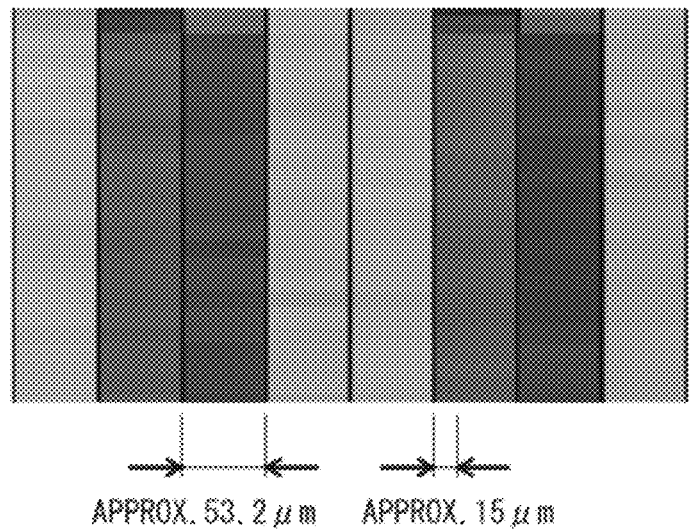
FIG. 7 is an enlarged view of portion B in FIG. 6.

FIG. 6 shows an example of an actual read image obtained by reading in a test pattern using a reading apparatus having a low resolution. Here, FIG. 6 shows an example of a read image which is obtained by outputting a 1-on 10-off test pattern by means of an inkjet printer having a recording resolution of 1200 dpi and reading in the test pattern with a scanner having a reading resolution (horizontal-direction resolution) of 477 dpi. FIG. 7 shows an enlarged diagram of the portion inside the rectangular frame indicated by reference symbol B in FIG. 6.

In order to simplify the description in numerical terms, a 1-on 9-off pattern is substituted in the explanation; in the case of a 1-on 9-off pattern and a printing resolution of 1200 dpi, the line pitch of one block is 211.6 μm. The width of one read pixel is approximately 53.2 μm. The detection technology according to the present embodiment is required to distinguish recording position errors of approximately 15 μm, but is not directly capable of judging errors smaller than one read pixel.

Then, one example of a method for accurately measuring recording position errors, and precisely identifying defective ejection nozzles, from a low-resolution read image of this kind is described below.

Principles of Detection of Defective Ejection Nozzles

Figure 8:
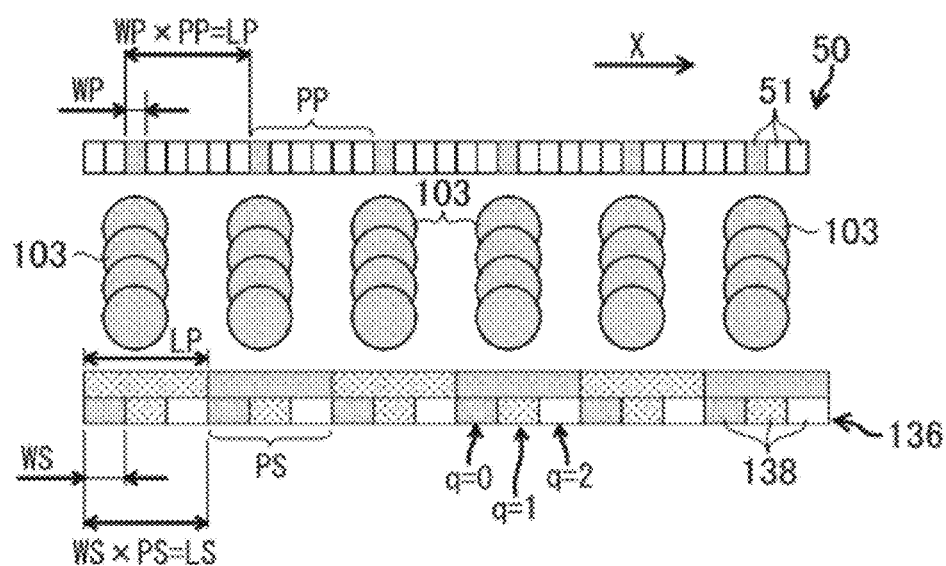
FIG. 8 is a diagram showing a schematic view of a relationship between nozzles, lines and read pixels.

FIG. 8 is a diagram showing a schematic view of a relationship between nozzles 51, lines 103 and read pixels 138, in a case where respective lines 103 formed by prescribed nozzles 51 selected by a 1-on n-off rule from the nozzles 51 of a head 50 are read in by a reading apparatus. Here, the detection pitch LP can be represented by LP=PP×WP [μm] and the analysis pitch LS by LS=PS×WS [μm], when WP [μm] represents the recording pixel pitch in the X direction based on the arrangement of nozzles 51 (the pitch determined by the X-direction printing resolution, in other words, the print pixel size), when PP represents the detection pitch number of the lines 103 (a number of pixels expressed in print pixel units) where a series of a prescribed number of print pixels aligned continuously in the X direction is grouped together as one detection unit, when WS [μm] represents the X-direction read pixel pitch of the read pixels 138 (read pixel size), and when PS represents the analysis pitch number (a number of pixels expressed in read pixel units) where a series of a prescribed number of read pixels 138 aligned continuously in the X direction is grouped together as one analysis unit. Furthermore, the pitch difference ΔP between the detection pitch LP and the analysis pitch LS is expressed by ΔP=LS−LP [μm].

Here, a reading apparatus (scanner) having a lower resolution than the recording resolution is used and the read pixel pitch WS is larger than the recording pixel pitch WP (WS>WP).

FIG. 8 shows a case where ΔP=0, and here, an instance is shown in which PP=6, WP=25400/1200 [μm], PS=3, WS=25400/600 [μm].

Figure 9A:
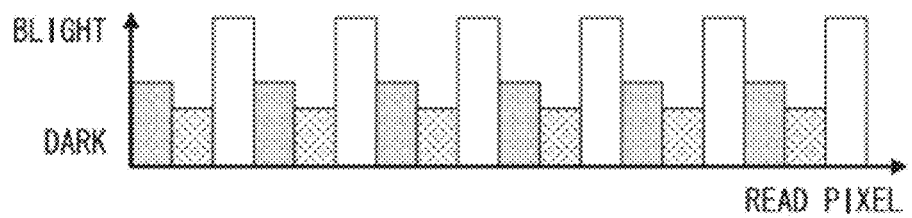
FIGS. 9A to 9E are graphs respectively showing profiles of read pixels shown in FIG. 8.

FIG. 9A is a graph depicting the reading results (read image signal) based on the read pixels 138 shown in FIG. 8.

In the read image signals, the read pixel positions (read pixel numbers) in the analysis pitch direction (the X direction in FIG. 8) are taken to be x=0, 1, 2, 3, . . . , in succession, from one end. Here, in order to identify defective ejection nozzles, the read pixel position x is divided by the analysis pitch number PS to determine a remainder q, and the profile of the read image signal is divided and analyzed on the basis of this remainder q.

By the way, the image density (light/shade) distribution of the read image in a cross-section in one direction (the X direction) is called a "profile". This profile does not necessarily indicate the density (light/shade) distribution in one pixel only; for example, it is possible to use the density (light/shade) distribution in the X direction as a profile by finding the average density in the Y direction.

Taking the profile of the read image signal shown in FIG. 9A to be Is(x), the profiles Isq divided on the basis of the remainder value q (where q=xmodPS) can be represented as indicated below.

$$Is0(k)=Is(PS\times k+0) \text{(when } q=0)\qquad\text{Formula 1}$$

$$Is1(k)=Is(PS\times k+1) \text{(when } q=1)\qquad\text{Formula 2}$$

$$Is2(k)=Is(PS\times k+2) \text{(when } q=2)\qquad\text{Formula 3}$$

As shown in FIG. 8, the remainder q described above corresponds to the position of each read pixel in the analysis pitch number PS (position in analysis pitch). Furthermore, in the present specification, there are cases where the remainder q may be called the MOD sequence.

Figure 9B:
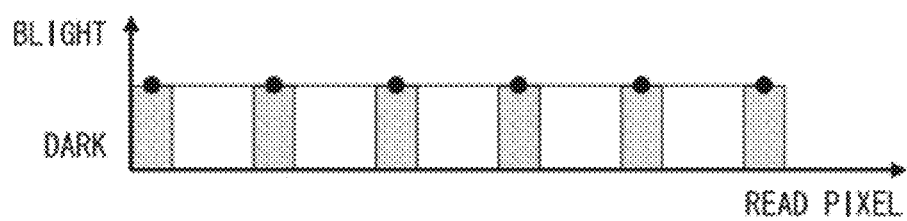
Figure 9C:
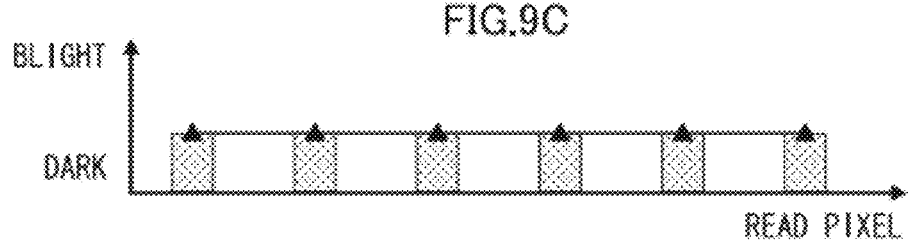
Figure 9D:
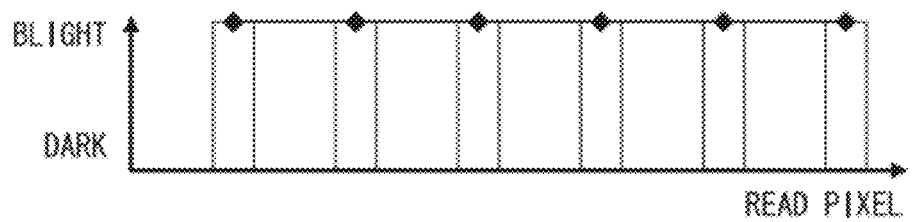
Figure 9E:
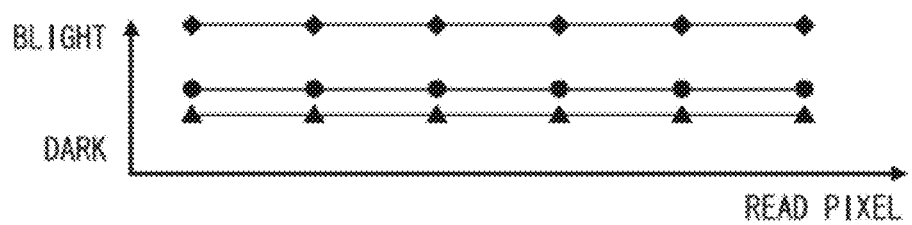

FIGS. 9B to 9D are graphs which respectively plot the profiles Isq obtained by dividing the read image signal shown in FIG. 9A into respective MOD sequences: FIG. 9B shows the profile Is0, FIG. 9C shows the profile Is1, and FIG. 9D shows the profile Is2. FIG. 9E is a graph showing the profiles Isq of each MOD sequence shown in FIG. 9B to 9D, in mutually superimposed fashion. In FIG. 9E, the profiles with the same q value for k in (Formula 1) to (Formula 3) are depicted at the same position on the horizontal axis.

Here, since ΔP=0, in other words, since the phases of the detection pitch LP coincides with the analysis pitch LS, the position in the analysis pitch (q=xmod PS) and the position of the line formed by the nozzle under detection coincide with each other, if there is no depositing position error. In other words, ideally, the profile Isq of each MOD sequence has prescribed density (signal value) regardless of the read pixel position x.

Figure 10:
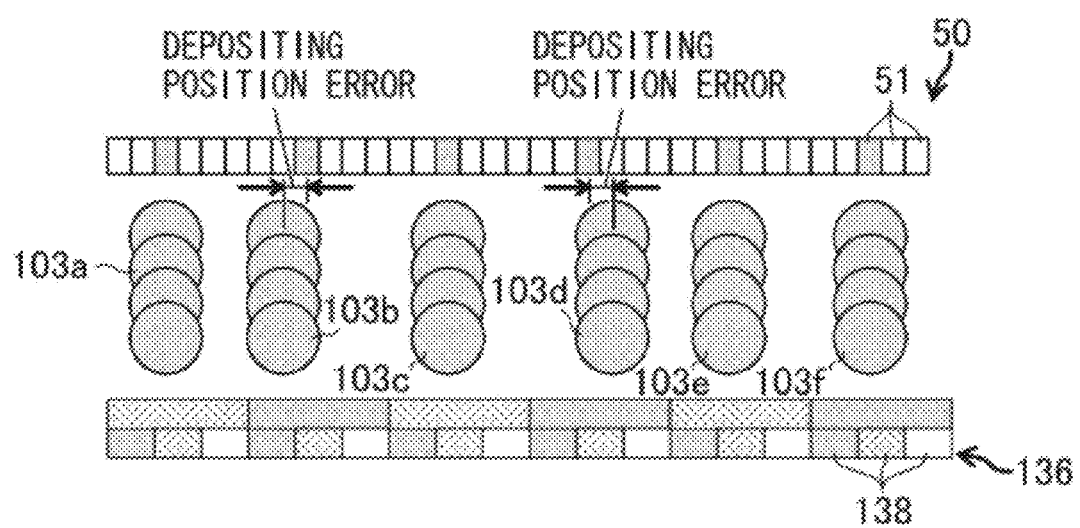
FIG. 10 is a diagram showing a schematic view of a relationship between nozzles, lines and read pixels, when there is deposition position error.

FIG. 10 is a diagram showing a schematic view of the relationship between nozzles 51, lines 103 and read pixels 138, similarly to FIG. 8, and depicts a case where there is depositing position error in line 103b and line 103d, of the lines 103a to 103f.

Figure 11A:
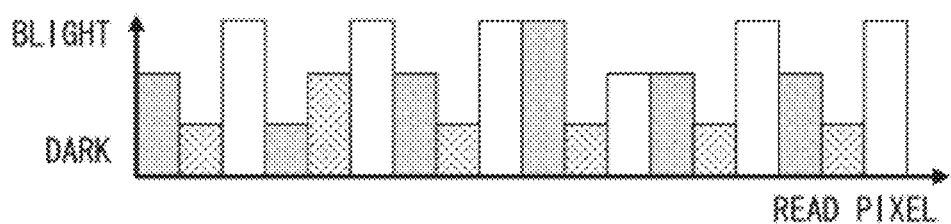
FIGS. 11A to 11E are graphs respectively showing profiles of read pixels shown in FIG. 10.
Figure 11B:
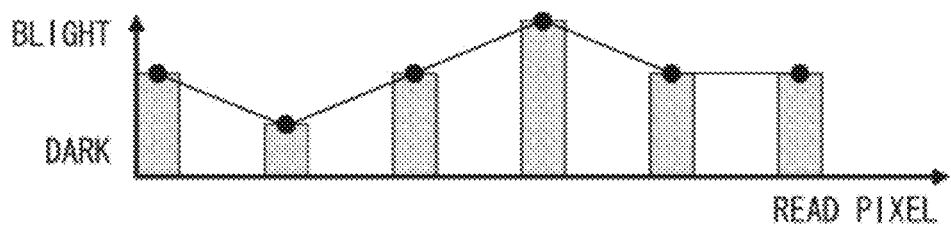
Figure 11C:
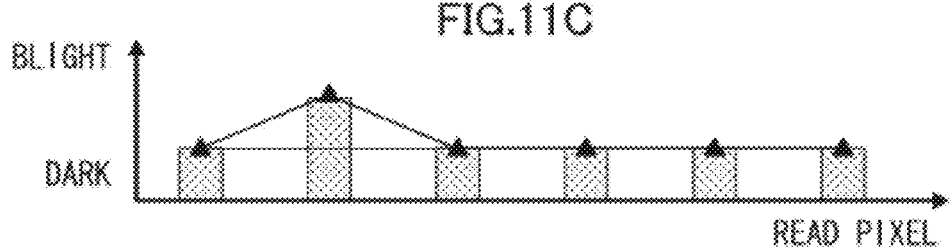
Figure 11D:
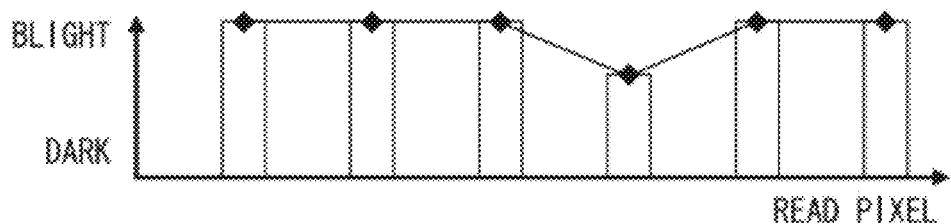
Figure 11E:
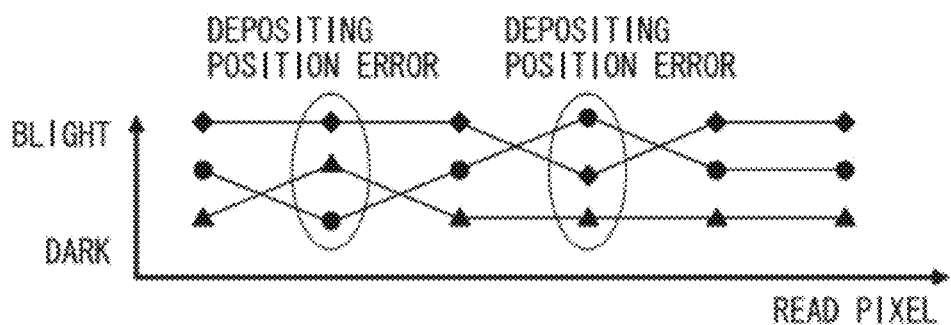

FIG. 11A is a graph showing read results of the respective read pixels 138 shown in FIG. 10, FIGS. 11B to 11D are graphs plotting profiles obtained by dividing the read image signal shown in FIG. 11A per MOD sequences. FIG. 11B shows a profile Is0, FIG. 11C shows a profile Is1 and FIG. 11D shows a profile Is2. FIG. 11E is a graph showing the profiles Isq per MOD sequence shown in FIG. 11B to 11D, in mutually superimposed fashion.

As shown in FIGS. 11A to 11E, looking in particular at the profiles Isq extracted per MOD sequence, it can be seen that the profiles Isq vary at the read pixel positions corresponding to the nozzles where a depositing position error has occurred. In other words, the profiles change at the position of the line 103b and the position of the line 103d. By extracting a change signal from the profiles per MOD sequence in this way, it is possible to identify defective ejection nozzles.

Detection Principles in Cases of Different Phases

In the example given above, a case where the phases of the detection pitch LP and the analysis pitch LS are matching (ΔP=0) was described, but processing is similar in a case where the phases are different (ΔP≠0).

Figure 12A:
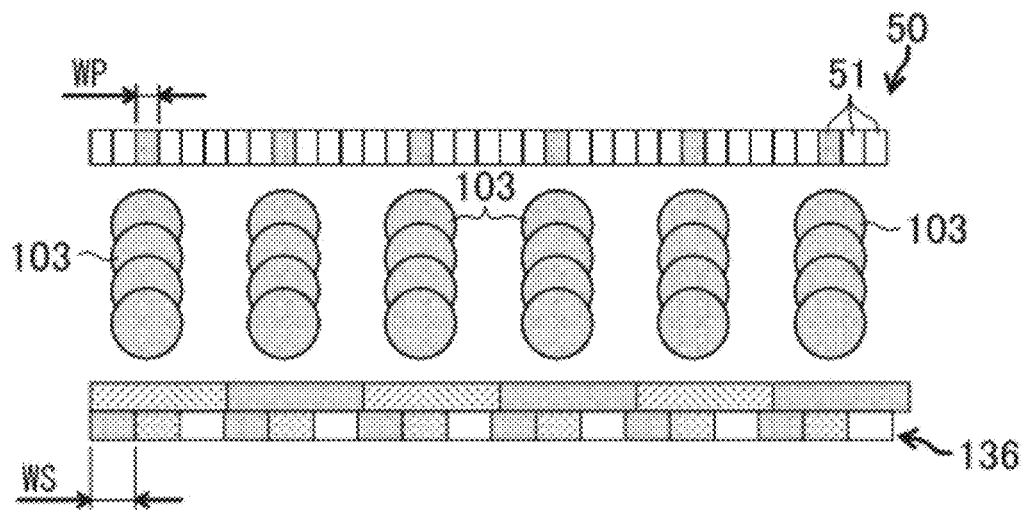
FIGS. 12A to 12C are diagrams showing schematic views of a relationship between nozzles, lines and read pixels when a pitch difference, ΔP, between a detection pitch and an analysis pitch is negative.
Figure 12B:
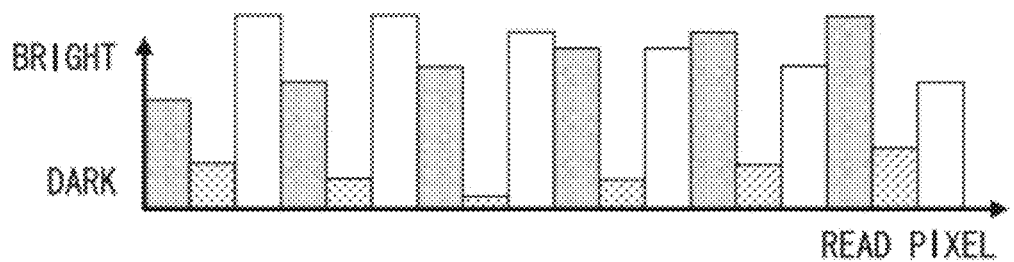
Figure 12C:
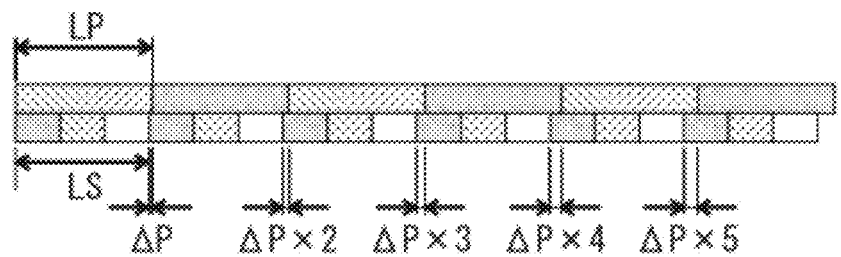

FIG. 12A is a diagram showing a schematic view of a relationship between nozzles 51, lines 103 and read pixels 138 in a case where the pitch difference ΔP has a negative value. FIG. 12B is a graph showing the read results of the respective read pixels 138 shown in FIG. 12A, and FIG. 12C is a diagram for illustrating a state where the pitch difference ΔP cumulates in a linear fashion, as the detection pitch number PP and the analysis pitch number PS settings increase.

Figure 13A:
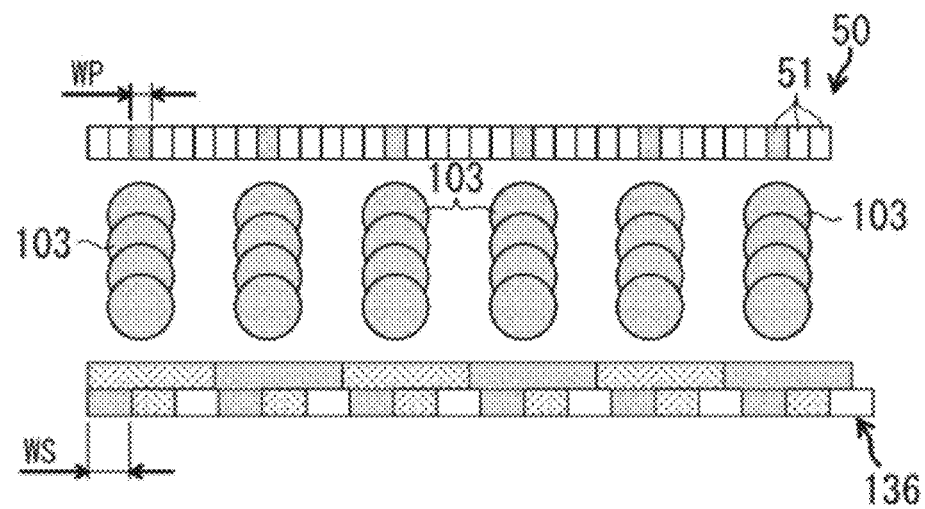
FIGS. 13A to 13C are diagrams showing schematic views of a relationship between nozzles, lines and read pixels, when the pitch difference ΔP is positive.
Figure 13B:
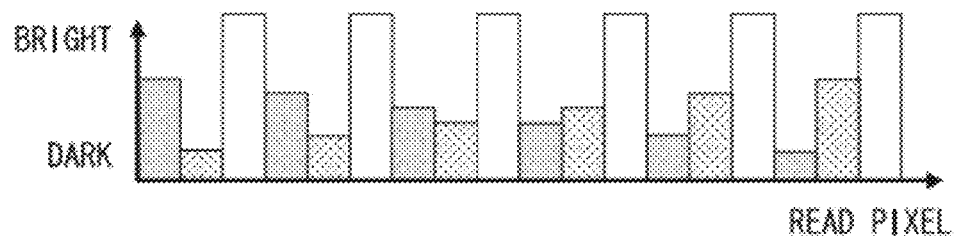
Figure 13C:
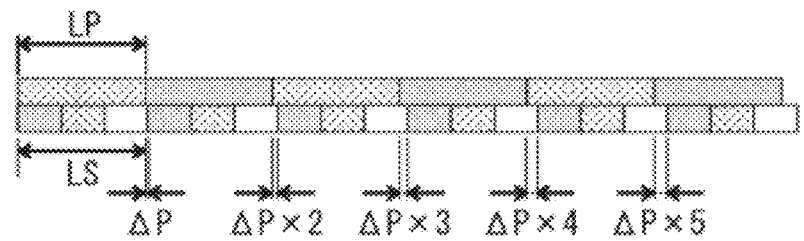

Similarly, FIG. 13A is a diagram showing a schematic view of a relationship between nozzles 51, lines 103 and read pixels 138 when the pitch difference ΔP is a positive value, FIG. 13B is a graph showing read results of respective read pixels 138 in the relationship shown in FIG. 13A, and FIG. 13C is a diagram for describing a state where the pitch difference ΔP cumulates in a linear fashion, as the detection pitch number PP and the analysis pitch number PS settings increase.

Figure 14A:
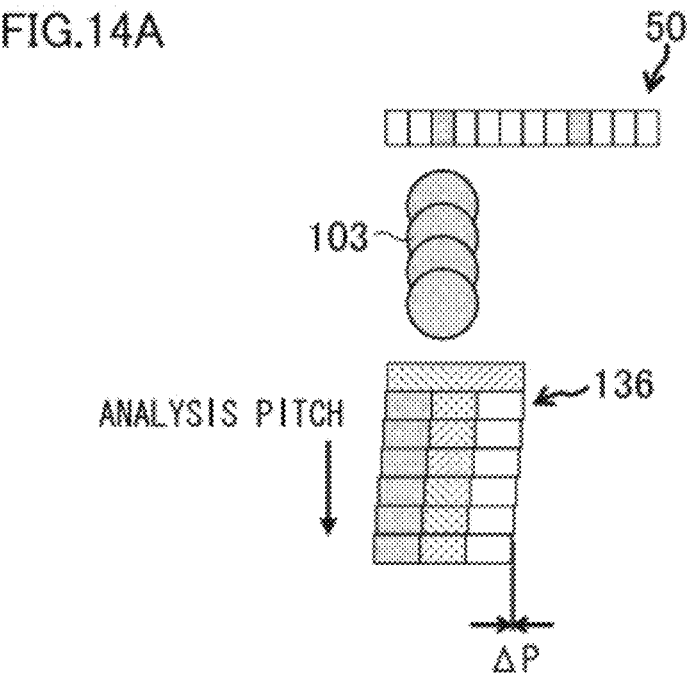
FIGS. 14A and 14B are diagrams showing relative positions of lines and read pixels.
Figure 14B:
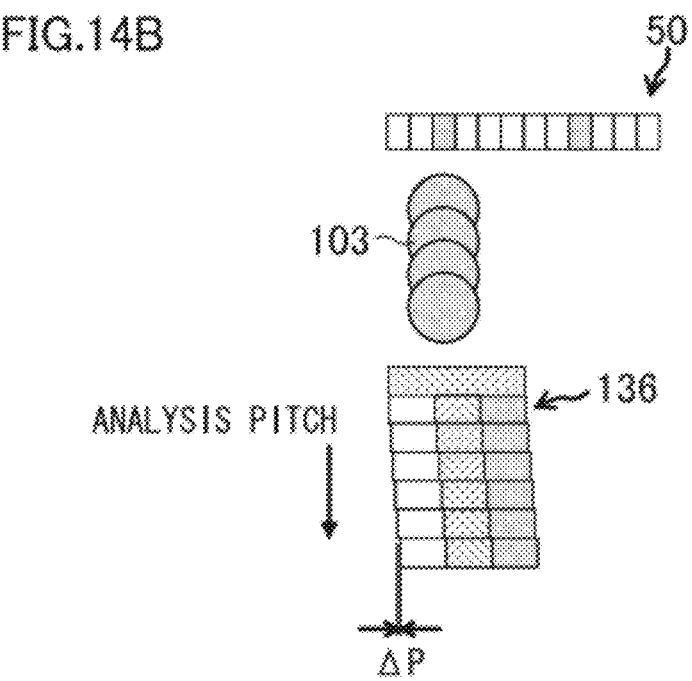

Moreover, FIGS. 14A and 14B are diagrams showing a state where the relative positions of the lines and the read pixels change in regular fashion, as a result of the difference (ΔP) between the analysis pitch LS and the detection pitch LP increasing at each analysis pitch; FIG. 14A shows a case where the pitch difference ΔP is negative and FIG. 14B shows a case where the pitch difference ΔP is positive.

As shown in FIGS. 12A-12C, FIGS. 13A-13C and FIGS. 14A-14B, since the phases of the detection pitch LP and the analysis pitch LS are not matching, then the relationship between the position in the analysis pitch and the line formed by the nozzle under detection progressively deviates by ΔP, per time where the detection pitch number PP and the analysis pitch number PS setting increases.

In this case, the profile per MOD sequence varies with a period which lasts until the deviation of ΔP accumulates to an amount corresponding to the detection pitch LP. In other words, if the pitch difference ΔP is not zero but has a small absolute value, the profile Isq of each MOD sequence changes with an extremely long period, and this period T is determined from (Formula 4) below.

$$T = WP \times PP \div |WS \times PS - WP \times PP| \qquad \text{Formula 4}$$

The period T expresses a number of pixels (k) of the profile Isq per MOD sequence.

If the period T is a large value, then a change signal can be extracted and defective ejection nozzles can be identified, on the basis of a similar principle to when the phases are matching (if ΔP=0). Consequently, the analysis pitch number PS should be determined in such a manner that the period T becomes a large value.

Figures 15A, 15B:
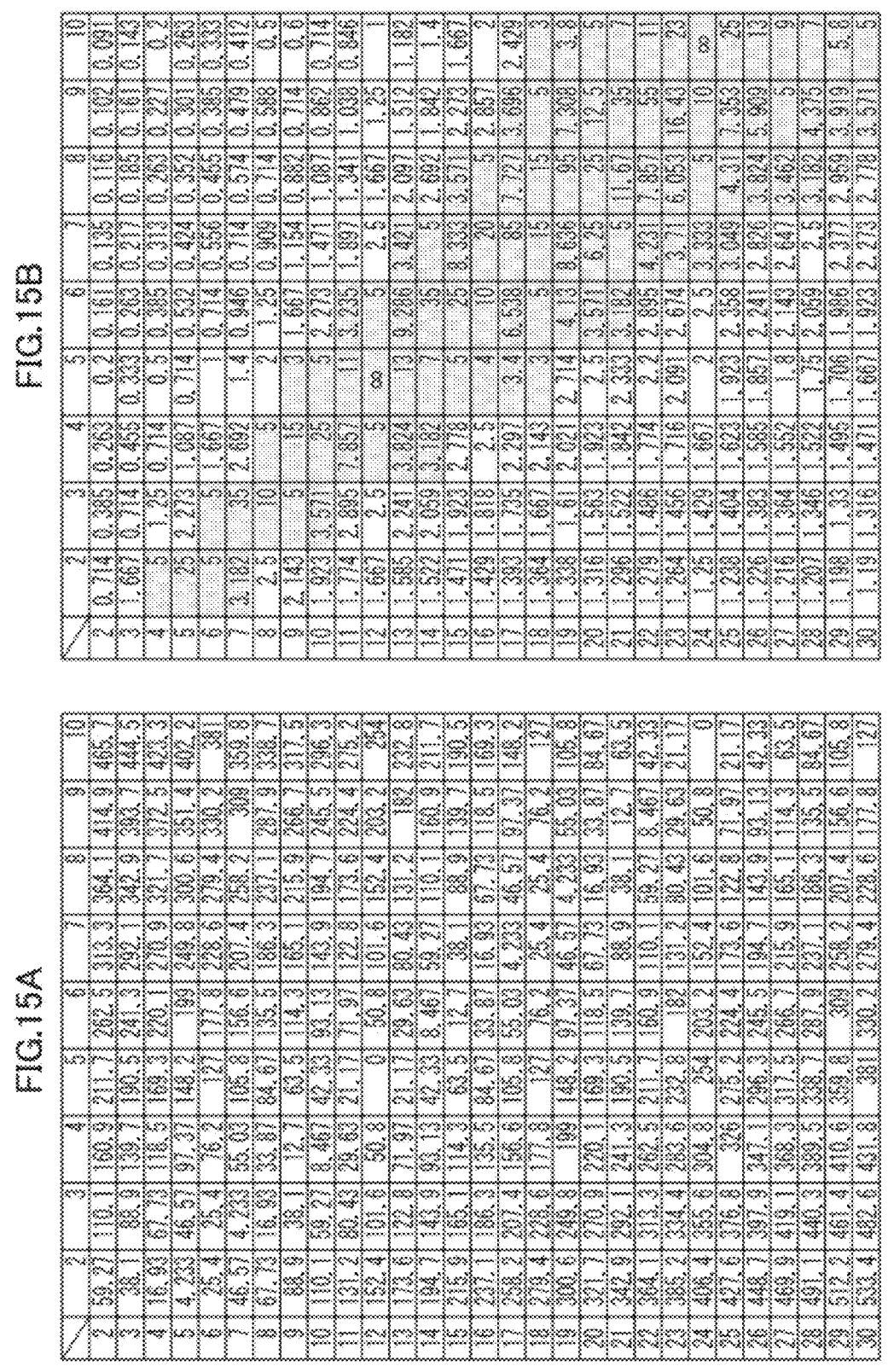
Figures 16A, 16B:
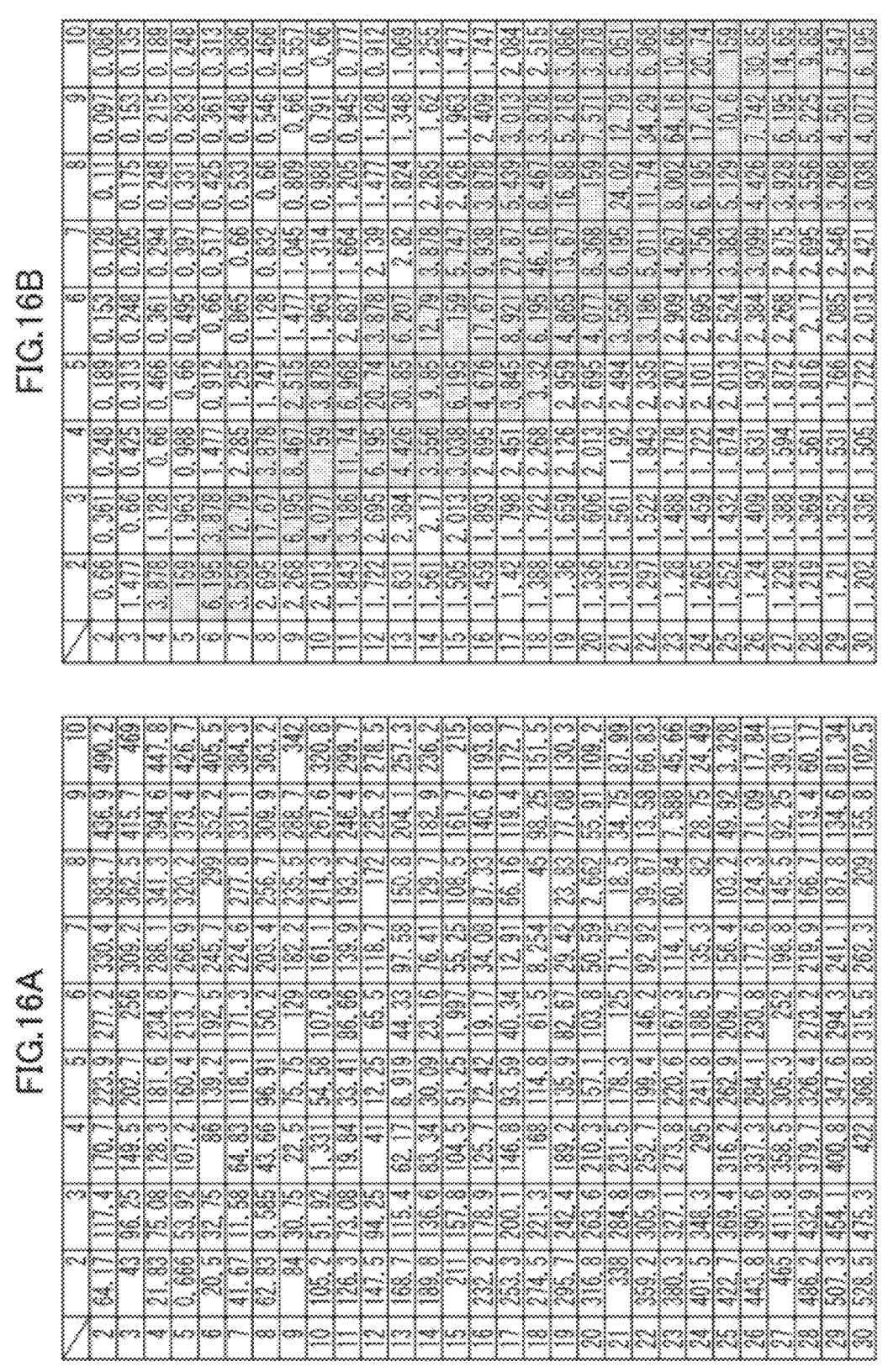

FIG. 15A is a table showing the pitch difference ΔP [unit: μm] for respective combinations of the detection pitch number PP (vertical axis) and the analysis pitch number PS (horizontal axis) in a case where the print resolution is 1200 [dpi] and the reading resolution is 500 [dpi], and FIG. 15B is a table showing the period T [unit: pixels] of the profiles of the respective MOD sequences in the respective combinations shown in FIG. 15A. Moreover, FIGS. 16A and 16B are tables which respectively show the pitch difference ΔP [unit: μm] and the period T [unit:pixel] of the profiles of respective MOD sequences, when the print resolution is 1200 [dpi] and the read resolution is 477 [dpi].

If the period T is extremely large (ΔP=0 indicates infinitely large), then the detection accuracy is high, and as the period T becomes shorter, it becomes more difficult to accurately calculate the signal change produced by deviation in ΔP. In particular, if T is not more than 3, then the conditions become extremely bad. Consequently, it is desirable that the period T should be larger than 3. The gray portions in FIG. 15B and FIG. 16B indicate combinations where T>3.

Description of Concrete Processing Algorithm Relating to an Embodiment

An example of a concrete processing algorithm using the detection principles described above will now be explained.

Figure 17:
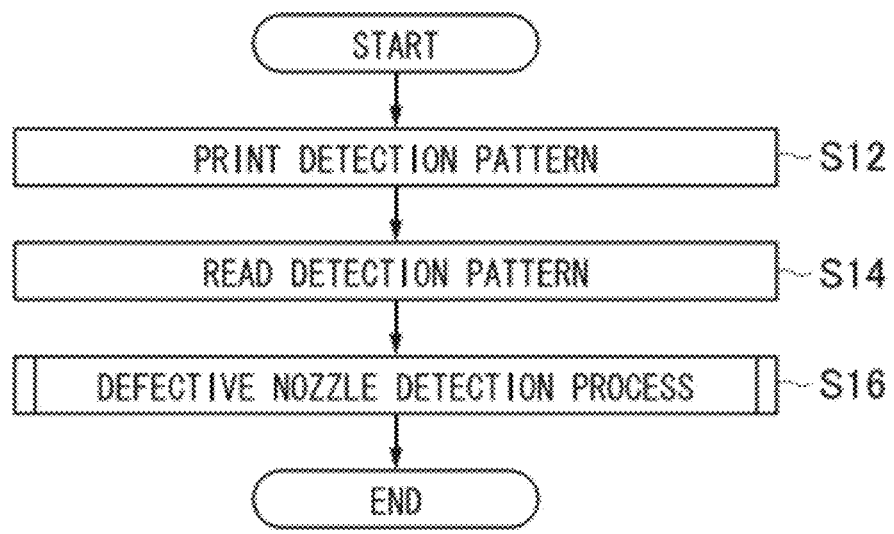
FIG. 17 is a flowchart showing a flow of a whole process for defective ejection nozzle detection.

FIG. 17 is a flowchart showing an overall flow of the processing. Firstly, a detection pattern is printed (step S12). Further, the printed detection pattern is read in by a reading apparatus (step S14). Then, a processing is carried out to detect defective ejection nozzles on the basis of the read image data obtained (step S16).

Figure 18:
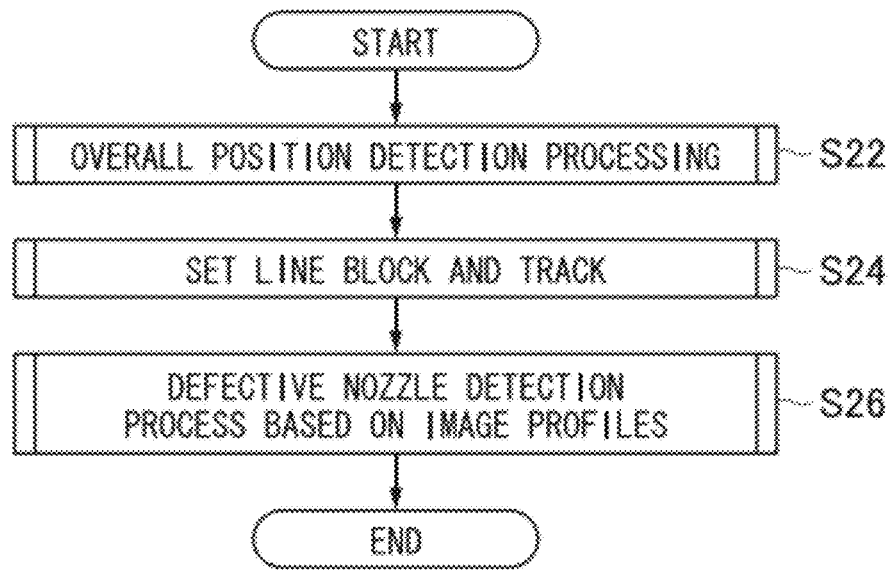
FIG. 18 is a flowchart of defective ejection nozzle detection processing.

FIG. 18 is a flowchart of the defective ejection nozzle detection processing shown in step S16 in FIG. 17. When the flow in FIG. 18 is started, overall position detection processing for ascertaining the overall positions of the test patterns is carried out (step S22). Next, in order to specify the positions of the object of analysis from the read image, setting processes of a line block and a track are carried out (step S24). A process for detecting defective nozzles on the basis of the image profiles is carried out on the set analysis region (step S26).

Figure 19:
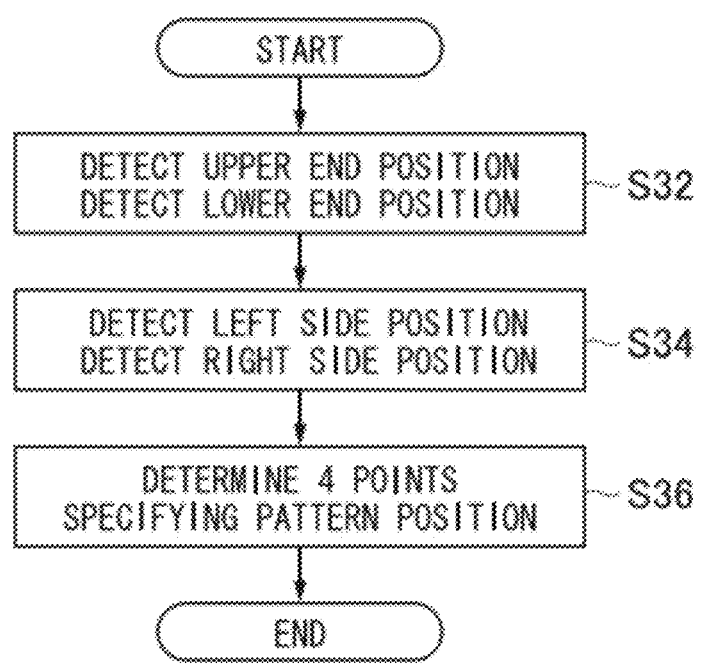
FIG. 19 is a flowchart of overall position detection processing.

FIG. 19 is a flowchart of general position detection processing (step S22 in FIG. 18). Firstly, the upper end position and the lower end position of the test pattern are detected from the read image (step S32 in FIG. 19). Further, a process for detecting the left side position and the right side position is also carried out (step S34). Then, the four points of the four corners which designate the position of the pattern are specified (step S36).

Figure 20:
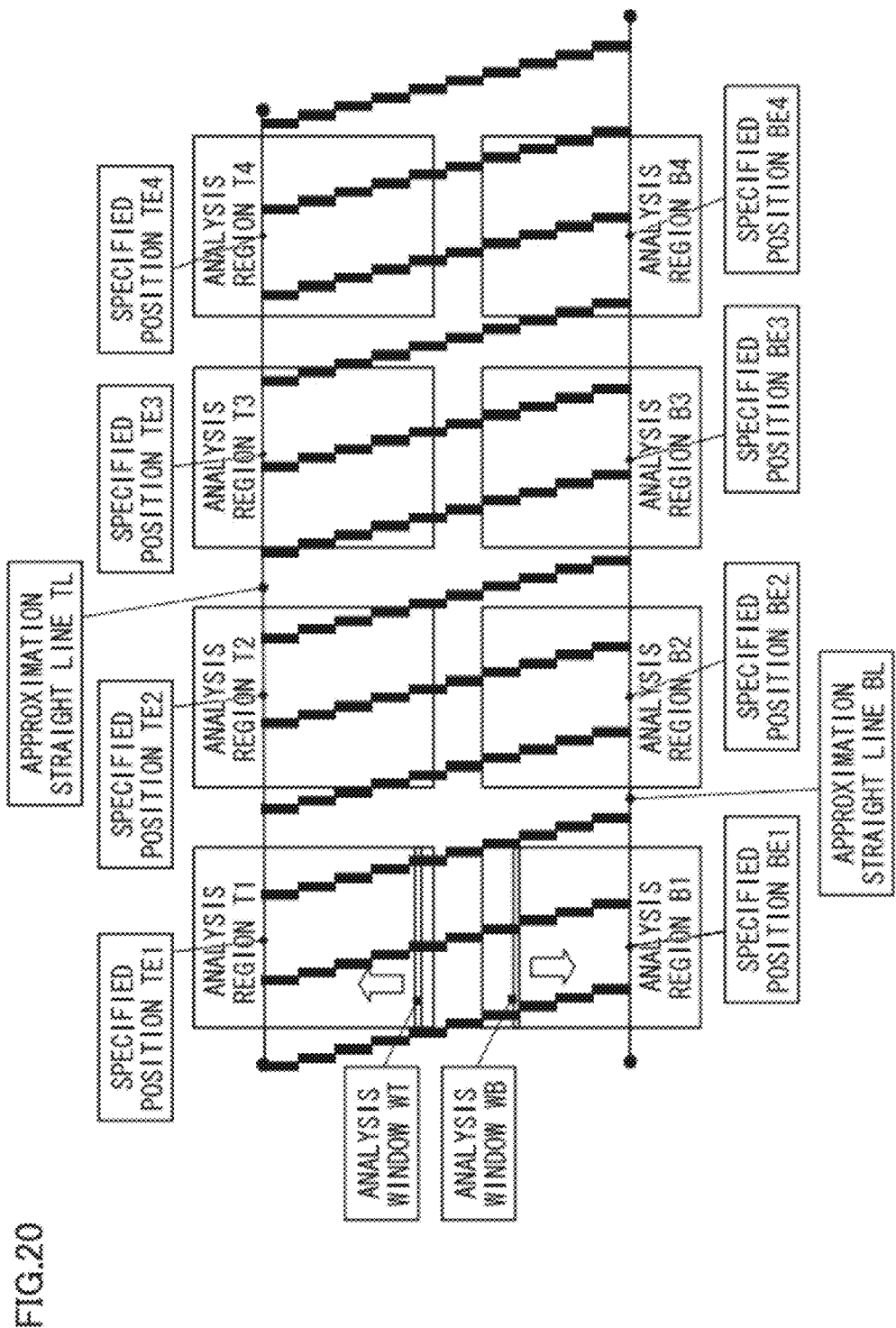
FIG. 20 is an illustrative diagram of processing for detecting reference positions (an upper end position and a lower end position) from a read image.

FIG. 20 is an illustrative diagram of the details of processing for detecting the upper end position and the lower end position in step S32 in FIG. 19. An imaging element including an RGB color separation filter (for example, an RGB line sensor) is used for the reading apparatus of the present embodiment, and then a color image signal of the pattern is obtained by reading in the formed test pattern. It is supposed that the channel used for detecting the position of the test pattern region, in the test pattern read image (RGB color image data), is ascertained in advance. For instance, if the image forming ink and the deposition sequence are determined successively from the leading end side of the recording paper 16 (from the top of the paper), as illustrated in FIG. 3, then the R channel is used for position detection of a cyan ink pattern, the G channel is used for position detection of a magenta ink pattern, the B channel is used for position detection of a yellow ink pattern, and the G channel is used for position detection of the black ink pattern.

In this description, the image signal of the read image according to the present embodiment is taken to be digital image data expressed in 8-bit tones, in which a blank white background is represented by a value close to "255" and black is represented by a value close to "0". The X direction in the read image is the horizontal direction in FIG. 20 and the X-direction resolution is 477 dpi. The Y direction is the vertical direction in FIG. 20. The Y-direction resolution is not specified in particular, but is 100 dpi or 200 dpi, for instance. The Y-direction resolution can be a lower resolution than the X-direction resolution. The point of origin on the Y axis is in the upper part of FIG. 20 and the coordinate value on the Y axis increases toward the lower side in FIG. 20.

Here, an example is described in which the position of the test pattern formed by M ink in FIG. 3 is detected from the whole read image. As stated above, the approximate positions of the patterns of the respective color inks (the pattern of each of the colors) in the whole read image are judged in advance from the design positions of the test patterns. Firstly, the upper end analysis regions T1 to T4 as indicated by the rectangular shapes labeled with reference numerals T1 to T4 in FIG. 20, and the lower end analysis regions B1 to B4 as indicated by the rectangular shapes labeled with reference numerals B1 to B4, are set on the basis of the approximate Y-direction central position and X-direction central position of the M ink test pattern, from the position information which is ascertained in advance.

The upper end analysis regions T1 to T4 are set in a region including one portion of the upper end part of the group of lines constituting the pattern. The upper end analysis regions T1 to T4 are set at a plurality of locations in the X direction (here, four locations are depicted as an example). The lower end analysis regions B1 to B4 are set in a range which includes a portion of the lower end part of the pattern. The lower end analysis regions B1 to B4 are set at a plurality of locations in the X direction (here, four locations are depicted as an example). The reason for setting a plurality of analysis regions T1 to T4 and B1 to B4 in the X direction is as a countermeasure for a case where the read image is skewed.

The X-direction width of the regions T1 to T4 and B1 to B4 is desirably a width which is expected to contain a plurality of lines in a 1-on n-off line block. Here, the X-direction width is set to a width which can contain 2 to 3 lines.

In the upper end analysis regions T1 to T4, the positions of the upper end parts are determined by progressively moving an analysis window WT having one pixel in the Y direction and a prescribed number of pixels in the X direction (here, the number of pixels which is expected to contain at least two lines), in the upward direction (−Y direction) in FIG. 20, in each respective region.

In the lower end analysis regions B1 to B4, similarly, the positions of the lower end parts are determined by progressively moving an analysis window WB having one pixel in the Y direction and a prescribed number of pixels in the X direction (here, the number of pixels which is expected to contain at least two lines), in the downward direction (+Y direction) in FIG. 20, in each respective region.

Principle for Determining Ends

The principle for determining the ends of a region is as follows.

A histogram of the analysis windows WT, WB is calculated. The initial positions of the analysis windows (the initial position of WT is the lower end of each region T1 to T4, and the initial position of WB is the upper end of each region B1 to B4) are necessarily situated in the pattern region and therefore lines and blank background are present in a prescribed ratio. Consequently, the 10% point of the cumulative histogram is a tone value close to black, and the 90% point of the cumulative histogram is a value close to white.

The 10% point of the cumulative histogram means the signal value indicated when a histogram of a prescribed region (inside the analysis window in this case) is created and the pixel number reaches 19% of all of the pixels in the prescribed region, counting up in increasing signal value from a small value. The histogram is calculated while moving the analysis window, and the analysis window position (position in the Y-axis direction) immediately before the 10% point of the cumulative histogram changes to a tone value close to white is judged to be the "end" of the analysis region.

The end positions (specified positions TE1 to TE4) are specified respectively for the upper end analysis regions T1 to T4. The end positions (specified positions BE1 to BE4) are specified respectively for the upper end analysis regions B1 to B4.

The "ends" (specified positions TE1 to TE4) of the respective upper end analysis regions T1 to T4 are determined using the end determining principle described above, and a straight line "approximation straight line TL" representing the upper end position of the test pattern is specified on the basis of these points. Similarly, the "ends" (specified positions BE1 to BE4) of the lower end analysis regions B1 to B4 are specified and a straight line "approximation straight line BL" representing the lower end position of the test pattern is specified on the basis of these points.

In other words, a linear formula is determined by means of a least-squares method using the central position in the X direction determined for the plurality of analysis regions T1 to T4 (the X-direction central position $X_i$ of the analysis regions $T_i$) and the coordinates ($X_i, Y_i$) of the Y position ($Y_i$) determined by the end determining principle in respect of the analysis regions $T_i$ (in the present example, i=1, 2, 3, 4) respectively, and an upper end line (approximation line TL), such as that shown in FIG. 20, is calculated.

Similarly, a linear formula is determined by means of a least-squares method using the central position in the X direction determined for the plurality of analysis regions B1 to B4 (the X-direction central position $X_i$ of the analysis regions $T_i$) and the coordinates ($X_i, Y_i$) of the Y position ($Y_i$) determined by the end determining principle in respect of the analysis regions $T_i$ respectively, and a lower end line (approximation line BL), such as that shown in FIG. 20, is calculated.

Next, the method of specifying the left and right ends of the test pattern will be described.

Figure 21:
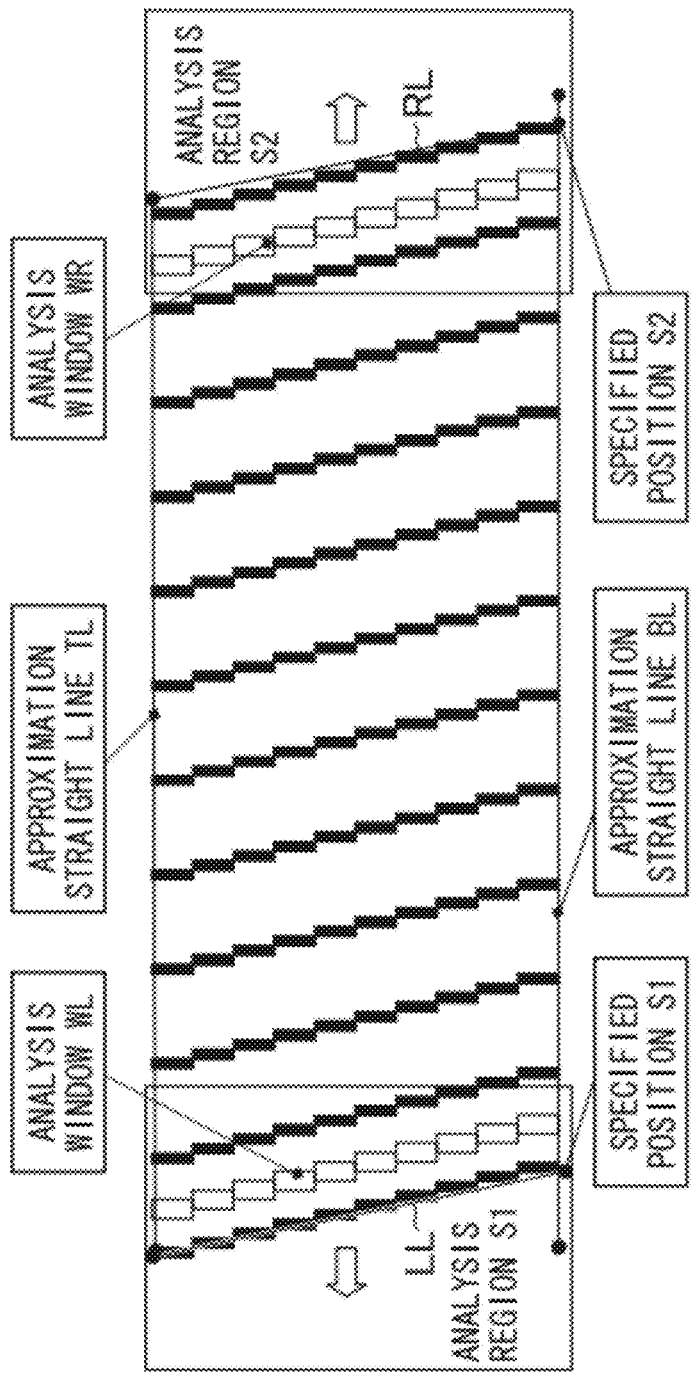
FIG. 21 is an illustrative diagram of processing for detecting reference positions (a left end position and a right end position) from a read image.

FIG. 21 is an illustrative diagram of the details of processing for detecting the right side position and the left side position in step S34 in FIG. 19. As shown in FIG. 21, in order to detect the left and right ends of the test pattern, a left end analysis region S1 such as that indicated by the rectangular shape labeled with reference numeral S1 is set in the region including the left end portion of the test pattern, and a right end analysis region S2 such as that indicated by the rectangular shape labeled with reference numeral S2 is set in the region including the right end portion of the test pattern.

The analysis regions S1 and S2 have a Y-direction height which includes the whole of the blocks based on a 1-on n-off pattern (line blocks having n+1 steps). The analysis windows WL, WR forming the histogram analysis regions for specifying the left and right end portions of the test pattern use continuous rectangular shapes having a gradient following the arrangement of the step-shaped line groups comprising (n+1) steps, on the basis of the design of the test pattern. In other words, the analysis windows WL and WR are each corresponded by (n+1) rectangular shapes corresponding to the lines of the line blocks respectively, which are arranged following the arrangement of the lines in each step. Furthermore, the analysis windows WL, WR is specified in terms of the X-direction on the basis of the line pitch of each step and the read image resolution, so as to contain one line evenly. In the present embodiment, the analysis windows are set to a size of four pixels in the X direction.

Reasons for containing one line evenly is using the end determining principle described above. A histogram is calculated while progressively moving each of the analysis windows WL, WR in the directions of the arrows (outwards on either side), and the ends are determined.

In their initial positions, the analysis windows WL, WR are always situated in the test pattern, and therefore lines and white background are present in a prescribed ratio in the window. Since the X-direction width of the windows is determined so as to "contain one line in uniform fashion", the prescribed ratio between the lines and the white background is fixed throughout the test pattern. Consequently, the 10% point of the cumulative histogram is a tone value close to black, and the 90% point of the cumulative histogram is a tone value close to white.

If the window is moved progressively and leaves the area of the test pattern, then since there are no lines outside the test pattern, the 10% point of the cumulative histogram is a tone value close to white and the 90% point of the cumulative histogram is a tone value close to white.

The histogram is calculated while moving the window, and the analysis window position (position in the X-axis direction) immediately before the 10% point of the cumulative histogram changes to a tone value close to white is judged to be the "end" of the analysis region.

In this way, the X-direction positions of the left and right ends are determined respectively. The straight lines RL, LL, corresponding to the left and right ends are specified on the basis of the gradient following the design of the test pattern. Apart from the example described above, the method of specifying the left and right-hand ends may also be based on using continuous rectangular shapes having a size of 1 pixel in the X direction, as an analysis window, calculating a histogram while moving this window, and taking the "end" to be the position where the cyclical change in the 10% point of the cumulative histogram cuts off.

Since straight lines (TL, BL, LL, RL) indicating the upper and lower ends and the left and right-hand ends of the test pattern are specified by the method described above, then the points of intersection of these straight lines can be calculated to determine the four points of the four corners encompassing the read pattern.

Figure 22:
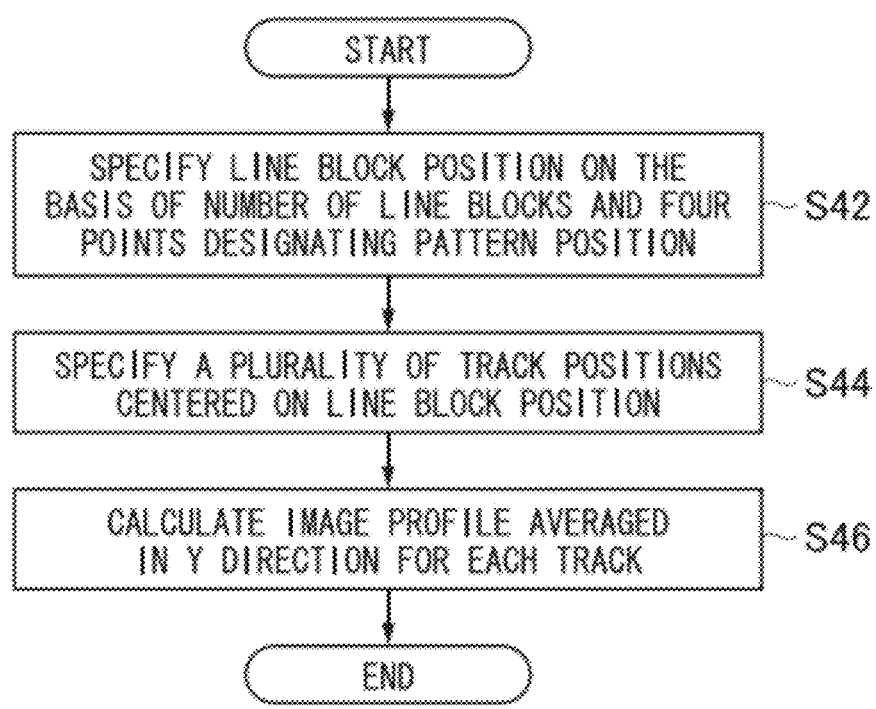
FIG. 22 is a flowchart of a line block and track setting process.
Figure 23:
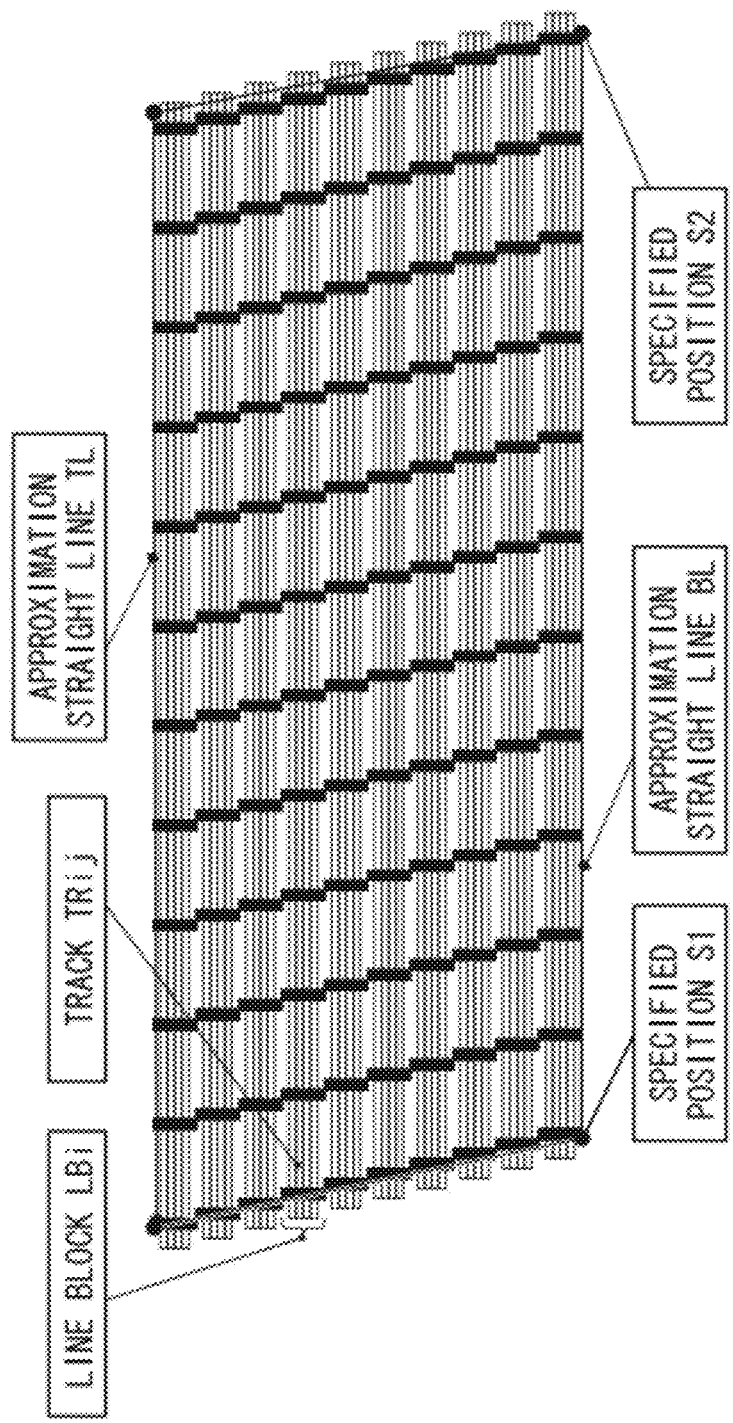
FIG. 23 is an illustrative diagram of a method of extracting line blocks and tracks on the basis of a reference position.

FIG. 22 is a flowchart of the line block and track setting process indicated in step S24 in FIG. 18, and FIG. 23 is an illustrative diagram of same. When the process in FIG. 22 starts, a straight line each passing through a Y-direction central position of each of the line blocks in the respective steps are calculated on the basis of the coordinates of the four points specified above and the number of line blocks included in the test pattern (step S42). In other words, the region surrounded by the four corner points (pattern region) is divided up equally, and here, a straight line on the Y-direction central positions of the respective line block is calculated based on internal division by determining a ratio so that the straight line passes through the very centers of the respective ten line blocks. In this way, the central position of each line block in the Y direction is determined.

Next, a plurality of track positions which are parallel to a straight line of the Y-direction central positions of the respective line blocks are calculated (step S44). Since a straight line passing through the Y-direction central position of each line block is specified in step S42, then finer parallel lines are traced with reference to this straight line. Since the Y-direction length of the line is estimated roughly, this Y-direction length is divided equally in accordance with the number of tracks set (a suitable number not less than 2).

FIG. 23 shows an example where four tracks TRij are set for each line block LBi in a 10-step, 1-on, 9-off pattern. The suffix i is a number which identifies the line block and here, i is an integer from 0 to 9. The suffix j is a number which identifies the track position and here, j is an integer from 0 to 3.

The respective tracks Tij (i=0, 1, 2, ... 9, j=0, 1, 2, 3) are set to a size of a plurality of pixels in the Y direction, and to a size of a prescribed number of pixels forming a width that does not exceed the left and right ends in the X direction, so as to include all of the lines in the line block. In each track Tij, an image profile in which the read values are averaged in the Y direction is created.

In a case where a shading correction region 18 is provided separately from the forming region of the test patterns 102K, 102C, 102M, 102Y on the recording paper 16, as shown in FIG. 3, the image profile is created after performing shading correction.

In a case where the shading correction region 18 is located a prescribed number of pixels in the Y direction above the upper end position of the test pattern, as in the chart shown in FIG. 3, then shading correction is performed by the following procedure. More specifically, firstly, a shading correction region 18 is specified with reference to the upper end position of the test pattern as calculated by the method illustrated in FIG. 20. Then, the average value of the RGB signal in the Y direction is calculated respectively at each X position in the shading correction region 18, and a gain correction value (multiplication coefficient) per RGB channel is calculated per X position, in such a manner that the average value becomes a prescribed value (standard white level). After performing shading correction of the whole of the read image (multiplying the gain correction value for each X pixel position), the image profile is calculated.

The creation of an image profile referred to here is not necessarily limited to the channels used to specify the test pattern position (FIG. 20 to FIG. 23). It is also possible to use the R or G channel for the C ink pattern, the R or G channel for the M ink pattern, the B channel for the Y ink pattern, and the R, G, or B channel for the K ink pattern, and the processing results from a plurality of channels can also be used in combination. Here, in order to simplify the description, an example where only one channel is used will be explained.

Figure 24:
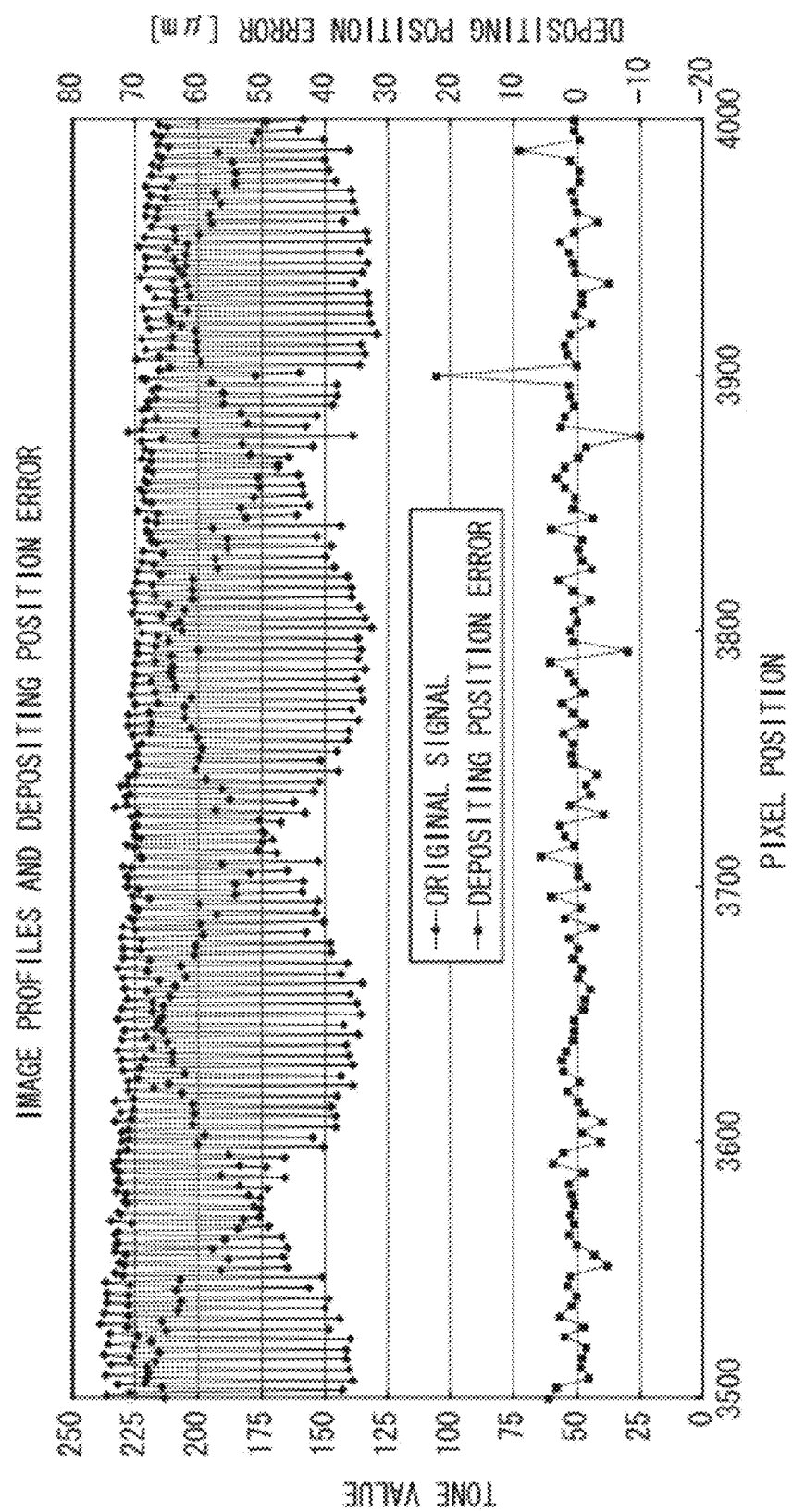
FIG. 24 is a graph showing one example of a read image profile of a line block.

FIG. 24 is a concrete example of image profiles obtained from one track. FIG. 24 is a diagram showing results obtained when a 1-on 9-off line pattern printed by a head 50 having nozzles 51 with a printing resolution of 1200 [dpi] is read in with a reading apparatus having a reading resolution of 477 [dpi]. The read pixel position indicates an original signal of a read tone value at a read pixel position ranging from 3500 to 4000. Furthermore, FIG. 24 displays the actual depositing position errors of each nozzle, simultaneously.

According to FIG. 24, there is periodicity in the variation of the image profiles. If the depositing position error is large, then the regularity of the image profile is disturbed and it is inferred that there is a proportional relationship between the size of the depositing position error and the disturbance in the regularity of the profile.

Figure 25:
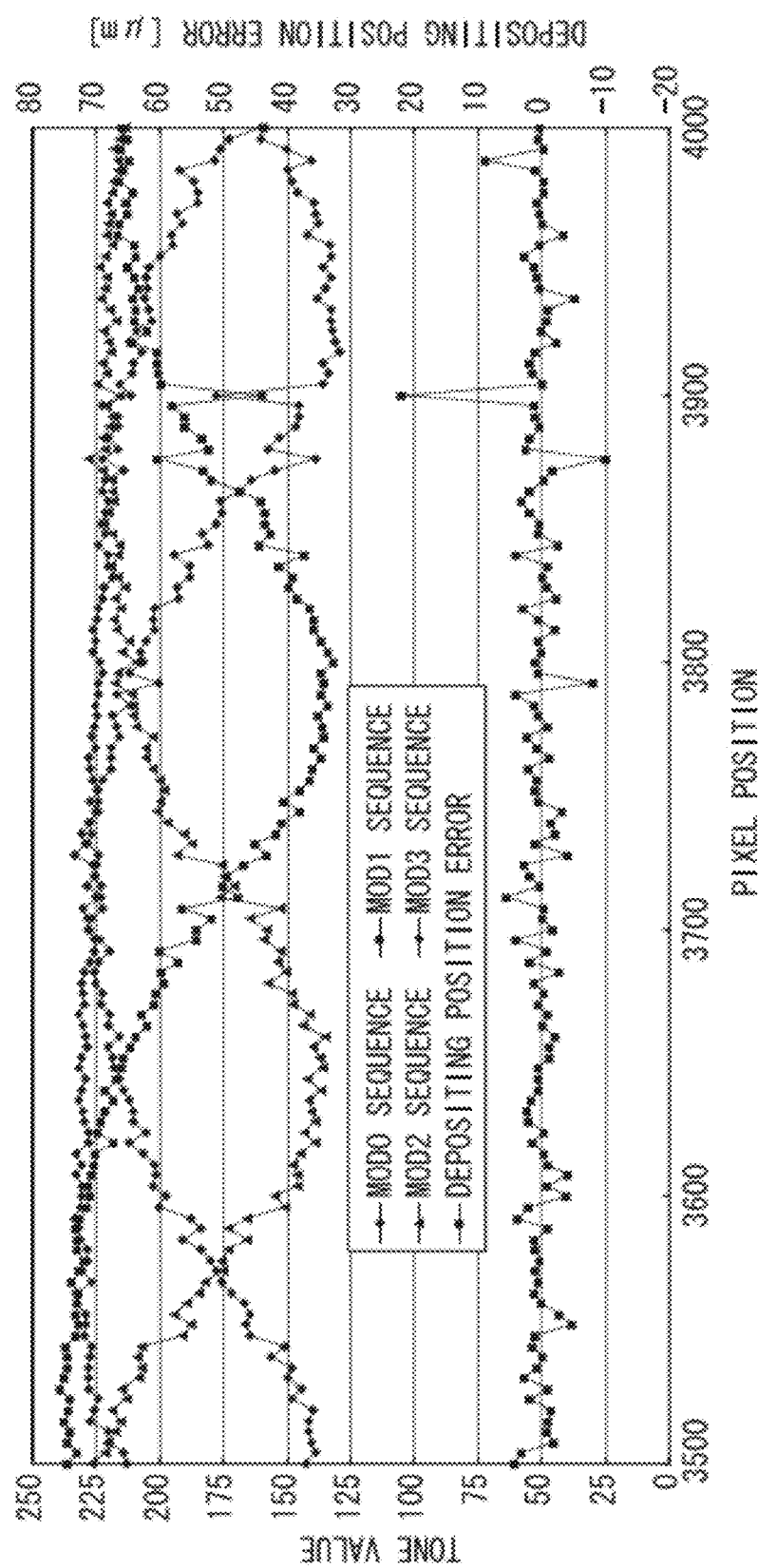
FIG. 25 is a graph showing profiles Isq (q=0, 1, 2, 3) for respective MOD sequences.

FIG. 25 is a diagram showing the read results indicated in FIG. 24 (the pattern read image) for each four read pixels (the image profiles of the MOD sequences). More specifically, FIG. 25 is a graph showing the profile Isq of each MOD sequence (q=0, 1, 2, 3) when PP=10 and PS=4. FIG. 25 shows an example where WS=25400/477 [µm] and ΔP=1.33, and as this diagram reveals, the profile Isq of each MOD sequence changes with a large periodicity. This periodicity T is 159 [pixels], as shown in FIG. 16B.

Figure 26:
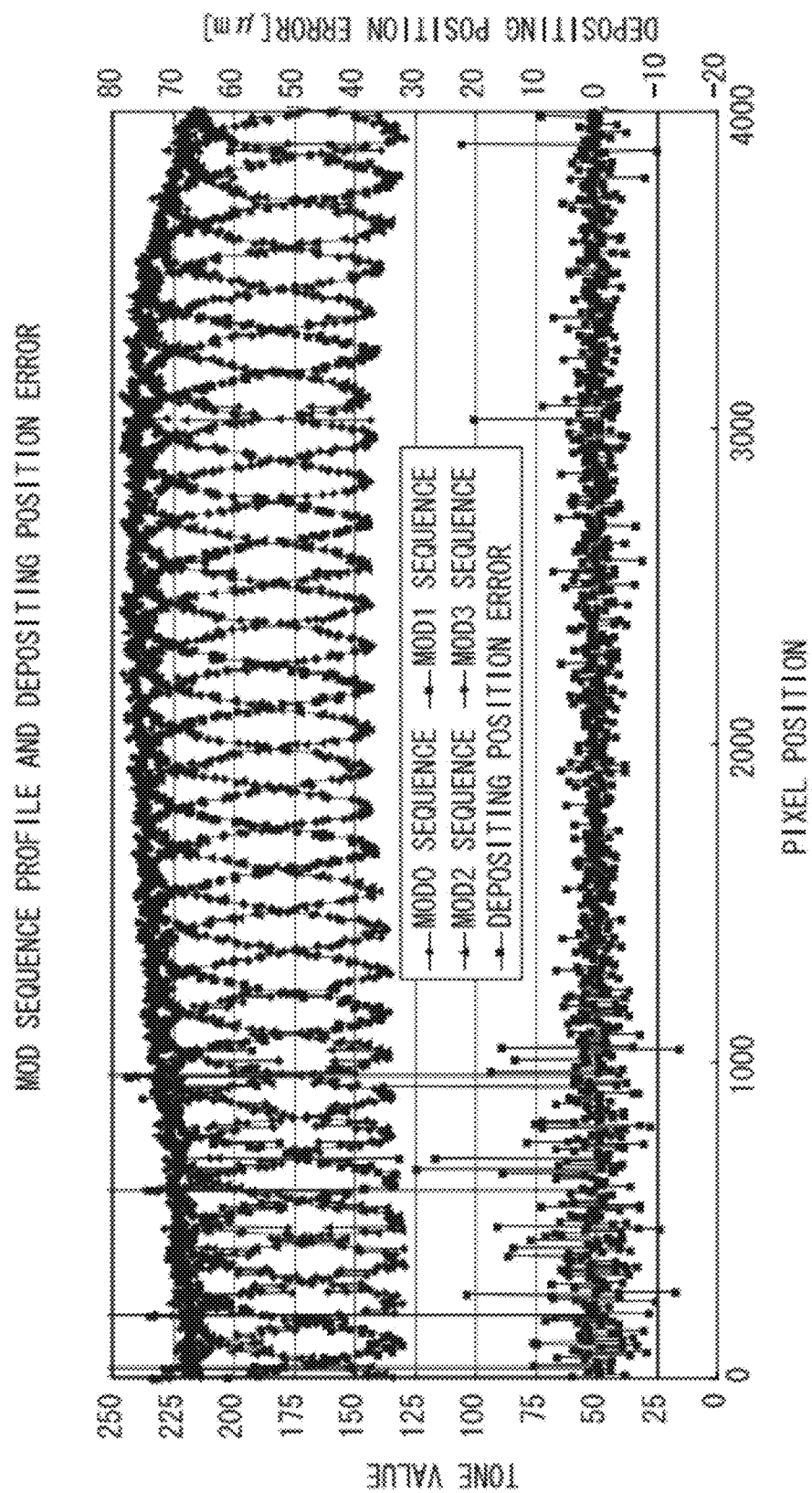
FIG. 26 is a graph showing an image profile for each MOD sequence, in a state where shading correction is not carried out.
Figure 35:
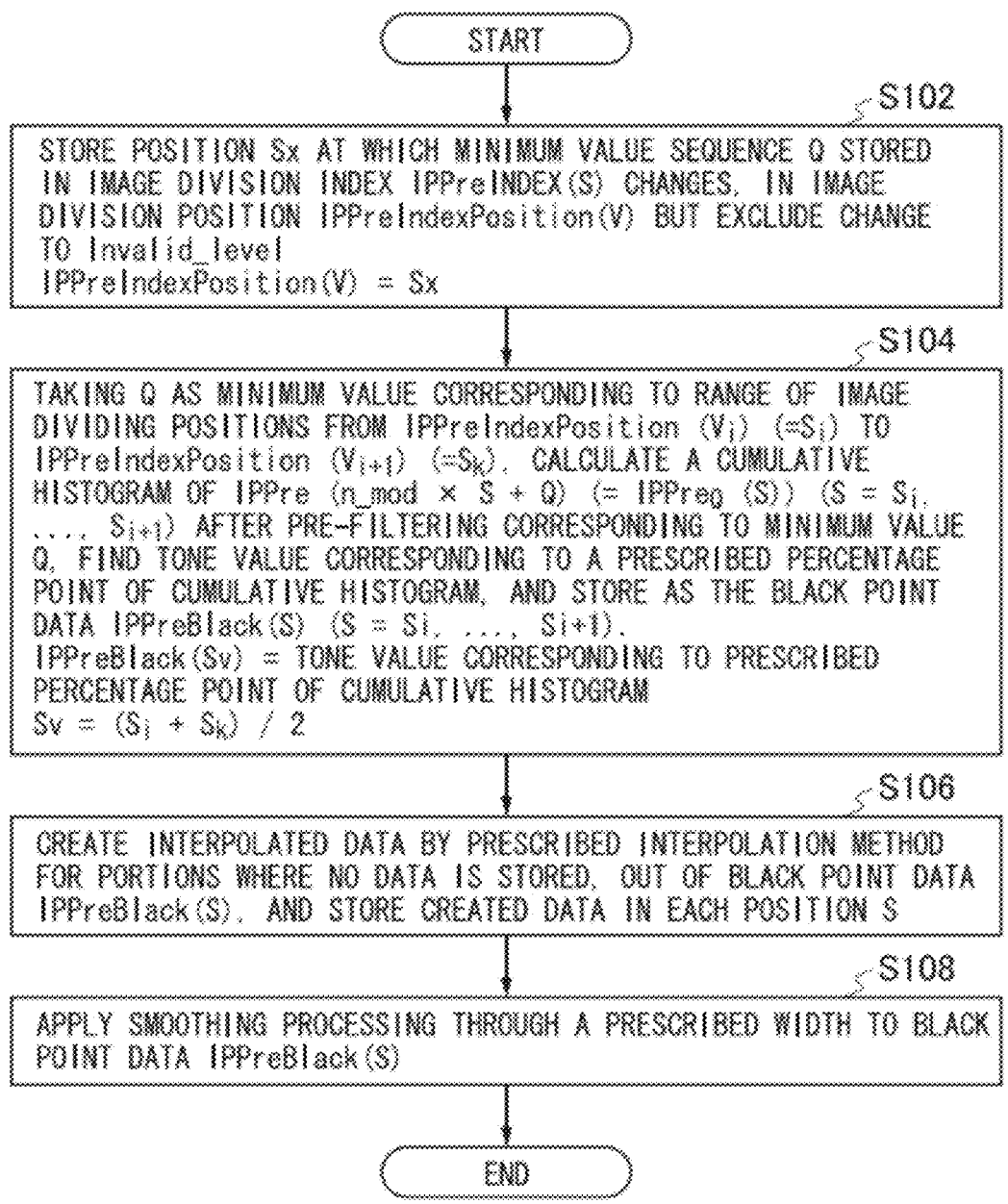
FIG. 35 is a flowchart of an image profile correction process.
Figure 36:
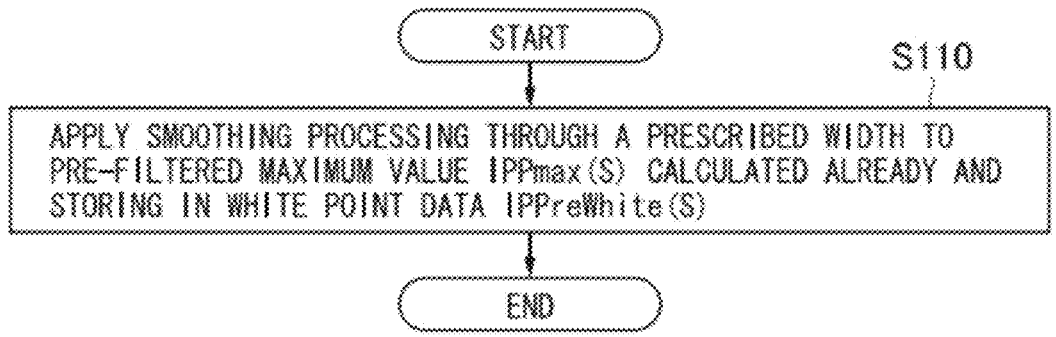
FIG. 36 is a flowchart of an image profile correction process.
Figure 37:
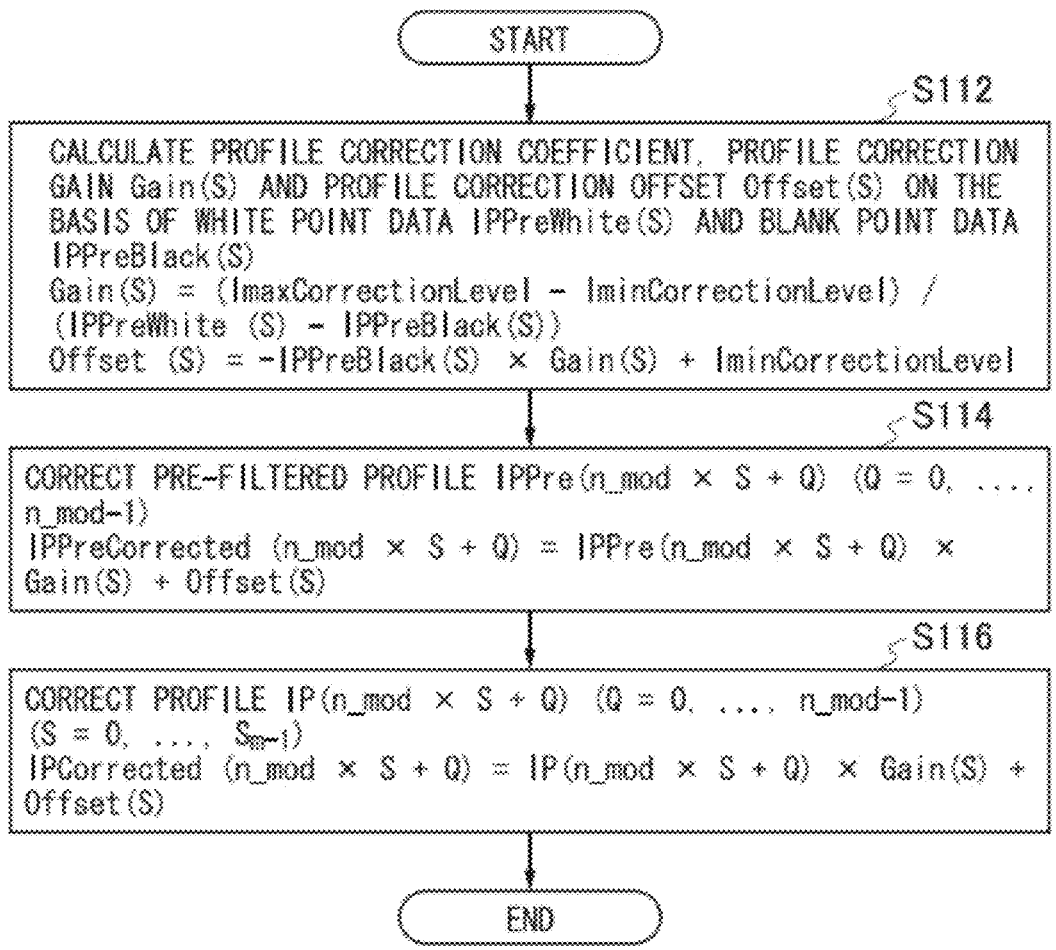
FIG. 37 is a flowchart of an image profile correction process.

FIG. 26 shows image profiles in a case where shading correction using the shading correction region 18 has not been performed. The upper part of FIG. 26 shows profiles of the original signals for each MOD sequence. In FIG. 26, there is variation in the tone value of the white background because shading correction has not been carried out. Furthermore, the data shown in FIG. 26 is obtained from a read image which is read out using an in-line sensor situated in the paper conveyance path of the inkjet printer, rather than using a flat-bed scanner as the reading apparatus. An in-line sensor is disposed so as to face the circumferential surface of a drum which serves as a device for holding and conveying a recording medium (paper), and the sensor reads in the test pattern on the paper in a state where the leading end portion of the paper is held on the drum by grippers (hook-shape claw) and the lower part of the paper is left unfixed (with the trailing end in a free state). In the image profile of the read image thus obtained (FIG. 26), the tone value corresponding to the white background varies with the X-direction pixel position, and the CTF (contrast transfer function) varies in the X direction depending on the characteristics of the reading apparatus (the lens characteristics, and so on), and therefore the tonal difference between the white background and black varies. The amount of variation in this case is corrected by correction processing which is described below (FIG. 35 to FIG. 37).

Figure 27:
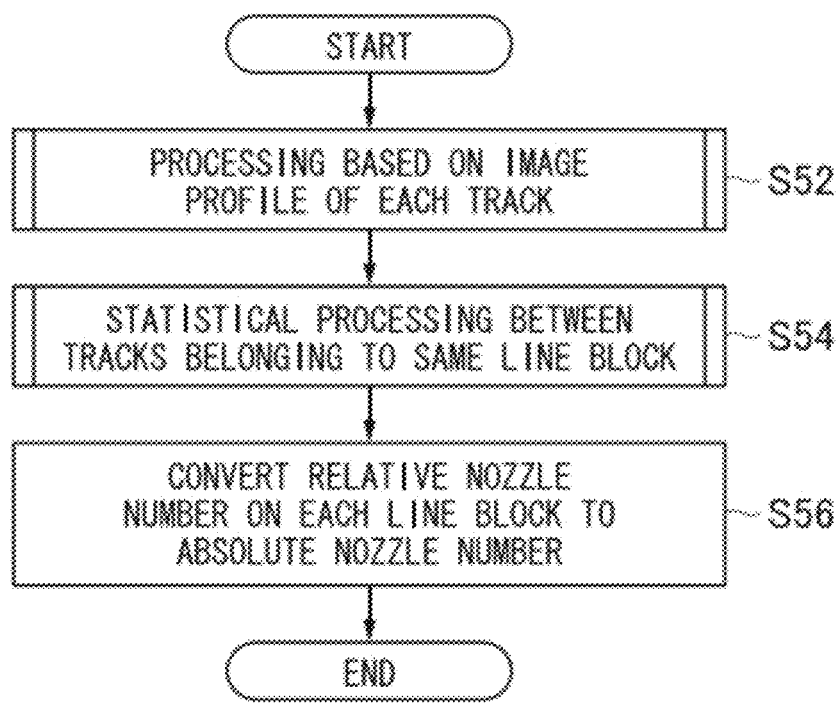
FIG. 27 is a flowchart of a defective ejection nozzle detection process based on an image profile.

FIG. 27 is a flowchart of a defective ejection nozzle detection process based on an image profile which is shown in step S26 in FIG. 18. When the process in FIG. 27 starts, firstly, processing is carried out on the basis of the image profiles of the respective tracks, and the test pattern (same lines) ejected from the same nozzles is analyzed in each track (step S52). The results for respective tracks belonging to the same line block are consolidated (statistical processing) (step S54), and the relative nozzle numbers in the line blocks are converted to nozzle numbers on the print head (absolute nozzle numbers) (step S56).

The reason why the same line pattern is calculated in a plurality of tracks (a plurality of tracks having different positions in the Y direction; in FIG. 23, four tracks) is because if skew occurs in the conveyance of the paper during printing and/or reading, then distortion occurs in the lines in the image, and the detection accuracy declines when the lines are averaged in the Y direction (if an image profile averaged in the Y direction through one block is created in this state).

By processing in very fine strip shapes in track units which divide the line blocks into a plurality of areas in the Y direction, as described in relation to FIG. 23, the effects of skewed travel decline, the external disturbance of the read nozzles, and the like, can be reduced at the same time, and therefore it is desirable to carry out detection based on a plurality of tracks.

Moreover, if it is possible to use a plurality of channels, as with K ink, then the detection process can be made even more resistant to external disturbances, by further inter-RGB statistical processing of the results obtained for the RGB channels.

Figure 28:
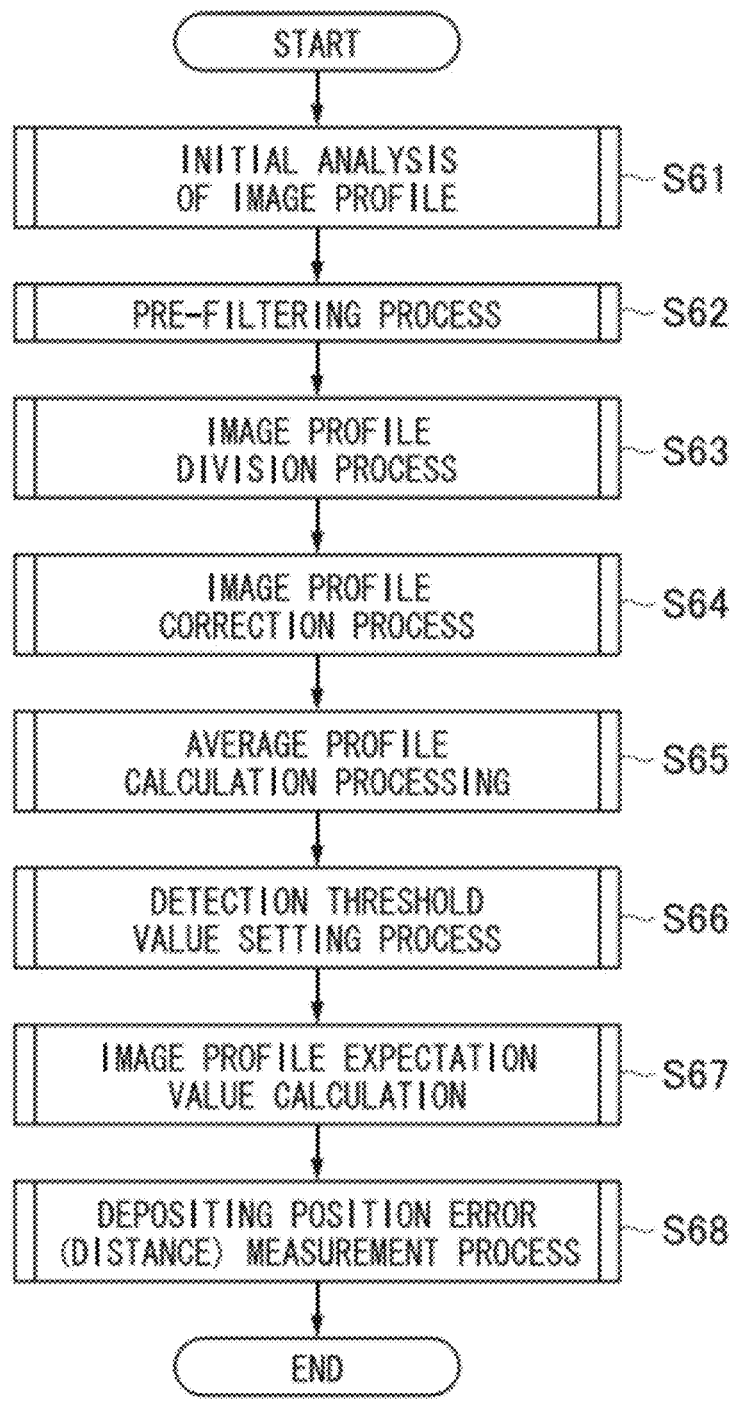
FIG. 28 is a flowchart of processing based on the image profiles of respective tracks.

FIG. 28 is a flowchart of the "processing based on the image profile of each track" which is shown in step S52 in FIG. 27. The flow in FIG. 28 includes an image profile initial analysis process (step S61), a pre-filtering process (step S62), an image profile division process (step S63), an image profile correction process (step S64), an average profile calculation process (step S65), a detection threshold value setting process (step S66), an image profile expected value calculation process (step S67) and a depositing position error (distance) measurement process (step S68).

The details of these respective processing steps (steps S61 to S68) are now described with respect to FIG. 29 to FIG. 46.

Image Profile Initial Analysis Process

Figure 29:
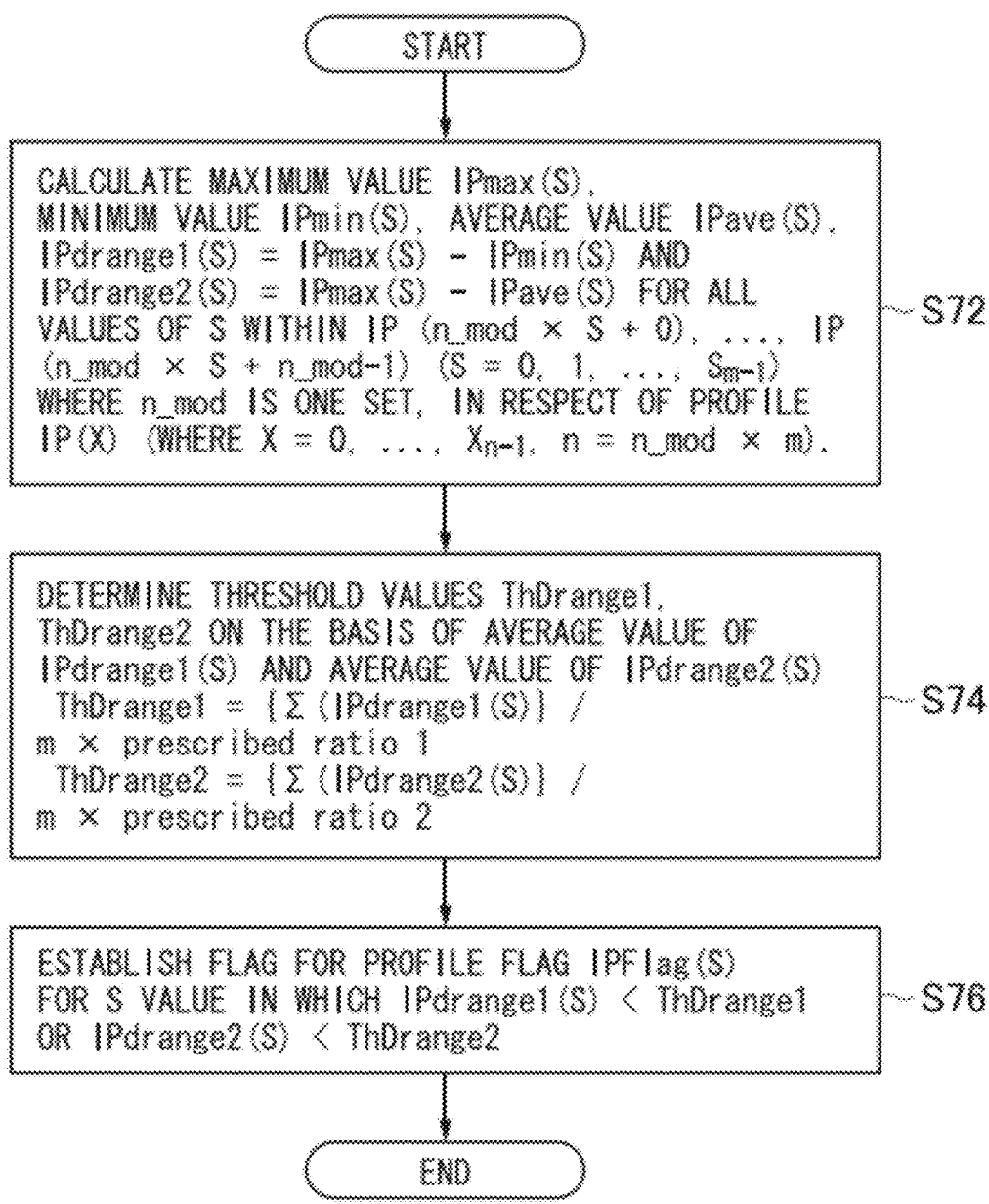
FIG. 29 is a flowchart of an image profile initial analysis process.

FIG. 29 is a flowchart of an image profile initial analysis process. This process is a preliminary process for excluding the read results of nozzles which are suffering ejection failure or which have excessively large depositing position error, in order to determine the image profile correction and image profile expected values more accurately.

The definition of the symbols used in this description of the processing is as follows. The image profile original data is called IP(X). X is the same pitch as the X coordinate on the image. The analysis pitch of the read image is n_mod (read pixel units). If the image profiles are analyzed at intervals of n_mod, then this is expressed by S. If the relative sequence in n_mod is expressed by Q (where Q is an integer from 0 to n_mod−1), then there is the relationship X=n_mod×S+Q. For example, if n_mod=4 [pixels], then Q is any one of {0, 1, 2, 3}.

Figure 30:
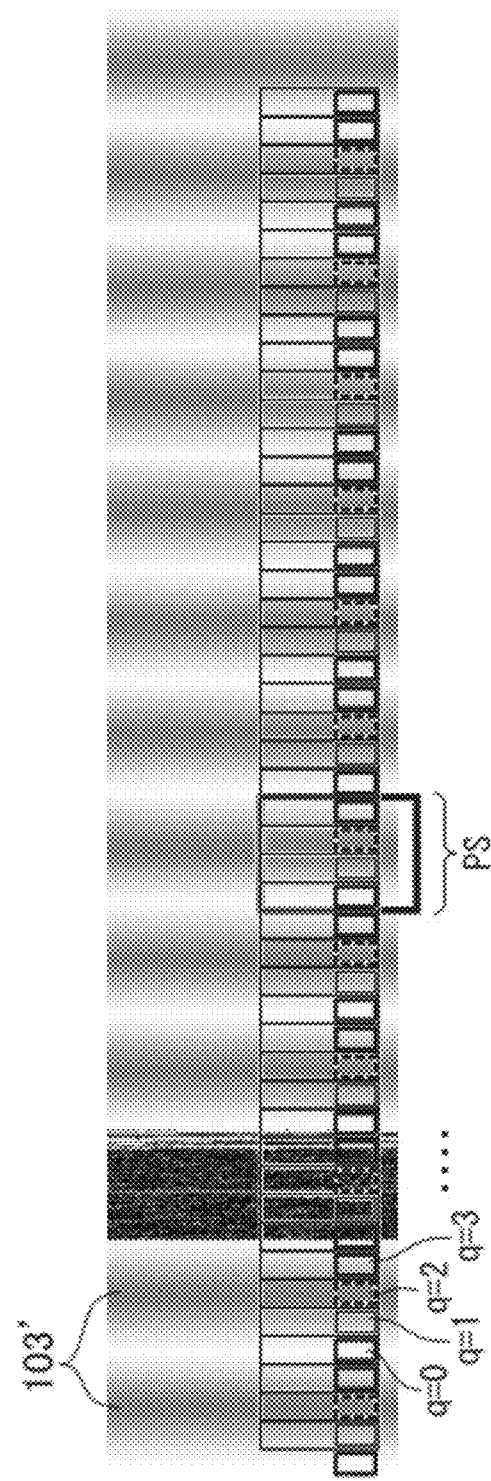
FIG. 30 is a diagram illustrating a relationship between read pixels, a group of read pixels (analysis pitch) and a line pattern.

FIG. 30 is a schematic drawing showing the relationship between the test pattern and the MOD sequences. Looking at the image profile in the analysis pitch n_mod [pixels], one analysis pitch (n_mod) always includes one set of a white background and a black value (line).

Therefore, it is possible to discover ejection failure approximately from the minimum value and the maximum value in n_mod. For instance, if the difference between the minimum value and the maximum value is smaller than a prescribed judgment reference value, it is judged that a black value (line) is missing (there is an ejection failure). Alternatively, it is also possible to discover an ejection failure approximately, in a similar fashion to the description given above, by using the average value in n_mod (in other words, the average value of the range of Q=0, 1, 2, . . . , n_mod−1 for the same S).

In the flow shown in FIG. 29, the maximum value IPmax(S), the minimum value IPmin(S) and the average value IPave(S) are calculated for IP (n_mod×S+0), . . . , IP (n_mod×S+n_mod−1) (S=0, 1, . . . , $S_{m-1}$), which is one set of IP values based on n_mod, for the profile IP(X) (where X= 0, . . . , $X_{n-1}$, n=n_mod×m, and m is an integer not less than 0), and the difference between the maximum value and the minimum value, IPdrange1(S), and the difference between the maximum value and the average value, IPdrange2(S), are determined for all values of S (step S72).

A threshold value ThDrange1 is specified by multiplying a prescribed ratio 1 by the average value of IPdrange1(S), and a threshold value ThDrange2 is specified by multiplying a prescribed ratio 2 by the average value of IPdrange2(S) (step S74). The values of the "prescribed ratio 1" and the "prescribed ratio 2" referred to here are coefficients for determining what values are to be set as threshold values with respect of the average value.

The threshold values ThDrange1 and ThDrange2 are compared with IPdrange1(S) and IPdrange2(S), and a profile flag IPFlag(S) is established in respect of any value of S which satisfies at least one of IPdrange1(S)<ThDrange1 and IPdrange2(S)<ThDrange2 (namely, in respect of a position which is inferred to be suffering ejection failure in a unit of a set of values based on n_mod) (step S76). This flag is used in the subsequent pre-filtering process (step S62 in FIG. 28; flowchart in FIG. 31).

In the present embodiment, judgment is made on the basis of the two inequality expressions IPdrange1(S)<ThDrange1 and IPdrange2(S)<ThDrange2, but judgment can also be carried out easily using either one of these expressions only.

Pre-Filtering Process

Figure 31:
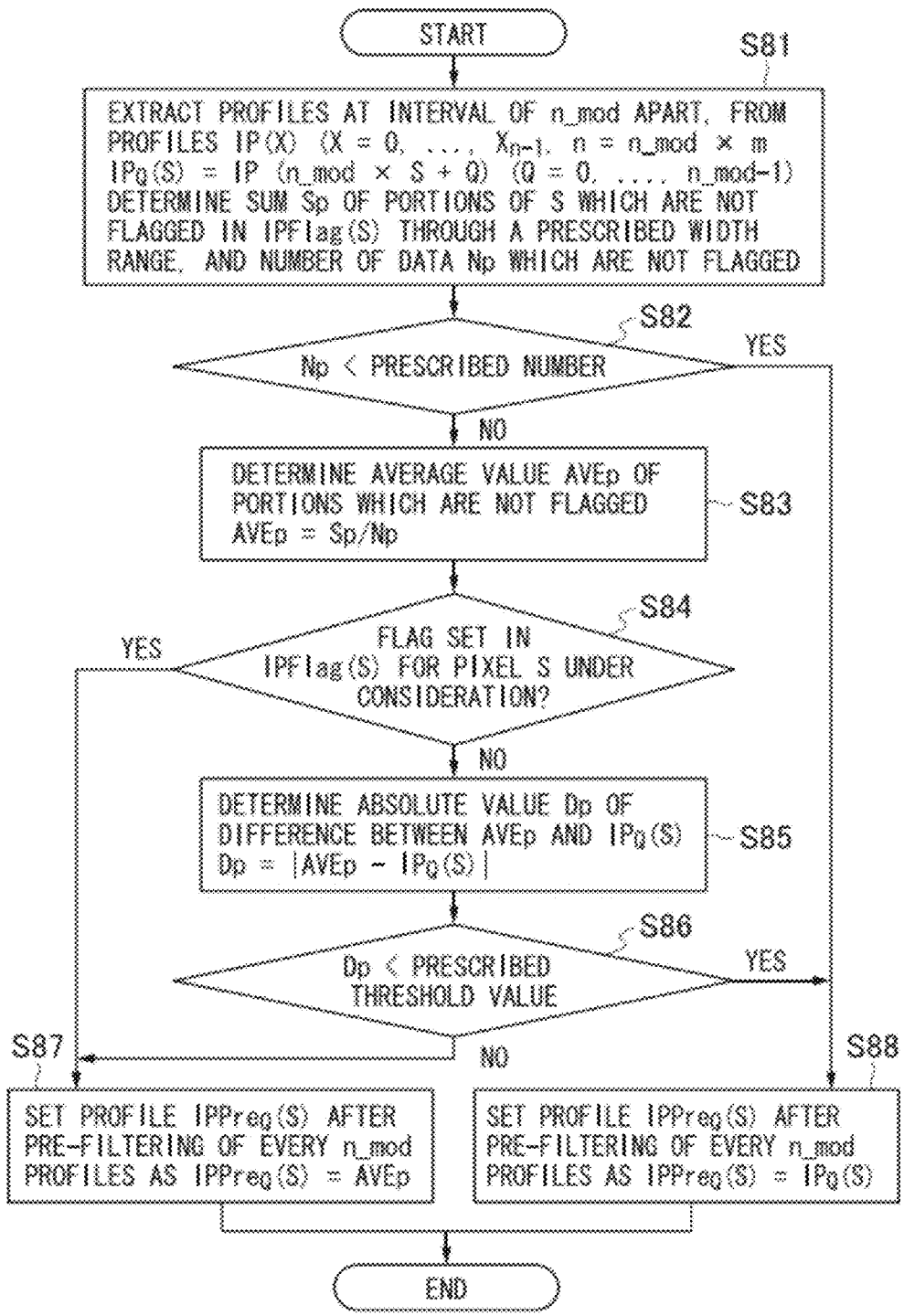
FIG. 31 is a flowchart of a pre-filtering process.

FIG. 31 is a flowchart of a pre-filtering process (step S62 in FIG. 28). This pre-filtering process is a process for excluding the read results of nozzles which are suffering ejection failure or which have large depositing position error, in order to determine the image profile correction and image profile expected values more accurately. Data for which a flag has been established (data which has been flagged) in the image profile initial analysis is excluded, and furthermore, the data is compared again with the peripheral average values and data substitution is carried out in respect of data which is greatly divergent from the average values, thereby excluding the effects of nozzles which have a large positional error. This processing is executed per MOD sequence. The contents of this processing involve analyzing data in a prescribed width centered on a pixel under consideration, by excluding data which has been flagged. Firstly, the profiles at intervals n_mod apart are extracted respectively, from the profiles IP(X), and divided into profiles IPQ(S)=IP (n_mod×S+Q) per MOD sequence (where Q=0, . . . , n_mod−1), and the sum Sp of the portions of S where a flag is not established in a prescribed range in IPFlag(S) is determined, together with the number of data elements Np which are not flagged (number of correct data) (step S81). The number of data Np which are not flagged are compared with a prescribed number (step S82), and if Np is greater than the prescribed number (NO judgment at step S82), then the average value AvEp=Sp/Np of the portions which are not flagged is calculated (step S83). It is judged whether or not the pixel under consideration S is flagged (step S84), and if the pixel is flagged, then the value of the pixel under consideration is replaced with the average value AvEp (step S87). In other words, the profile IPPre$_Q$(S) after this pre-filtering process is taken as AVEp.

On the other hand, in step S84, if the pixel under consideration is not flagged, then the absolute value Dp of the difference between the average value AvEp and IPQ(S) is found (step S85), and if this absolute value Dp=|AvEp−IPQ(S)| is greater than the prescribed threshold value (NO verdict at step S86), then similarly, the value of the pixel is also replaced with the average value (step S87).

In other words, the pixel value is replaced with the average value in cases where the pixel under consideration is flagged (where it is inferred from the image profile initial analysis that there is an ejection failure) or in cases where the value deviates greatly from the average value calculated about the periphery of the pixel under consideration (if there is large positional error or the effects of noise, etc.) (steps S84 to S87).

If the number of data Np which have not been flagged in step S82 is smaller than a prescribed number, then there are a large number of peripheral data elements which do not have an ejection failure, and therefore data replacement is not carried out (step S88). More specifically, the profile IPPre$_Q$(S) after the pre-filtering process of the profiles at intervals of n_mod is set as IPPre$_Q$(S)=IP$_Q$(S) (step S88).

Image Profile Division Process

Figure 32:
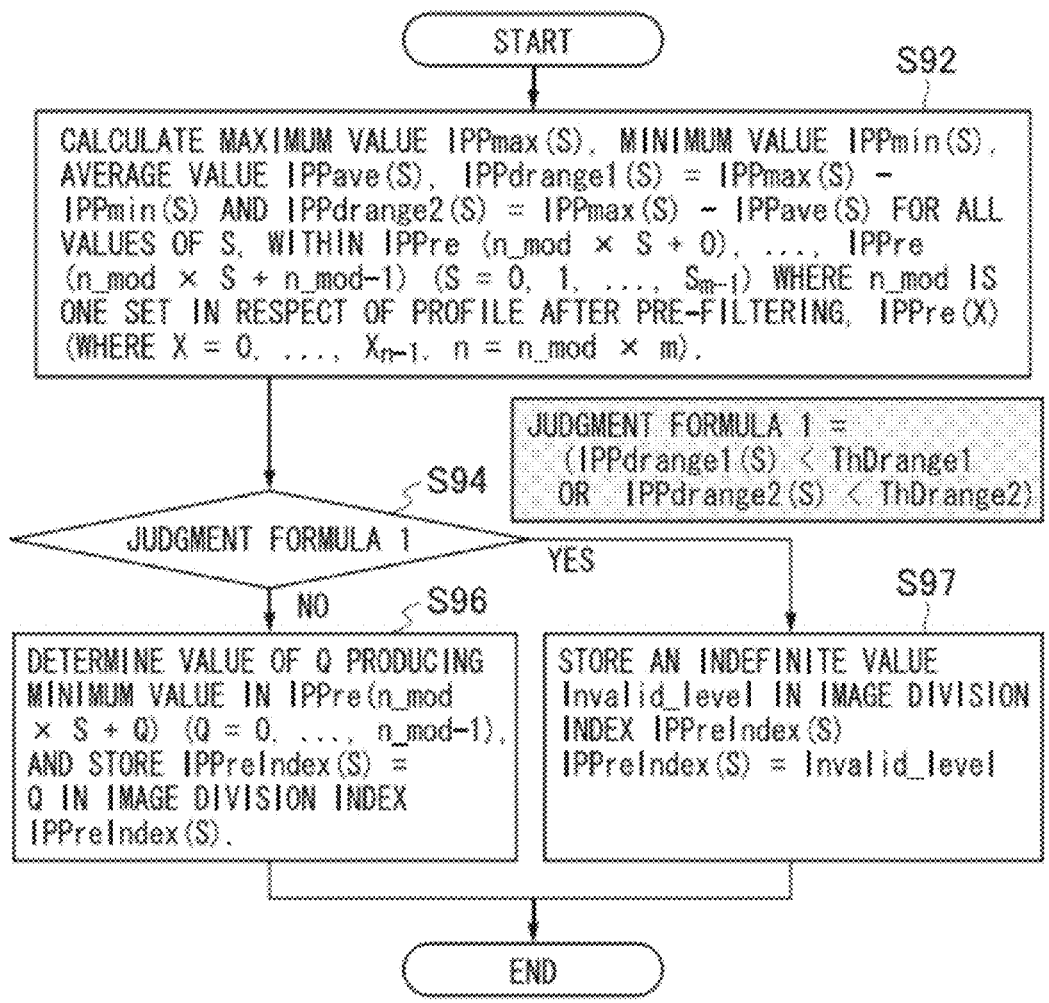
FIG. 32 is a flowchart of an image profile division process.
Figure 33:
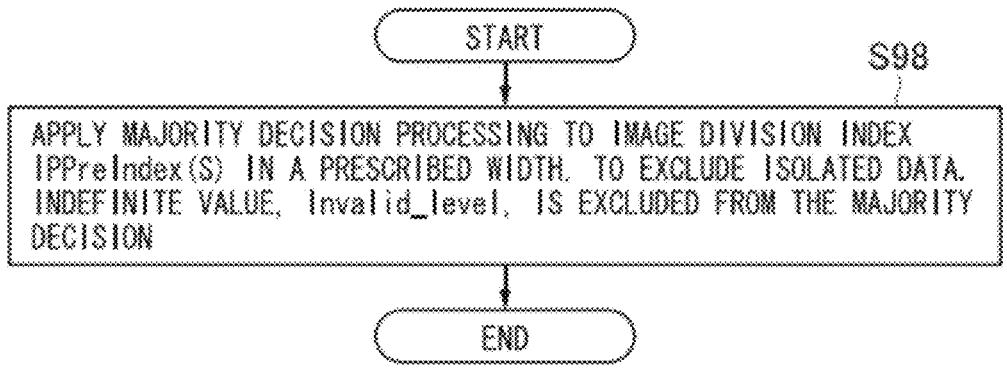
FIG. 33 is a flowchart of an image profile division process.

FIG. 32 is a flowchart of an image profile division process (step S63 in FIG. 28). The image profile division process is processing for specifying the range in which the sequence is switched, when the sequence having the smallest value, of the MOD sequences (4 sequences) illustrated in FIG. 25, changes according to a fixed sequence. In other words, this process specifies which sequence, of the MOD sequences, has read pixels that are closest to the actual line (the substantial of line). Since the darkest part of the sequence of four pixels (n_mod) is closest to the actual line, then it corresponds to specifying one pixel position among the four pixels. In this way, the range where each sequence becomes a minimum value is specified, and simultaneously, the positions where a minimum value cannot be specified (for example, where there is an ejection failure, large positional error, effects of noise, or the like; there is a possibility that this data is not excluded completely by the pre-filtering process) are identified.

When the flow shown in FIG. 32 is started, firstly, the maximum value IPPmax(S), the minimum value IPPmin(S) and the average value IPPave(S) are calculated, within IPPre (n_mod×S+0), . . . , IPPre (n_mod×S+n_mod−1) (S=0, 1, . . . , S$_{m−1}$), which is one set of IP values based on n_mod, for the image profile IPPre(X) after the pre-filtering process (where X=0, . . . , X$_{n−1}$, n=n_mod×m, and m is an integer not less than 0), and the difference between the maximum value and the minimum value, IPPdrange1(S), and the difference between the maximum value and the average value, IPPdrange2(S), are determined for all values of S (step S91).

The values of IPPdrange1(S) and IPPdrange2(S) are compared respectively with the threshold values ThDrange0 and ThDrange2, in accordance with the following Judgment Formula 1 (step S94).

Judgment Formula 1={IPPdrange1(S)<ThDrange1 or IPPdrange2(S)<ThDrange2}

If either of the inequalities in the Judgment Formula 1 is not satisfied (NO verdict at step S94), then the Q value which produces the minimum value of IPPre (n_mod×S+Q) (where Q=0, 1, . . . , n_mod−1) is determined (step S96), and this Q value is stored in the image division index IPPreIndex(S) (step S96).

At step S94, if at least one of the inequalities in Judgment Formula 1 is satisfied (YES verdict at step S94), then an indefinite value Invalid_level is stored in the image division index IPPreIndex(S) (step S97).

The index IPPreIndex(S) which stores the judgment result of the Judgment Formula 1 is obtained in this way. Thereafter, the procedure advances to the processing in FIG. 33, and majority decision processing is carried out on the basis of the change in characteristics after the minimum value sequence has continued for a fixed number of pixels in IPPreIndex(S) (step S98). In other words, a minimum value which occupies a majority of pixels in a prescribed width centered on the pixel under consideration (or in a particular window) is specified, and processing for replacing the value of the pixel under consideration with this majority minimum value is carried out. By means of this processing, data including an ejection failure or large positional error, or the effects of noise, etc. (isolated data which produces a sudden replacement of an indefinite value or minimum value) which has not been removed completely by the pre-filtering process described above is excluded, and the minimum values (dividing positions) of the image profiles can be determined accurately. In the majority decision process in step S98, the indefinite value Invalid_level is excluded.

Since the image profiles are divided by focusing on the minimum value of each MOD sequence in this way, it is possible readily to ascertain which position in the image analysis unit (n_mod) (the position expressed by Q) is closest to the line center. By successively chasing this pixel position closest to the line center, it is possible to accurately determine the relationship between the nozzle number in one block and the pixel position (see FIG. 30).

Figure 34:
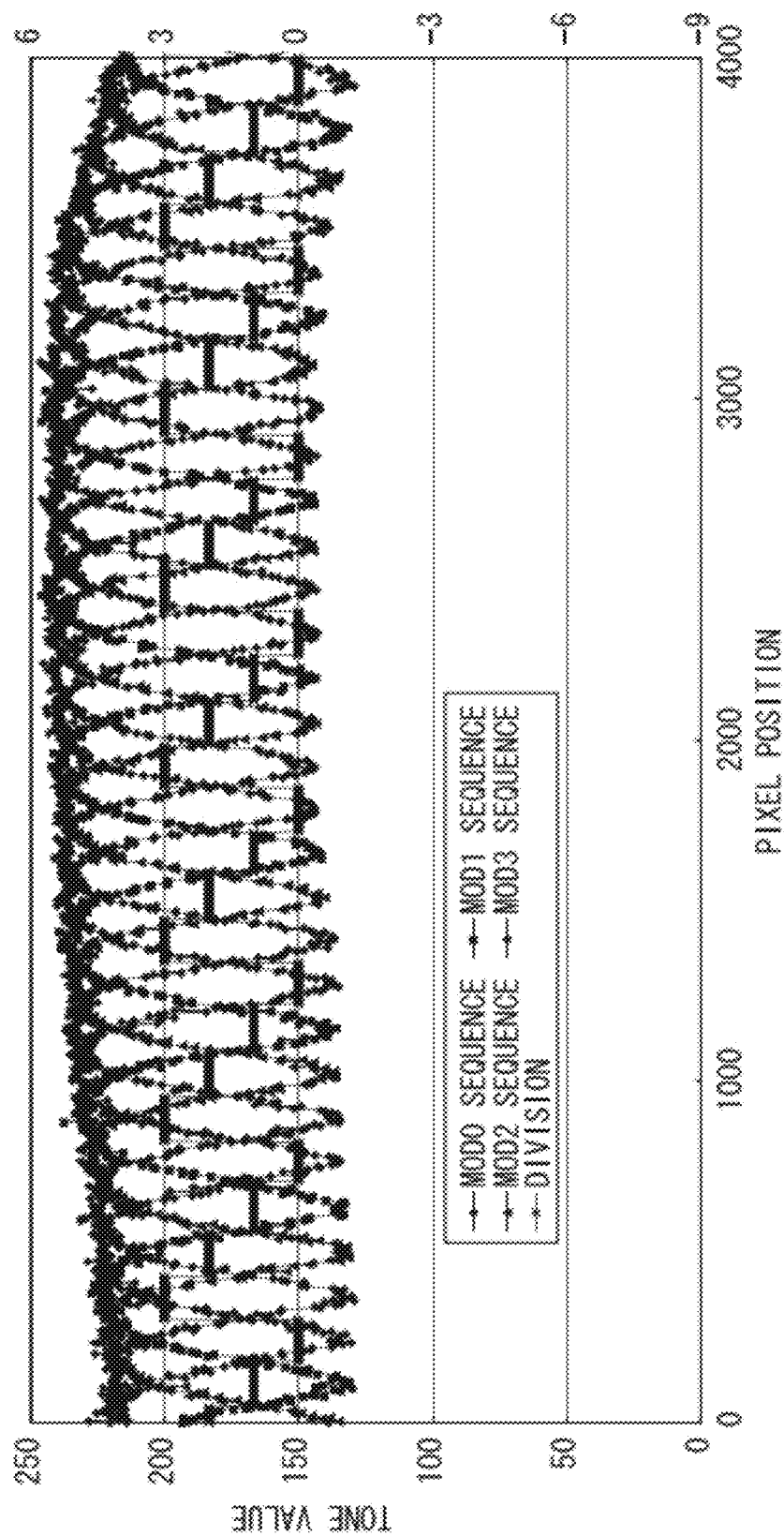
FIG. 34 is an illustrative diagram of a pre-filtering process for each MOD sequence and a profile division process based on a minimum value.

FIG. 34 is a diagram showing results of dividing up the image profiles. FIG. 34 also shows the Q value (left-side vertical axis) of the MOD sequence which produces the minimum value. The turning point of the MOD sequence producing the minimum value (the point where the Q value changes) indicates the dividing position.

Image Profile Correction Process

FIG. 35 to FIG. 37 are flowcharts of an image profile correction process. This process corrects variation of the white background tone value in the X direction and the CTF variation in the X direction (the difference between the white background tone value and the black tone value) in the read image.

Firstly, the distribution of the black tone in the X direction is determined. In one range obtained by dividing the image profile, the minimum value of the tone value in the sequence producing the minimum value correlates to the CTF. At step S102 in FIG. 35, the image profile division range is determined from the turning point of the image division index IPPreIndex(S) (the turning point of the MOD sequence Q which changes in a step fashion in FIG. 34). In other words, a position Sx where the minimum value sequence Q stored in the IPPreIndex(S) changes is stored as an image dividing position IPPreIndexPosition(V) (step S102). Here, change to an Invalid_level is excluded from the processing.

Next, in step S104, the minimum value sequence Q in the divided range is determined. In this case, if the minimum value is simply determined in the image profile after the pre-filtering process, then the correction accuracy is low if there is an ejection failure, or the like, in that portion, and therefore the histogram in the divided region is calculated, and the cumulative percentage point close to the black tone is treated as the tone value corresponding to the minimum value. In other words, the representative point corresponding to black is specified. More specifically, the tone value corresponding to the aforementioned cumulative percentage point is made to correspond to the center of the divided range (Sv=(Si+Sk)/2) (step S104), and black tone value correspondences are calculated by interpolation processing for the other positions, in order to find the X-direction distribution (step S106). The change in the black tone is a result of the light quantity distribution and the sensor CTF (principally caused by the lens), and therefore has a low-frequency distribution. Consequently, a smoothing process is also carried out (step S108).

Looking at this another way, it is possible to measure the CTF distribution of the reading apparatus by reading in a test pattern created with a fixed line density.

In step S104, if the minimum value corresponding to the range of the image dividing positions from IPPreIndexPosition (Vi) (=Si) to IPPreIndexPosition (Vi+1) (=Sk) is taken to be Q, then a cumulative histogram of IPPre (n_mod×S+Q) (=IPPre$_Q$ (S)) corresponding to the minimum value Q after pre-filtering is calculated (S=Si, . . . , Si+1), and a tone value corresponding to a prescribed percentage point of the cumulative histogram is found and is stored as the black point data IPPreBlack(S).

In this case, the tone value corresponding to the prescribed percentage point of the cumulative histogram (the representative value equivalent to black) is stored as the black point data IPPreBlack (Sv) of the center of the range of divided positions from Si to Sk, namely, Sv=(Si+Sk)/2.

At step S106, interpolated data is created by a prescribed interpolation method for the portions where data has not been stored in the black point data, IPPreBlack(S), and this data is stored in association with each position S.

At step S108, the IPPreBlack(S) values obtained as described above are subjected to a smoothing process over a prescribed width, so as to obtain a smooth distribution.

Next, the distribution of the white background tone in the X direction is determined. FIG. 36 is a flowchart of processing for determining the distribution of the white background tone. The maximum value data IPPmax(S) in the n_mod unit after the pre-filtering process which is calculated previously in step S92 of the image profile division process (FIG. 32) reflects the white background read result, and therefore the white background distribution is obtained by applying a smoothing process to this data, through a prescribed width (step S110 in FIG. 36). More specifically, the results of the smoothing process are stored in the white point data, IPPreWhite(S).

FIG. 37 is a flowchart of a process for correcting the image profile by using the black point data obtained by the process in FIG. 35 and the white point data obtained by the process in FIG. 36. In the flowchart in FIG. 37, target values I max Correction Level and 1 min Correction Level are set respectively for the white background tone value and the black tone value at each position, in such a manner that each tone value has a uniform value after the correction process, a correction coefficient Gain(S) and an Offset(S) for linearly correcting the tone value are calculated (step S112), and the image profile IPPre(X) after the pre-filtering process and the original image profile IP(X) are corrected (steps S114 and S116).

In step S112, the profile correction gain Gain(S) (multiplication coefficient) for profile correction and the profile correction offset Offset(S) (constant for addition) are calculated by the following formula, from the white point data IPPreWhite(S) and the black point data IPPreBlack(S).

Gain(*S*)=(*I*maxCorrectionLevel−*I*minCorrectionLevel)/(IPPreWhite(*S*)−IPPreBlack(*S*))

Offset(*S*)=−IPPreBlack(*S*)×Gain(*S*)+*I*minCorrectionlevel

At step S114, the profile after the pre-filtering process IPPre(n_mod×S+Q) (Q=0, . . . , n_mod−1) is corrected on the basis of the following formula, using the profile correction coefficients (Gain(S), Offset(S)) determined at step S112.

IPPreCorrected(*n*_mod×*S*+*Q*)=IPPre(*n*_mod×*S*+*Q*)×Gain(*S*)+Offset(*S*)

At step S116, the original image profile IP(n_mod×S+Q) (Q=0, . . . , n_mod−1) is corrected on the basis of the following formula.

IPCorrected(*n*_mod×*S*+*Q*)=IP(*n*_mod×*S*+*Q*)×Gain(*S*)+Offset(*S*)

Figure 38:
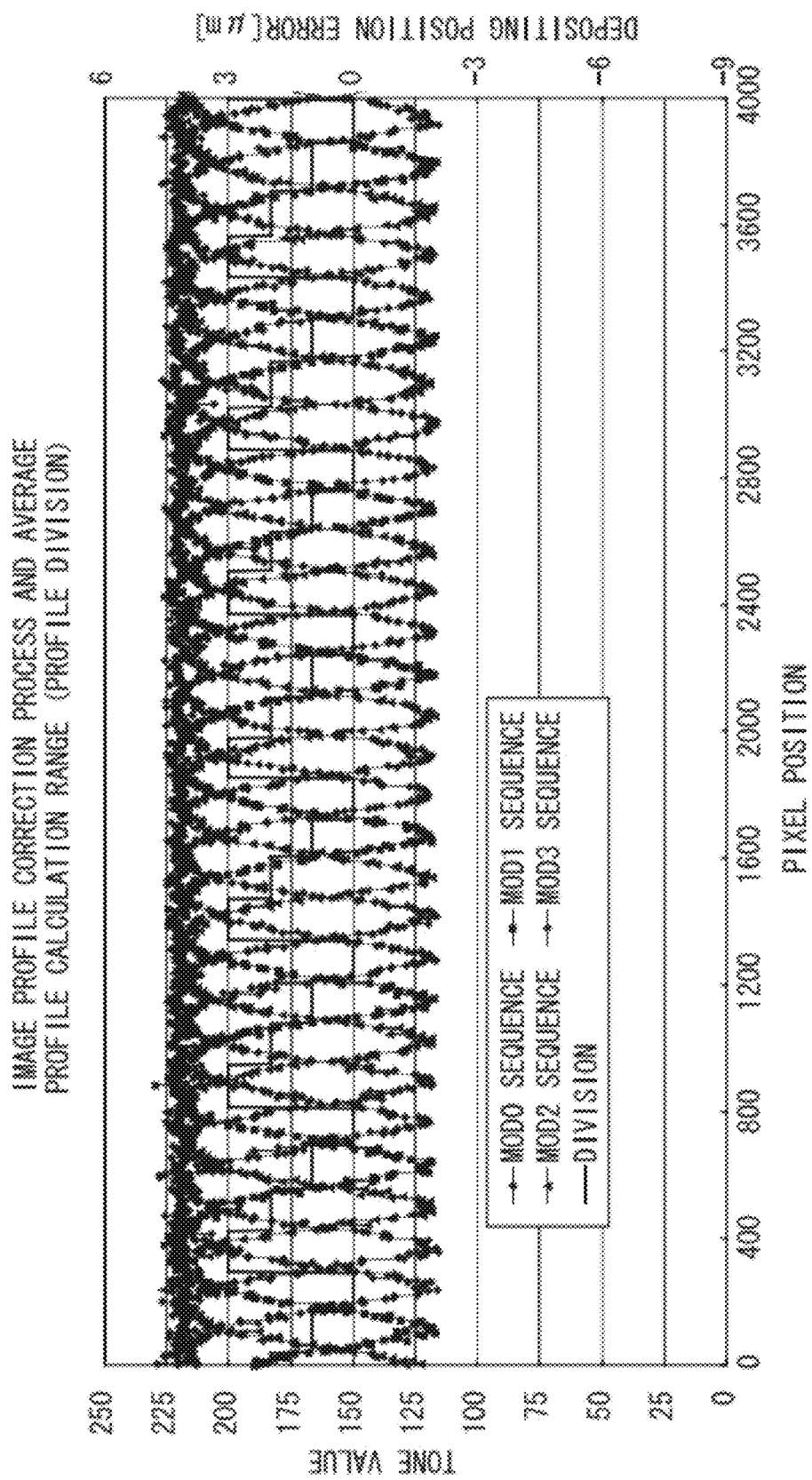
FIG. 38 is an illustrative diagram of an image profile correction process and an average profile calculation range.

By carrying out the correction process in FIG. 37, a profile is obtained in which the white levels and the black levels are roughly aligned to uniform levels, as shown in FIG. 38.

Average Profile Calculation Process

Figure 39:
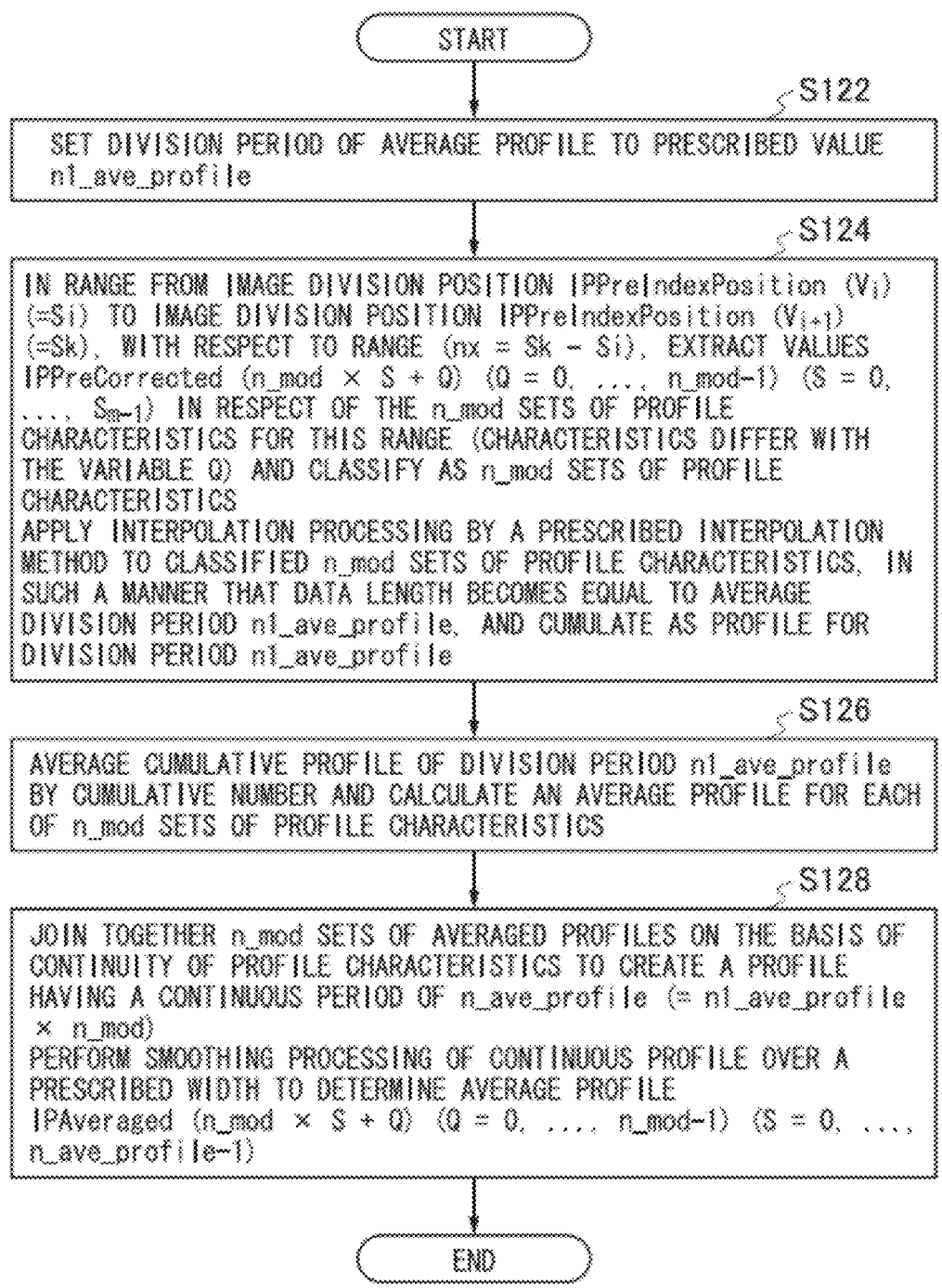
FIG. 39 is a flowchart of an average profile calculation process.

FIG. 39 is a flowchart of an average profile calculation process. The object of this processing is finally to obtain a smooth profile which is called an "expected value curve".

The indefinite value, Invalid_level, which is determined to correspond to ejection failure, and the like, in the pre-filtering process gives rise to a decline in accuracy when the image profile expected value is calculated, and therefore it is necessary to find a substitute value. Furthermore, when the expected value is calculated at the end of the image profile, then a proxy value is required since there is no preceding data. An average profile is used as basic data for determining this substitute value or proxy value. The average profile is calculated as the average characteristics of the image profile.

FIG. 39 shows a process for obtaining an average profile. In the divided range obtained by dividing the image profile, virtually the same variation in characteristics occurs continuously when the MOD sequence is changed sequentially. Using these properties, the n_mod corrected and pre-filtered profiles in the image profile division units (in the divided ranges) are successively accumulated.

Figure 40:
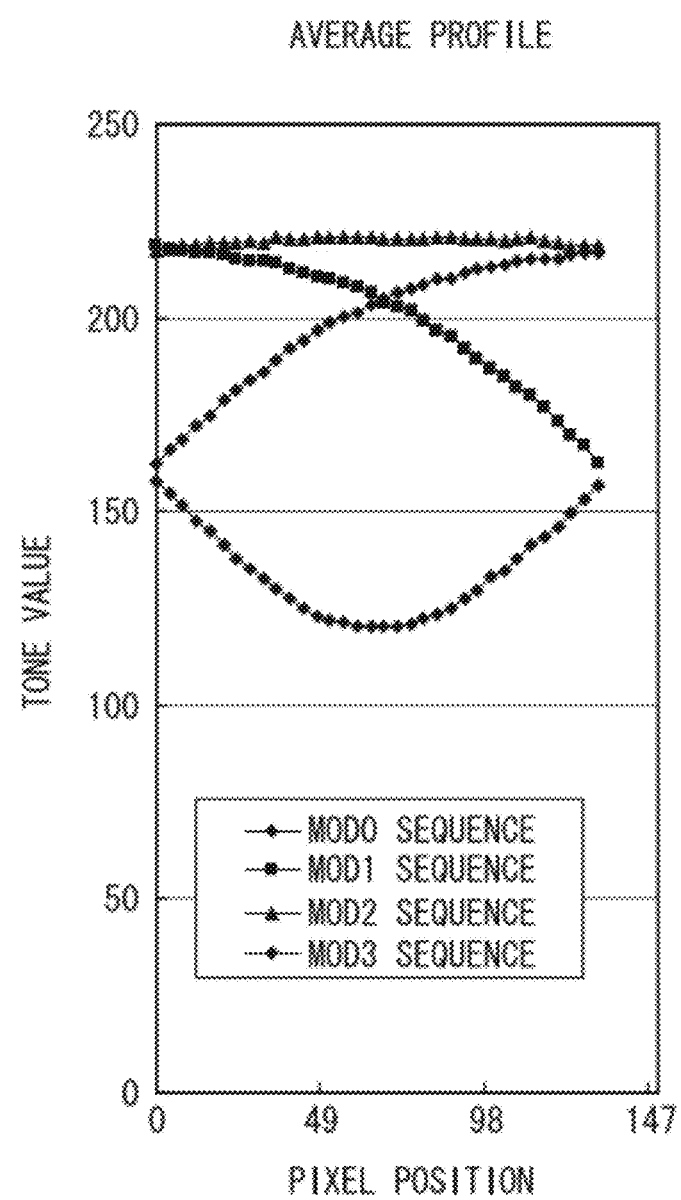
FIG. 40 is a diagram showing elements of respective sequences of an average profile.

FIG. 40 shows an example of average profiles obtained by the flow in FIG. 39.

One sequence (shown as the MOD0 sequence in FIG. 40) is a downwardly protruding curve (concave curve) having a minimum point which indicates a minimum value. Another sequence (shown as the MOD1 sequence) falls to the right, another sequence (shown as the MOD2 sequence) rises to the right, and the remaining sequence (shown as the MOD3 sequence) is a roughly flat curve which shows little change.

As it can be seen from FIG. 38, the profile for each MOD sequence is obtained by arranging the average profiles of four types shown in FIG. 40 in sequence, and progressively interchanging the sequences. The basic profile waveform (shape)

is common in each sequence. In other words, a profile waveform is obtained in which the sequences are interchanged and linked in the order MOD0 sequence→>MOD 3 sequence→MOD2 sequence→MOD1 sequence→MOD0 sequence . . . , as shown in FIG. 40.

In addition, there are respective localities in the X-direction length (oscillation width). The cause of the localities is the presence of in-plane localities in the reading resolution. The average value (average profile) is calculated cumulatively, in such a manner that the locations of extension and contraction coincide to a certain extent in the X direction, in accordance with the localities.

More specifically, the number of pixels in an image profile division unit (divided range) in one direction is not uniform. If there is no change in the reading resolution in the X direction, then the number of pixels in the image profile division unit is uniform, but in an actual reading apparatus, the number of pixels in the image profile division units shows fluctuation as a result of the lens design and the reading conditions (floating of the paper, etc.).

From another perspective, since the number of pixels in the division units of the image profile reflects the X-direction resolution distribution, then the true resolution distribution of the reading apparatus can be investigated easily by carrying out reading with reduced external factors, such as floating of the paper. The number of pixels in the division unit of the image profile is inversely proportional to the pitch difference between the reading side and the printing side, and therefore the distribution of resolution change in one plane can be determined easily. Furthermore, if the pitch on the printing side is accurate, then an extremely accurate resolution can be determined.

Interpolation is carried out in order to absorb differences between the number of pixels of the image profile division units and the division period of the average profile, and then a cumulative calculation is performed.

In FIG. 38 and FIG. 40, since the reading pitch is larger than the printing pitch, the minimum value sequence Q successively becomes smaller by 1 (the MOD sequence changes in the order 3→2→1→0→3→2 . . . ). This is because the reading pitch is high and therefore the printing line position is displaced relatively in the negative X direction.

Furthermore, the profile characteristics constitute one period of change in the profile characteristics, in which the average profiles described in relation to FIG. 40 are arranged sequentially in the order "0" (MOD4)→"3" (MOD4)→"2" (MOD4)→"1" (MOD4). From the characteristics described above, it is possible to accumulate the values for each of the different profile characteristics, on the basis of the minimum sequence Q.

More specifically, if (P−Q)MOD(n_mod) is calculated in each sequence P (P=0, . . . , n_mod−1), then the minimum value sequence Q is 0, Q+1 is 1, . . . , and since the suffix forming an index can be calculated for the same characteristics, then the respective profiles can be distinguished readily. A smooth average profile is obtained by linking and averaging the average profiles.

To give an explanation based on the flow in FIG. 39, at step S122, the division period of the average profile is set to a prescribed value n1_ave_profile.

At step S124, in the range from the image division position IPPreIndexPosition ($V_i$) (=Si) to the image division position IPPreIndexPosition ($V_{i+1}$) (=Sk), the values IPPreCorrected (n_mod×S+Q) (Q=0, . . . , n_mod−1) (S=0, . . . , $S_{m-1}i$) are extracted in respect of the n_mod sets of profile characteristics for this range (nx=Sk−Si) (the characteristics differ with the variable Q), and are classified as the n_mod sets of profile characteristics. Interpolation based on a prescribed interpolation method is applied to the n_mod sets of profile characteristics thus classified, in such a manner that the data length becomes equal to the average division period, n1_ave_profile, and the values are cumulated as the profile of the division period n1_ave_profile.

At step S126, the cumulative profile obtained at step S124 is averaged by the cumulative number, and a profile averaged per the n_mod sets of profile characteristics is calculated. By means of this processing, average profiles of n_mod species, such as those shown in FIG. 40, are obtained.

At step S128 in FIG. 39, a continuous profile having a period of n_ave_profile (=n1_ave_profile×n_mod) is created by sequentially joining together the profiles on the basis of the continuity of the n_mod types of average profile characteristics obtained at step S126. This continuous profile is applied to a smoothing process over a prescribed width and an average profile IPAveraged (n_mod×S+Q) is determined.

Detection Threshold Value Setting Process

Figure 41:
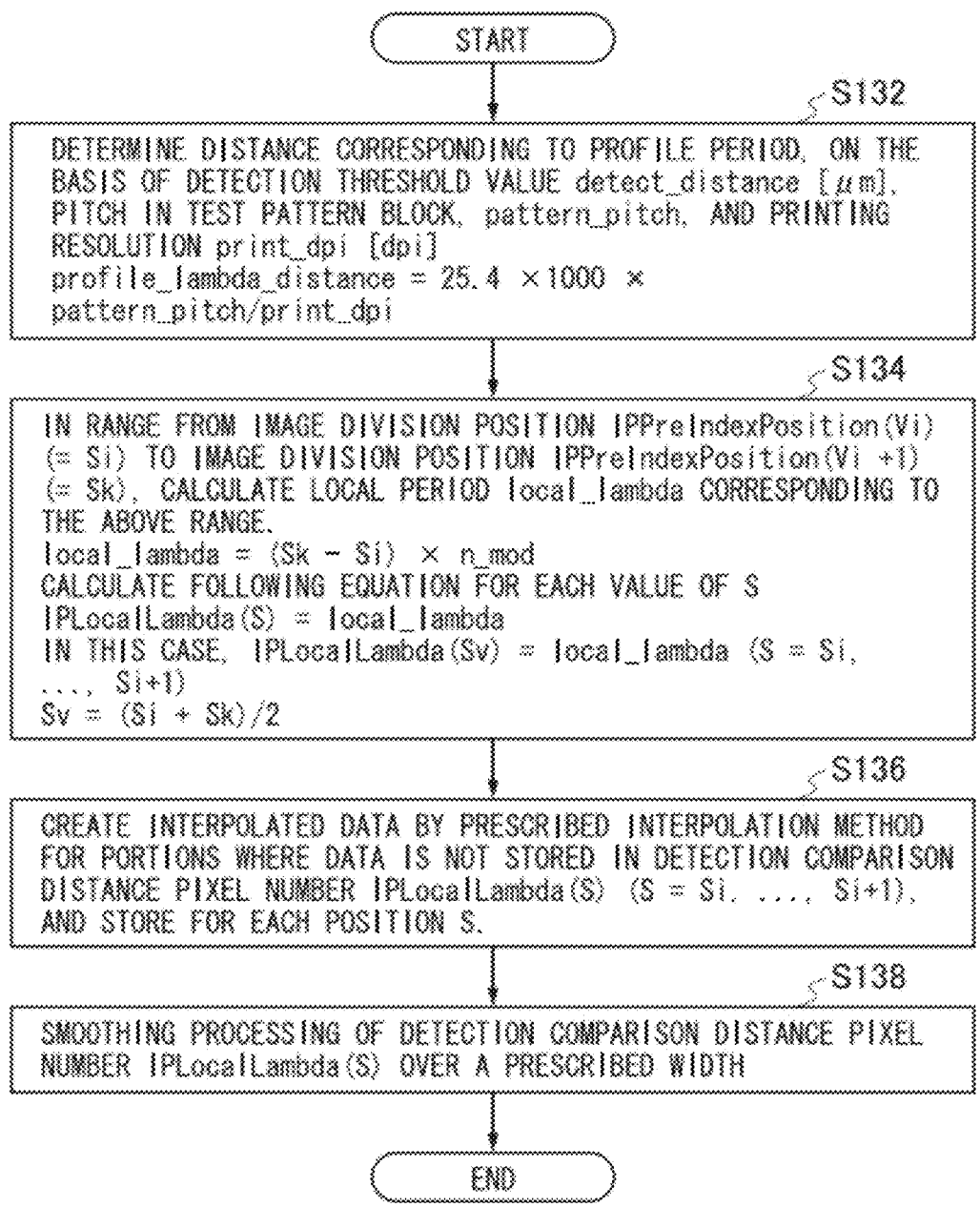
FIG. 41 is a flowchart of a detection threshold value setting process.

FIG. 41 is a flowchart of the detection threshold value setting process. Firstly, the concept of this processing is described.

[1] When the minimum value sequence $Q_0$ has cycled and returns again to the same value $Q_0$, then the difference between the read analysis pitch and the printing pitch accumulates and corresponds to a case where the analysis pitch is precisely equal to the printing pitch. If n_mod divided units of the image profile are compiled (in the present example, this corresponds to four MOD sequences), this forms exactly one cycle. In the embodiment, this one period or cycle corresponds to the printing pitch (in the case of 1-on, 9-off, 211.6 μm).

[2] The image profile changes in accordance with S within the same sequence, but this change corresponds to change in the read results due to the print lines which are arranged at the printing pitch (in the present embodiment, every 10 nozzles) being displaced by an approximate pitch differential (in the present embodiment 1.33 μm, although this value only has a certain level of accuracy, because in actual practice, the resolution of the reading apparatus varies in the X direction).

In other words, in actual practice, line blocks comprising lines arranged regularly at substantially uniform intervals are read in read pixels of 53.2 μm, but looking at a profile of a particular MOD sequence, the pixels adjacent to the darkest pixel (the pixel giving the minimum value) of the profile are read out as one pixel at positions which are displaced by approximately 1.33 μm, in another line. The pixels adjacent to these are read as one pixel at positions which are displaced by approximately 1.33 μm×2, in yet another line. When exactly one period has been completed, the value returns to the original minimum value. In other words, this means that although data for a line block is input, looking in particular at the repetition cycle of the MOD sequence, it is possible to acquire data corresponding to a profile of one line.

[3] If it is supposed that the printing side is accurate, then the number of pixels corresponding to one period in [1] corresponds to the printing pitch (in the case of a 1-on, 9-off pattern, 211.6 μm), and can be substituted with the detection distance (15 μm, for example).

Converted pixel number=number of pixels in one period×detection distance/printing pitch    Conversion formula The "converted pixel number" is a distance (number of pixels) in the profile.

In other words, one period 211.6 μm is associated with the number of pixels in one period (in the present embodiment, 159 pixels), and the expected value of the read signal when the position is displaced, for instance, by 15 µm (detection distance) from the original position, can be determined from the average profile. Stated alternatively, it can be seen that, if the value of the read signal changes by a quantity, namely, a brightness value, then the value is displaced by several µm from the value of the average profile.

[4] The tone value of the image profile after displacement in the X direction by the converted pixel number (the ideal read result rather than the actual read result) is regarded as the tone value corresponding to a reading which has been displaced accurately by the detection distance on the printing line.

[5] Looking in particular at a tone value (ideal read result) of the pixel position under consideration and a tone value (ideal read result) of a position displaced by the converted pixel number, it is possible to judge what level of difference between the ideal tone value and the actual read tone value, in which the tone value changes with the positional error of the pixel position under consideration, corresponds to the detection distance.

In summary, the average profile of one period is treated as the expected value of the profile of one line, and change in the brightness value (tone value) is associated with displacement of the line position (depositing position error). Since the detection threshold value is specified from the profile of expected values in this way, it is possible to specify a highly accurate and extremely robust detection threshold value which is not affected by change in the resolution of the reading apparatus in the X direction (localities, intrinsic differences), and which is not affected by the characteristics of the printing ink (the ink density, ink spreading, and the optical dot gain produced by the combination of the ink and paper).

By carrying out the image profile correction which has been described above, it is possible to achieve detection which is robust with respect to change in the CTF of the reading apparatus (localities, intrinsic differences), and with respect to the tonal characteristics of the reading apparatus.

Furthermore, the average profile characteristics (the profile change in one period) reflect the printing ink characteristics (the ink density, the ink spreading and the optical dot gain produced by the combination of the ink and paper), and therefore it is also possible to measure the profile of a printed line accurately with an extremely low resolution.

To describe the contents of the process, the division positions and divided range of the image profile are found, and then the divided range is multiplied by n_mod, and an offset pixel number is calculated from the equivalent of one period of the central position of the divided range (steps S132, S134). A smooth offset pixel number is obtained by applying interpolation and smoothing to the other positions S (step S136, S138).

This process is described in detail in accordance with the respective steps of the flowchart in FIG. 41.

At step S132, the distance profile_lambda_distance corresponding to the profile period is determined by the following equation, on the basis of the threshold value, detect_distance [µm] of the distance (detection distance) that is to be detected, the pitch in the test pattern block, pattern_pitch, and the printing resolution, print_dpi [dpi].

$$\text{profile\_lambda\_distance} = 25.4 \times 1000 \times \text{pattern\_pitch} / \text{print\_dpi}$$

At step S134, a corresponding local period, local_lambda, is calculated for the range from the image division position IPPreIndexPosition ($V_i$) (=Si) to the image division position IPPreIndexPosition ($V_{i+1}$) (=Sk). The following equation is calculated for each value of S in the local period, local_lambda=(Sk−Si)×n_mod.

$$\text{IPLocalLambda}(S) = \text{local\_lambda}$$

In this case, the equation is made to correspond to the value of the central position of the range Sv=(Si+Sk)/2, and the calculation result for local_lambda=(Sk−Si)×n_mod is stored. In other words, IPLocalLambda(Sv)=local_lambda (S=Si, . . . , Si+1).

At step S136, interpolated data is created by a prescribed interpolation method for the portions (the portions other than Sv) where data has not been stored in the detection comparison distance pixel number, IPLocalLambda(S), and this data is stored for each position S.

Figure 42:
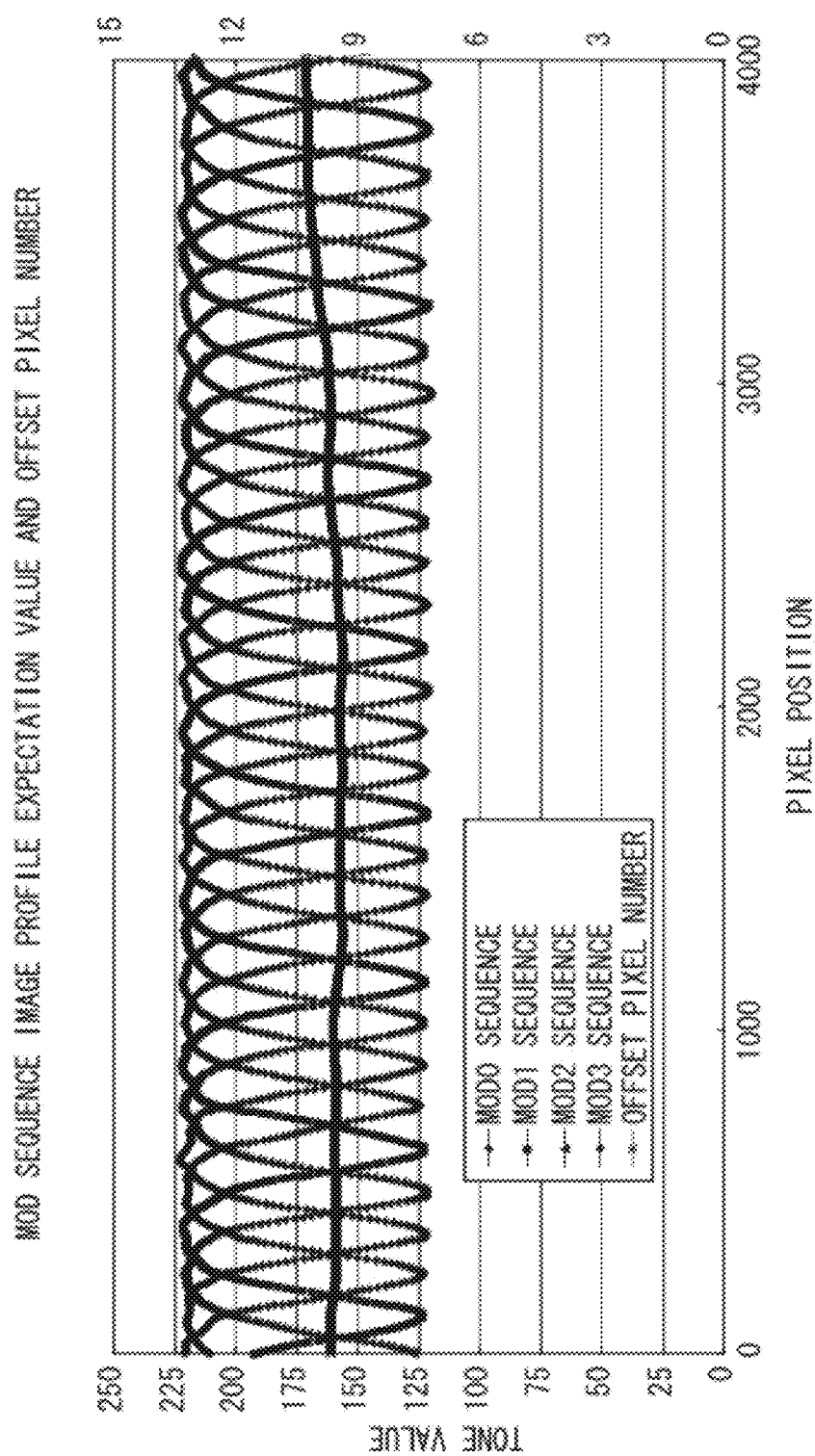
FIG. 42 is an illustrative diagram of a MOD sequence expected value profile and a detection offset pixel number.

At step S138, a smoothing process is applied to the detection comparison distance pixel number IP LocalLambda(S) obtained at step S136, over a prescribed width (see FIG. 42).

FIG. 42 shows the MOD sequence image profile expected value and the offset pixel number. The distribution of the offset pixel number is not a uniform value because of the existence of localities in the resolution of the reading apparatus. This offset pixel number indicates the number of pixels of the offset to the position of which the value is to be referenced, and this offset pixel number changes in accordance with localities.

Image Profile Expected Value Calculation Process

Figure 43:
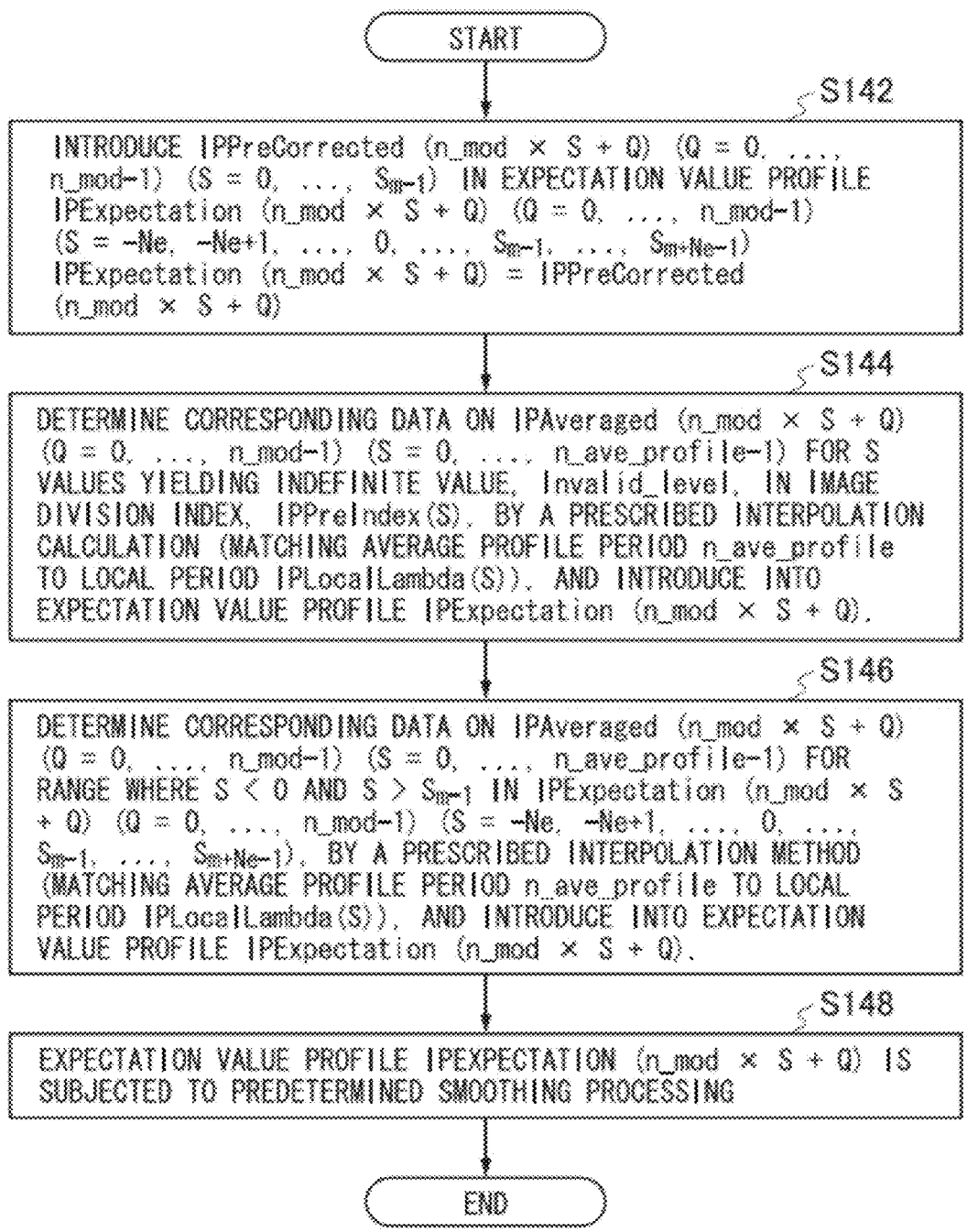
FIG. 43 is a flowchart of an image profile expected value calculation process.

FIG. 43 is a flowchart of an image profile expected value calculation process. Substitute values are determined on the basis of the average profile characteristics for the ends and for portions showing an indefinite value, in the corrected image profile after the pre-filtering process (steps S142, S144, S146).

The expected value distribution of the image profile characteristics is obtained by introducing the substitute values and applying a smoothing process (step S148). To give an example of the smoothing process, it is possible to use a low-pass filter having a coefficient weighting distribution which is directly proportional to $-\text{EXP}((S-S0)^2/\lambda)$.

Apart from this, the method of calculating the expected value of the image profile may employ a further method, such as dividing by a suitable number of pixels (for example, the image profile division range), and applying a least square approximation to the range (using an order of 2 or 3, etc.) In order to preserve continuity, an overlap is used in the calculation at the switching positions, and a prescribed weighted average is employed in the overlap range.

To describe the respective steps of the flowchart in FIG. 43, at step S142, the corrected image profile after the pre-filtering process, IPPreCorrected (n_mod×S+Q), is introduced into the expected value profile IPExpectation (n_mod×S+Q) (S=−Ne, −Ne+1, . . . , 0, . . . , $S_{m-1}$, . . . , $S_{m+Ne-1}$).

The value "Ne" referred to here is as shown below. More specifically, in the process in step S148 described below, if a smoothing process is installed in the low-pass filter (LPF), at either end of the data sequence, it is necessary to refer to data which is not present in the pre-filtering process.

For this reason, Ne pieces of data values are extrapolated on the basis of the average profile (the IPAveraged (n_mod× S+Q) determined by step S128 in FIG. 39) and information about the ends. This extrapolation is carried out at either end. Ne comprises the sum of the maximum number of pixels referenced on the expected value profile (the number of pixels on s) and the number of pixels referenced in the smoothing process.

The maximum number of pixels referenced on the expected value profile is the number of pixels on s for one period, which is an approximation of the maximum. The reason for this is that in more than one period, the value becomes 211.6 µm or more by positional error conversion (in the case of a 1-on 9-off pattern at the 477 dpi resolution of the present embodiment), and hence has no meaning in practical terms.

At step S144, the corresponding data on the average profile IPAveraged (n_mod×S+Q) (S=0, . . . , n_ave_profile−1) is determined by a prescribed interpolation calculation in respect of the S values which have produced an indefinite value in the image division index IPPreIndex(S), and this data is introduced into the expected value profile IPExpectation (n_mod×S+Q). In this interpolation calculation, the average profile period n_ave_profile is matched to the local period (detection comparison distance pixel number) IPLocalLambda(S).

At step S146, in the range of S<0 to S>$S_{m-1}$ of the expected value profile IPExpectation (n_mod×S+Q) (Q=0, . . . , n_mod−1) (S=−Ne, −Ne+1, . . . , 0, . . . , $S_{m-1}$, . . . $S_{m+Ne-1}$), the corresponding data on the average profile IPAveraged (n_mod×S+Q) (Q=0, . . . , n_mod−1) (S=0, . . . , n_ave_profile−1) is determined by a prescribed interpolation calculation, and this data is introduced into the expected value profile, IPExpectation (n_mod×S+Q). In this interpolation calculation, the average profile period n_ave_profile is matched to the local period (detection comparison distance pixel number) IPLocalLambda(S).

At step S148, the expected value profile IPExpectation (n_mod×S+Q) obtained at step S146 is subjected to a prescribed smoothing process.

Distance Calculation Flow

Figure 44:
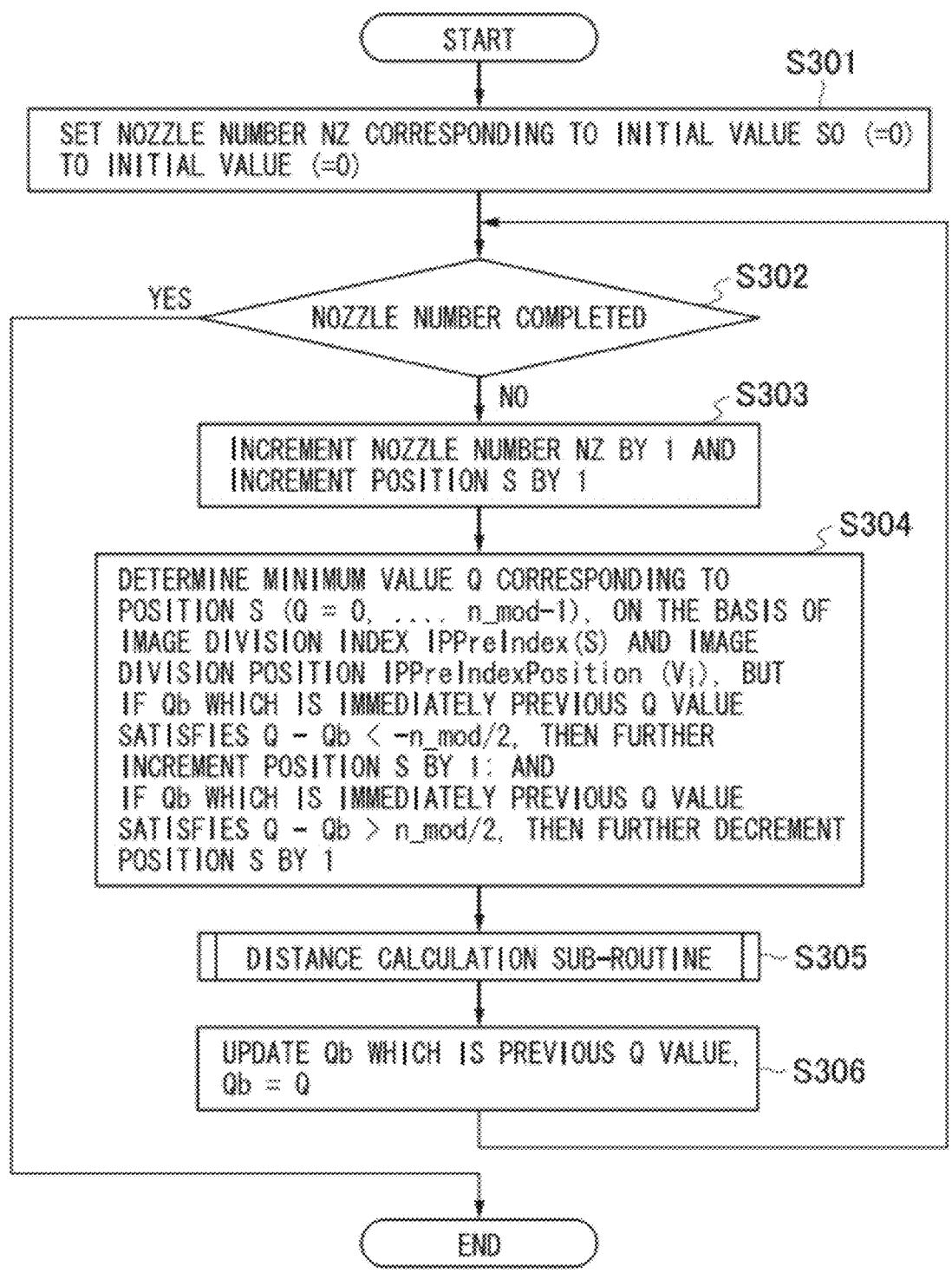
FIG. 44 is a flowchart of a distance calculation process.
Figure 45:
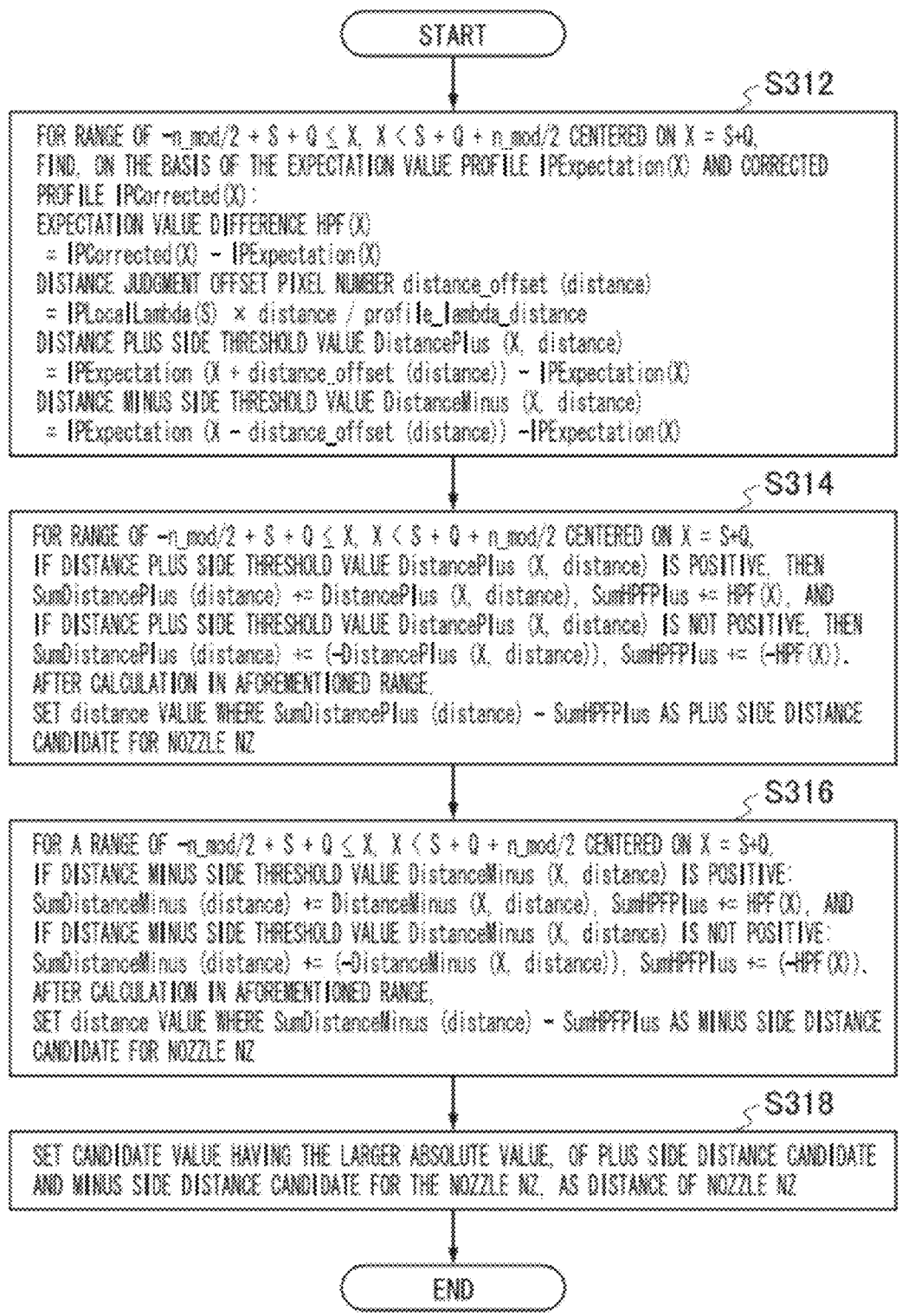
FIG. 45 is a flowchart of a distance calculation sub-routine.

FIG. 44 and FIG. 45 are flowcharts of a distance calculation process. This process is a flow for measuring the depositing position error of each nozzle in terms of a distance.

The principle of the distance calculation is to prepare a plurality of detection threshold values corresponding respectively to each distance, and to measure the distance (depositing position error) for a particular nozzle, in the range of threshold value increments, by judging which of the threshold values is exceeded for that nozzle.

In the distance calculation processing flow in FIG. 44, the minimum value sequence Q is progressively tracked while sequentially increasing the nozzle number from an initial value (0, for example) in one profile (steps S301 to S306). Basically, the nozzle numbers are staggered at intervals of n_mod, but since the location where Q changes corresponds to the switching point of the profile, then when Q=0 is changed to Q=n_mod−1, the correspondence with the nozzles will be disturbed if S is incremented by 1 (increased by n_mod=4 pixels), and therefore S is corrected (by decrementing S by 1). Conversely, supposing that Q=n_mod−1 changes to Q=0, then the correspondence with the nozzles will be disturbed if S is incremented by 1, and therefore S is corrected (by increasing S by a further increment of 1) (step S304).

To describe the respective steps of the flowchart in FIG. 44, at step S301, the nozzle number NZ corresponding to the initial value S0 (=0) is set to an initial value (=0).

At step S302, it is judged whether or not the assignment of the nozzle numbers has been completed. If the assignment has not been completed at step S302 (a NO verdict), then the procedure advances to step S303, the nozzle number NZ is incremented by 1, and the position S is incremented by 1.

At step S304, the value of Q (Q=0, . . . , n_mod−1) which yields the minimum value corresponding to the position S is determined on the basis of the image division index IPPreIndex(S) and the image division position IPPreIndexPosition (Vi). Here, if Q−Qb<−n_mod/2, where Qb is the immediately previous value of Q (and Qb produces a minimum value at position S−1), then the position S is increased by a further increment of 1. Furthermore, if Q−Qb>n_mod/2, then the position S is decreased by a further decrement of 1.

At step S305, the processing of the distance calculation sub-routine described below (FIG. 45) is carried out.

At step S306, the value of Qb used in the process in step S304 is updated to "Q", and the procedure then returns to step S302. The steps in S302 to S306 are repeated until the nozzle numbers have been completed, and when the nozzle numbers have been completed, a YES verdict is returned at step S302 and the process terminates.

FIG. 45 is a flowchart of a distance calculation sub-routine (step S305 in FIG. 44). The calculation flow shown in FIG. 45 is an example where the value of the distance judgment offset pixel number, distance_offset, is changed sequentially using the distance, "distance", as a variable, and the closest "distance" value is calculated as the displacement distance of the printed depositing position.

The distance candidate having the largest "distance" value is selected (step S318 in FIG. 45) in order to avoid the effects of external disturbance (variation in the tone value), because these effects are liable to become stronger when the closer the depositing position displacement. The closer the positional error (the smaller the "distance" value), the smaller the difference in the tonal value.

To describe the steps in FIG. 45, at step S312, in the range between −n_mod/2+S+Q≤X and X<S+Q+n_mod/2 centered on X=S+Q, the expected value differential, HPF(X)= IPCorrected(X)−IPExpectation(X), the distance judgment offset pixel number, distance_offset (distance)=IP LocalLambda(S)×distance/profile_lambda_distance, the distance plus side threshold value, DistancePlus (X, distance)=IPExpectation (X+distance_offset (distance))−IPExpectation(X), and the distance minus side threshold value, DistanceMinus (X, distance)=IPExpectation (X−distance_offset (distance))−IPExpectation(X), are determined respectively on the basis of the expected value profile IPExpectation(X) and the corrected profile IPCorrected(X).

Figure 46:
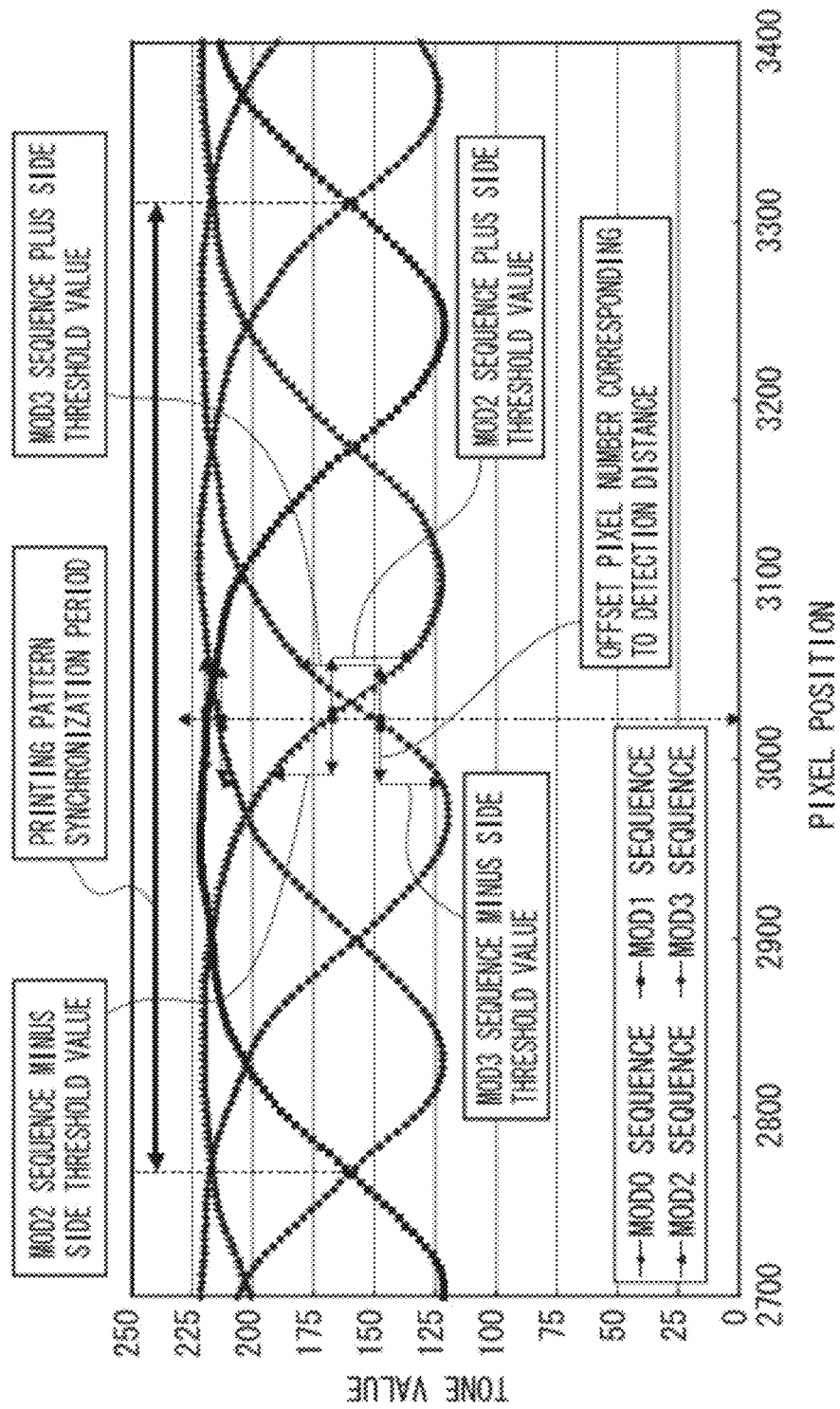
FIG. 46 is an illustrative diagram of threshold values corresponding to deposited positions.

The distance plus side threshold value DistancePlus (X, distance) and the distance minus side threshold value DistanceMinus (X, distance) are determined by calculating the difference between the expected value profile and the value displaced by the distance judgment offset pixel number on the expected value profile (see FIG. 46).

Careful attention should be paid here to the concepts of "plus side" and "minus side". These concepts do not necessarily match the plus direction and the minus direction on the actual printing pattern. As shown in FIG. 46, the plus side and the minus side are expressed from the viewpoint of the "number of pixels" in the gradient of the profile. In this respect, looking at an actual pattern, the relationship of the "plus" and "minus" sides may be opposite. For instance, if the reading pitch is long, then the relationship of the plus and minus signs differs from the X coordinates of the actual read image. Conversely, if the reading pitch is short, as in the case of a reading resolution of 484 dpi, for instance, then the signs are reversed again, so as to coincide with the X coordinates of the actual pattern. In this way, the "plus side" and the "minus side" referred to in FIG. 45 are concepts relating to the "plus side" and the "minus side" in terms of the algorithm, and this point should be borne in mind in relation to the actual coordinates.

In step S314, in a range of −n_mod/2+S+Q≤X to X<S+Q+ n_mod/2 centered on X=S+Q, if the distance plus side threshold value DistancePlus (X, distance) is positive, then SumDistancePlus(distance) is calculated by adding the value of DistancePlus(X, distance), whereas if the distance plus side threshold value DistancePlus(X, distance) is not positive, then the sign is reversed so as to become (−DistancePlus(X, distance) and then added to SumDistancePlus(distance). In this way, the sign is adjusted in such a manner that a cumulative sum is found by using positive values only.

SumHPFPlus is calculated by accumulation by adjusting the signs of the values in a similar fashion in respect of the expected value difference HPF(X). The value of "distance" at which SumDistancePlus (distance) and SumHPFPlus become substantially equal (where both values are closest to each other) is set as a plus side distance candidate for the nozzle NZ.

At step S316, similar processing is carried out for the minus side, and the "distance" value at which SumDistanceMinus (distance) and SumHPFMinus become substantially equal is set as a minus side distance candidate for the nozzle NZ.

At step S318, the candidate having the largest absolute value, of the plus side distance candidate determined at step S314 and the minus side distance candidate determined at step S136 is specified as the distance of the nozzle NZ.

In this way, the depositing position error (distance) of each nozzle NZ is measured. By comparing the information about the depositing position error for each nozzle thus measured, with a prescribed threshold value, it is possible to detect a nozzle which exceeds the prescribed threshold value and thus has excessively large error, as a defective nozzle.

Statistical Processing Between Tracks

At step S54 in FIG. 27, the measurement accuracy is raised by averaging the distance judgment result calculated for each track by the measurement result per track corresponding to the same nozzle.

Relative Nozzle Number to Absolute Nozzle Number Conversion Process

The "nozzle number" in the processing for each line block described above is a relative nozzle number which is incremented, one nozzle at a time, from an initial value, in each line block. After the statistical processing between tracks (step S54 in FIG. 27), at step S56 in FIG. 27, processing is carried out to convert the relative nozzle number in each line block to an absolute nozzle number. The relative nozzle numbers in the respective line blocks are converted to nozzle numbers in the head (absolute nozzle numbers) on the basis of the layout pattern of each line block and the 1-on N-off pattern information.

For instance, in the case of test patterns which are displaced in the X direction by one nozzle from top to bottom in the recording paper, in a 1-on 10-off pattern, nozzle numbers are assigned to the Jth line block from the top, according to the conversion formula "nozzle number in head=start nozzle number+J+10×relative nozzle number".

Example of Application to Inkjet Printer

Figure 47:
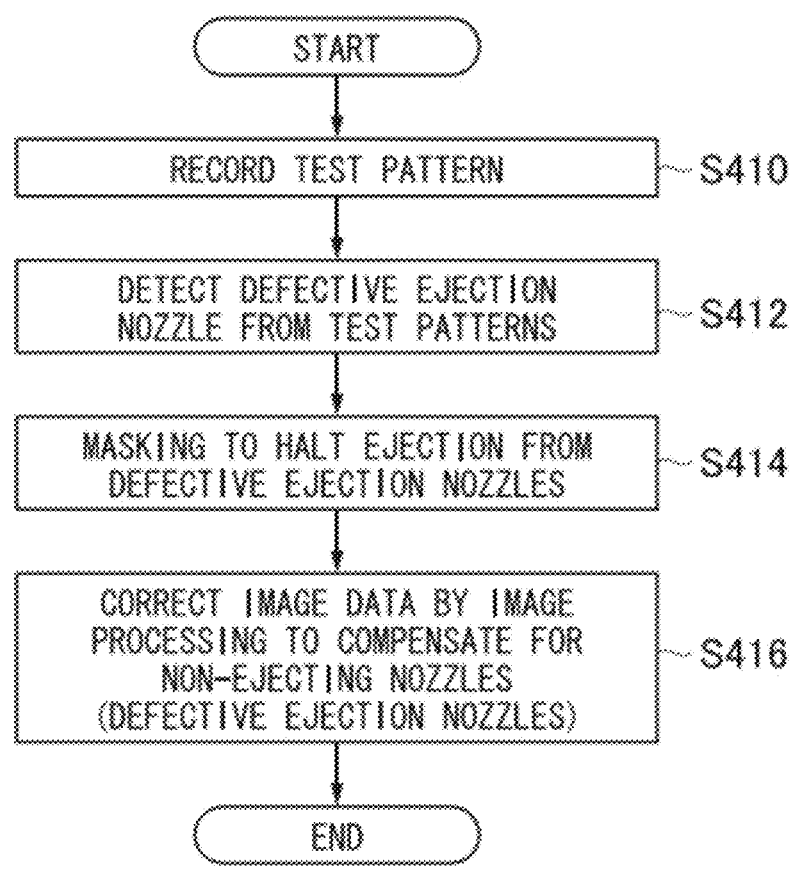
FIG. 47 is a flowchart showing an example of an image correction process in an inkjet recording apparatus.

Next, an example of image correction in an inkjet recording apparatus (image forming apparatus) based on a single-pass recording method which employs the recording position error (distance) measurement technology and the defective ejection nozzle detection technology described above will be explained. FIG. 47 is an example of an image correction process for detecting defective recording elements (defective ejection nozzles) from a plurality of recording elements and correcting image formation defects caused by the defective recording elements by means of other normally functioning recording elements.

Firstly, in order to ascertain the ejection characteristics of the respective nozzles, ink droplets are ejected from the nozzles 51 onto recording paper 16 so as to print test patterns 102 on the recording paper 16 (step S410 in FIG. 47).

The test patterns 102 are read by an image reading apparatus, such as an imaging unit attached to the inkjet recording apparatus (an in-line sensor) or an external scanner (off-line scanner), and electronic image data indicating the recording results of the test pattern 102 (read image signal data) is generated. By analyzing this read image data in accordance with a prescribed detection algorithm, the positions of non-ejecting nozzles and the depositing position error from the ideal depositing positions 104 of the test patterns 102 are determined. In this case, nozzles having excessively large positional error which exceeds a prescribed value (a value designating a prescribed tolerable range), or nozzles suffering ejection failure are detected and identified as defective ejection nozzles (step S412).

A defective ejection nozzle identified in this way is masked and treated as a non-ejecting nozzle which does not eject an ink droplet during image formation (is not used for recording) (step S414 in FIG. 47). The input image data is corrected by image processing which takes account of compensating for image formation defects due to non-ejecting nozzles (nozzles which have been set as non-ejecting nozzles) by means of ink droplets ejected from other ejection nozzles (for example, adjacent nozzles) (step S416). A desired image is recorded with good quality on the recording paper 16 on the basis of the input image data which has corrected in this way.

Figure 48:
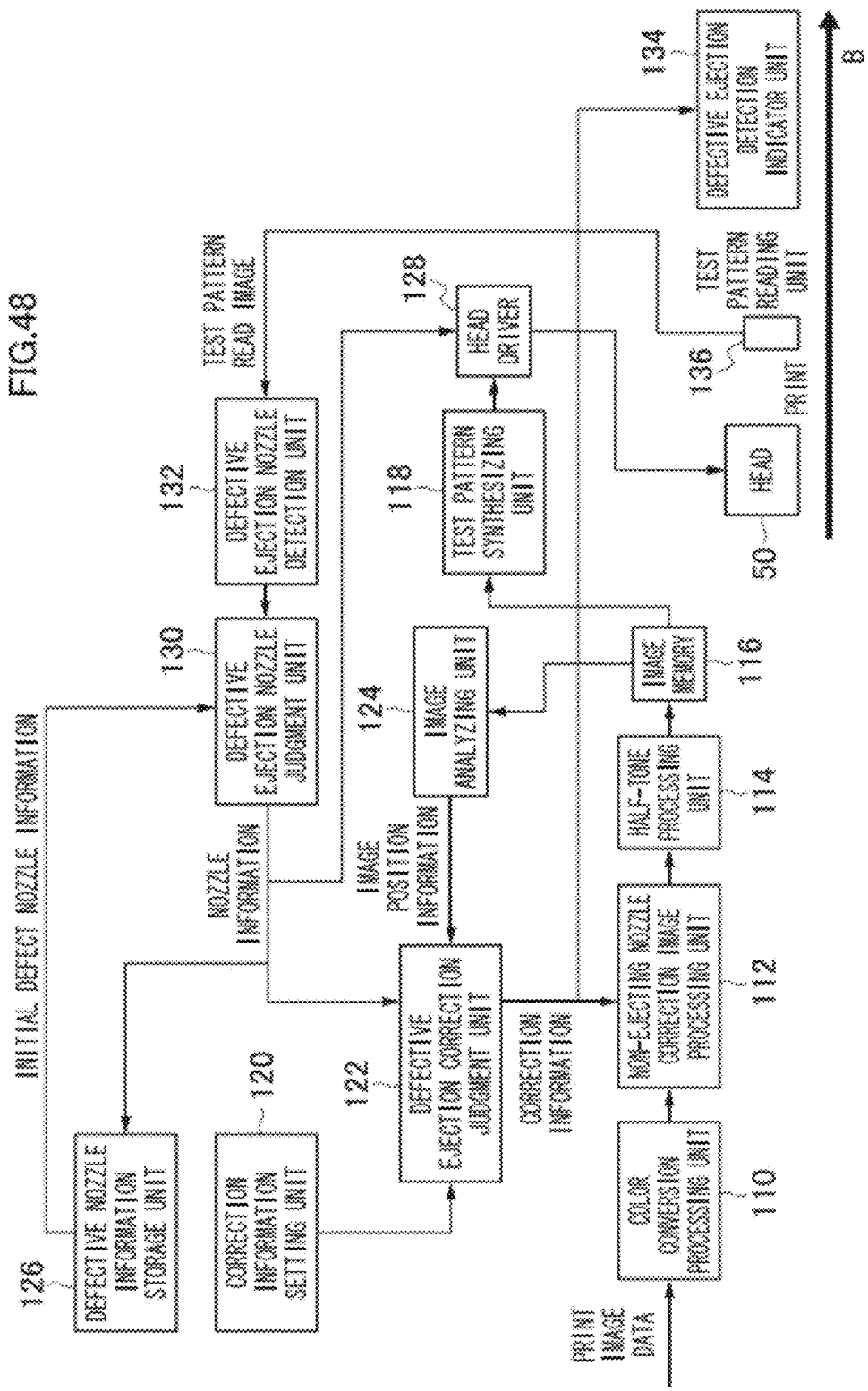
FIG. 48 is a functional block diagram of a system relating to processing for detection of defective ejection nozzles and correction of input image data.

FIG. 48 is a functional block diagram of a system relating to processing for measurement of depositing position error (distance), detection of defective ejection nozzles and correction of input image data.

The print image data to be printed is subjected to prescribed color conversion processing in a color conversion processing unit 110, and image data for respective plates corresponding to the recording inks (C, M, Y and K inks in the present embodiment) is obtained. The image data for the respective ink colors obtained in this way is sent from the color conversion processing unit 110 to a non-ejecting nozzle correction image processing unit 112.

In a defective ejection correction judgment unit 122, all defective nozzle correction information is gathered, and corrected image positions, which are the positions on the image where dots were to be recorded originally by the defective ejection nozzles, are identified from the correspondence between the image positions (image dot positions) and the nozzle positions. Reference here to a "position" means a position in the nozzle alignment direction of the recording head (main scanning direction).

The image portion of a corrected image position cannot be recorded appropriately by the defective ejection nozzle. Therefore, in the defective ejection correction judgment unit 122, recording information for the portion of the corrected image position corresponding to the defective ejection nozzle is allocated to one or a plurality of normally functioning nozzles which are adjacent to the defective ejection nozzle, including the nozzles on either side of the defective ejection nozzle. The allocation of recording information corresponding to a defective ejection nozzle referred to here means data processing (correction processing) for causing ink to be ejected from other nozzles in such a manner that the recording of a portion of a corrected image position corresponding to a defective ejection nozzle is compensated by ejection of ink from other nozzles. Moreover, the defective ejection correction judgment unit 122 corrects the image information allocated in this way, in accordance with the recording characteristics.

The defective ejection correction judgment unit 122 creates correction information only for the image portion to be recorded by a defective ejection nozzle, by comparing information from the image analyzing unit 124 (image position information data) and defective ejection nozzle information from the defective ejection nozzle judgment unit 130. In this case, the defective ejection correction judgment unit 122 is able to create correction information only in respect of a region where there is a high requirement for correction, more powerfully, by referring to data indicating the requirement for correction which is provided by the correction information setting unit 120 (for example, data indicating a correction region set on the print image, or data indicating a correction region (nozzle unit) set in the print unit of the head 50). The correction information created in this way is supplied from the defective ejection correction judgment unit 122 to the non-ejecting nozzle correction image processing unit 112.

In the non-ejecting nozzle correction image processing unit 112, correction processing is performed on the image data supplied from the color conversion processing unit 110, on the basis of the correction information relating to the defective ejection nozzle supplied from the defective ejection correction judgment unit 122. The image data after correction processing which reflects information on non-ejection from defective ejection nozzles in this way is supplied from the non-ejecting nozzle correction image processing unit 112 to the half-tone processing unit 114.

In the half-tone processing unit 114, half-tone processing is carried out on the image data supplied from the non-ejecting nozzle correction image processing unit 112, thereby generating multiple-value image data for driving the head 50. In this case, half-tone processing is performed in such a manner that the multiple-value image data thus generated (the multiple values for driving the recording head) is smaller than the number of graduated tones in the image (in other words, in such a manner that (number of graduated tones)>(multiple values for head driving)).

The image data which has been subjected to half-tone processing is sent from the half-tone processing unit 114 to the image memory 116. Furthermore, the image data which has completed half-tone processing and is sent to the image memory 116 is also sent to the image analyzing unit 124. The image data which has completed half-tone processing is stored in the image memory 116 and is also analyzed by the image analyzing unit 124 to generate information (image position information data) relating to the positions where image information exists (image positions) and the positions where image information does not exist. The image position information data generated in this way is supplied from the image analyzing unit 124 to the defective ejection correction judgment unit 122 and is used to create correction information in respect of the defective ejection nozzles in the defective ejection correction judgment unit 122.

The image data which has undergone half-tone processing (half-tone image data) is also sent from the image memory 116 to a test pattern synthesizing unit 118.

In the test pattern synthesizing unit 118, the half-tone image data sent from the image memory 116 and the image data relating to the test patterns (test pattern image data) are synthesized, and this synthesized image data is sent to the head driver 128. As described in detail below, the test patterns are dot patterns formed on recording paper by respective nozzles with the object of detecting defective ejection nozzles. The test pattern image data and half-tone image data are synthesized by the test pattern synthesizing unit 118 in such a manner that the test patterns are printed on an end portion of the recording paper.

Image data containing a synthesis of the half-tone image data and the test pattern image data is sent to the head driver 128 from the test pattern synthesizing unit 118. The head driver 128 drives the head 50 on the basis of the image data supplied from the test pattern synthesizing unit 118 and records the desired image and the test patterns on the recording paper. In this way, a pattern forming device which forms a plurality of test patterns corresponding to each of the nozzles on recording paper, by means of ink droplets ejected from nozzles, is constituted by the test pattern synthesizing unit 118 and a head driver 128.

The recording paper on which the image and the test patterns have been recorded is sent to the paper output unit via the conveyance path (see arrow B in FIG. 48). In this case, a test pattern read image is generated by reading the test patterns recorded on the recording paper, by means of a test pattern reading unit (image reading device) 136 which is disposed at an intermediate point in the conveyance path.

The test pattern reading unit 136 employs a color CCD line sensor which has color-specific photoelectric transducer element (pixel) arrays equipped with color filters of the three colors, RGB, and which is capable of reading in a color image by RGB color analysis. The test pattern reading unit 136 acquires test pattern read image data based on the read pixel pitch by reading the recording paper 16 on which the test patterns 102 have been recorded, in the lengthwise direction of the head 50 (the nozzle row direction, main scanning direction, X direction) at a prescribed read pixel pitch. The data of this test pattern read image is supplied from the test pattern reading unit 136 to the defective ejection nozzle detection unit 132.

The test pattern reading unit 136 does not have to be a line sensor. For example, the test pattern reading unit 136 may have a reading width smaller than the width of the reading paper on which the test patterns are recorded and may be composed so as to read in the test patterns while performing a scanning action in the X and Y directions relatively to the recording paper.

In the defective ejection nozzle detection unit 132, defective ejection nozzles (including defective nozzles which eject ink droplets that have a depositing position error greater than a prescribed value on the recording paper, nozzles with volume errors and non-ejecting nozzles which do not eject ink droplets) are detected from the test pattern read image data supplied from the test pattern reading unit 136. This defective ejection nozzle detection unit 132 functions as a calculation device for measuring the depositing position error. The information data relating to defective ejection nozzles (defective ejection nozzle information) thus detected is sent from the defective ejection nozzle detection unit 132 to the defective ejection nozzle judgment unit 130.

The defective ejection nozzle judgment unit 130 includes a memory (not illustrated) which is capable of storing a plurality of sets of defective ejection nozzle information sent by the defective ejection nozzle detection unit 132. This defective ejection nozzle judgment unit 130 references past defective ejection nozzle information stored in the memory and establishes the defective ejection nozzles on the basis of whether or not a nozzle has been detected as a defective ejection nozzle a prescribed number of times or more in the past. Furthermore, if a nozzle is judged to be a normal nozzle which has not been a defective ejection nozzle for a prescribed number of times or more in the past, then the defective ejection nozzle information is amended in such a manner that a nozzle which has been treated as a defective ejection nozzle until then, for instance, changes status and that nozzle is subsequently treated as a normal nozzle.

The defective ejection nozzle information confirmed in this way is sent by the defective ejection nozzle judgment unit 130 to the head driver 128 and the defective ejection correction judgment unit 122. Furthermore, if prescribed conditions are satisfied (for example, after printing a prescribed number of copies, after a job, when so instructed by the user, or the like), the confirmed defective ejection nozzle information is also supplied from the defective ejection nozzle judgment unit 130 to the defective nozzle information storage unit 126.

The head driver 128 disables driving of nozzles corresponding to defective ejection nozzles, on the basis of the defective ejection nozzle information supplied from the defective ejection nozzle judgment unit 130.

Furthermore, the defective ejection nozzle information sent to the defective nozzle information storage unit 126 is accumulated and stored in the defective nozzle information storage unit 126 and used as statistical information about defective ejection nozzles. The defective ejection nozzle information stored in the defective nozzle information storage unit 126 is sent to the defective ejection nozzle judgment unit 130 at a suitable timing as initial defective nozzle information. This initial defective nozzle information is information indicating which nozzles (corresponding to the CMYK inks) are defective nozzles; the initial values of the initial defective nozzle information are based on information from inspection at shipment of the head, and the initial defective nozzle information is then updated appropriately at specified intervals on the basis of the defective ejection nozzle information stored in the defective nozzle information storage unit 126. The defective ejection nozzle judgment unit 130 stores the required defective ejection nozzle information, of this initial defective nozzle information, in a memory (not illustrated) at the start of printing and uses the stored information for the process of confirming the defective ejection nozzles.

The defective ejection correction judgment unit 122 generates correction information corresponding to image portions that require correction (image portions to be recorded by the defective ejection nozzles) from the defective ejection nozzle information sent by the defective ejection nozzle judgment unit 130, and sends this correction information to the non-ejecting nozzle correction image processing unit 112.

Furthermore, the defective ejection correction judgment unit 122 compares the correction information generated in this way with the immediately previous correction information and detects whether or not new defective ejection nozzles have arisen (and more desirably, whether or not a prescribed number or more of new defective ejection nozzles have arisen) and then the amount of correction information has increased. If it is observed that the correction information has increased, then a prescribed instruction is sent from the defective ejection correction judgment unit 122 to a defective ejection detection indicator unit 134.

The defective ejection detection indicator unit 134 which has received this prescribed instruction carries out processing which enables identification of a printed object including defective ejection in which recording has been carried out by new defective ejection nozzles (in other words, a printed object which has been printed without performing correction in respect of new defective ejection nozzles). More specifically, the defective ejection detection indicator unit 134 attaches an adhesive label to printed objects, from the printed object (recording paper) in which a defect was detected until a printed object where printing with complete correction has started. When printing after having completed correction processing in respect of new defective ejection nozzles (when printing on the basis of image data (half-tone image data) after completing correction processing), an instruction signal is sent to the defective ejection detection indicator unit 134 from the defective ejection correction judgment unit 122, in such a manner that the prescribed instruction described above is invalidated, and the defective ejection detection indicator unit 134 performs normal operation (normal indication).

Defective ejection nozzle detection and input image data correction processing are carried out suitably on the basis of the series of processing flows described above. Depending on the stability of the head 50, it is possible to do that the aforementioned detection and correction processing is carried out only in respect of the first prescribed number of sheets of recording paper at the start of printing (a composition employing an off-line scanner may also be adopted), or where the processing is carried out when the user issues an instruction.

Examples of Other Uses of Distance Information

Aside from the correction example described above in which defective nozzles are identified from the depositing position (distance) information measured for each respective nozzle, and these defective ejection nozzles are disabled for ejection and image correction is applied, there are also the following examples of how the depositing position (distance) information can be used.

Example 1

On the basis of the depositing position (distance) information, nozzles having a certain distance or greater are set as defective, whereupon it is judged whether or not there is a concentration of defective nozzles, and if there is a concentration corresponding to prescribed conditions or greater, then a nozzle satisfying a predetermined condition, of these nozzles (for example, the nozzle having the smallest depositing position error) is changed so as to be treated as a normal nozzle rather than a defective nozzle.

Beneficial effects of processing of this kind are as follows. More specifically, if there is a certain concentration or more of defective nozzles and all of the nozzles are treated as defective (set as non-ejecting nozzles), then the resulting blank gap becomes more prominent. To give a simple example, it is supposed that three consecutive nozzles are judged to be defective nozzles. In a case of this kind, of the plurality of nozzles judged to be defective, the nozzle having relatively the best level is changed so as to be treated as a normal nozzle, and by using this nozzle for image formation, the blank gap becomes less prominent.

Example 2

The distance between the depositing positions of nozzles is calculated from the depositing position error (including the plus and minus signs), and a pair of nozzles having a distance between the respective depositing positions that does not satisfy a prescribed condition is extracted and the nozzle thereof having the larger depositing position error is judged to be defective.

Description of Print Layout

Figure 49:
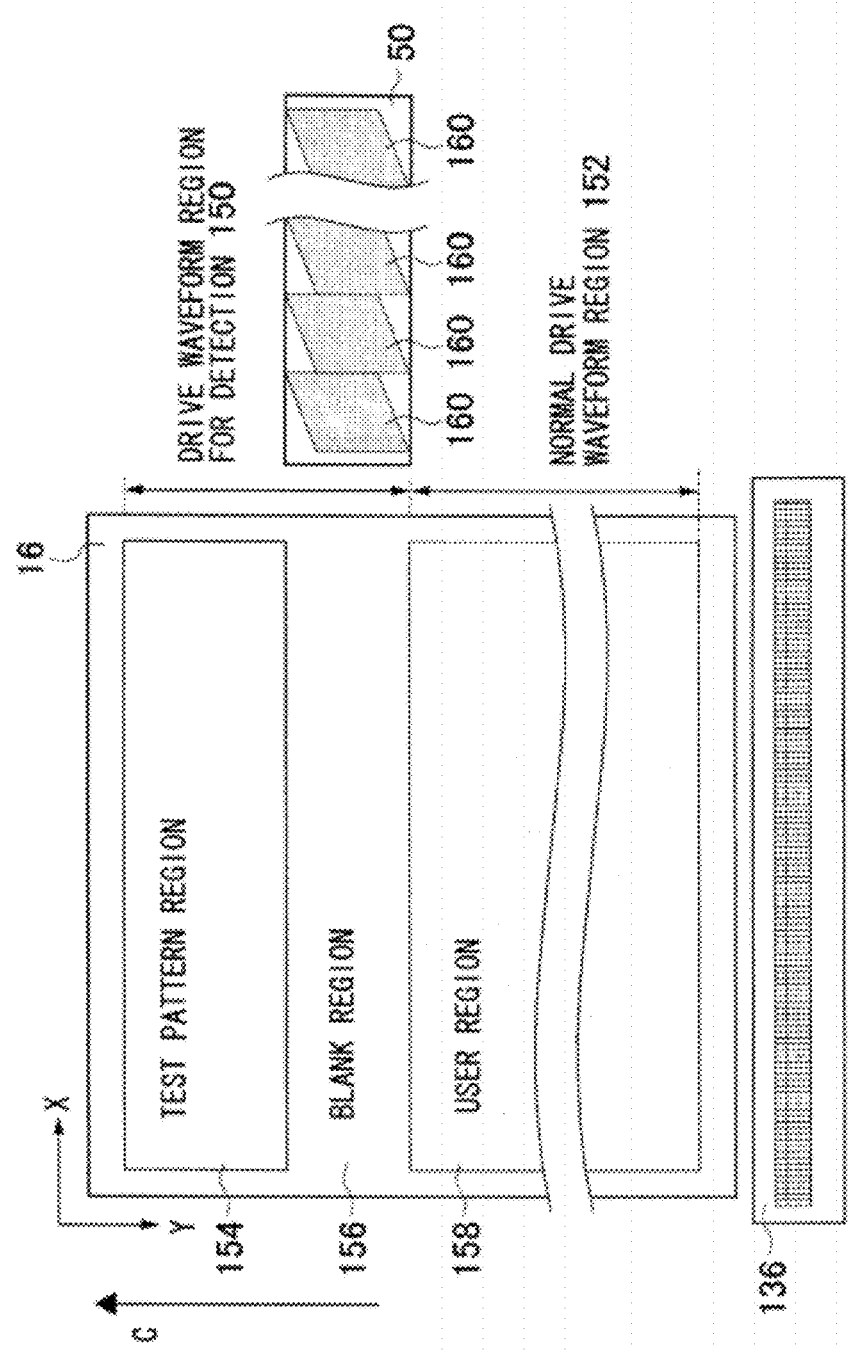
FIG. 49 is a layout diagram on printing paper in a system which detects and corrects defective ejection nozzles.

Next, an example of the print layout on the recording paper 16 will be described. FIG. 49 is a diagram showing the layout on the printing paper of a system for detecting and correcting defective ejection nozzles. The upper side in FIG. 49 is the leading end of the recording paper 16, and the recording paper 16 is conveyed from bottom to top in FIG. 49 (in the conveyance direction indicated by the arrow C). For instance, in the case of a drum conveyance method where recording paper 16 is fixed onto the circumferential surface of a drum (not illustrated) and the recording paper 16 is conveyed by rotation of the drum, a technology is employed which holds the leading end portion of the recording paper 16 by means of a gripper provided on the drum.

The recording paper 16 is divided into a drive waveform region for detection 150, which is provided in an end portion of the paper, and a normal drive waveform region 152. The drive waveform region 150 for detection includes a test pattern region 154 for printing the test pattern 102 described above and a blank region 156, and the normal drive waveform region 152 is formed to include a user region 158 for printing a desired image.

The blank region 156 which is provided between the test pattern region 154 and the user region 158 is a transition section for switching from test pattern printing to normal printing, and the area which is required for this switching in accordance with the conveyance speed of the recording paper 16 is reserved by the blank region 156. In particular, if a test pattern is formed in the test pattern region 154 by using a special drive waveform signal, then a blank region corresponding to the time required to switch from this special drive waveform signal to a normal drive waveform signal is reserved. The blank region 156 is desirably provided so as to correspond at least to the nozzle region 160 of the head 50 in the conveyance direction C of the recording paper 16. The special drive waveform signal for printing the test pattern 102 can be used in order to make it easier to distinguish between a defective ejection nozzle and a normal ejection nozzle, and it is also possible to employ a specially designed drive waveform signal which amplifies the positional error or a drive waveform signal which causes a defective ejection nozzle to become more liable to function as a non-ejecting nozzle.

Next, an example of an image forming apparatus including an image correcting function which uses the aforementioned detecting function of a defective ejection nozzle and a detection result thereof will be described.

Description of Inkjet Recording Apparatus

Figure 50:
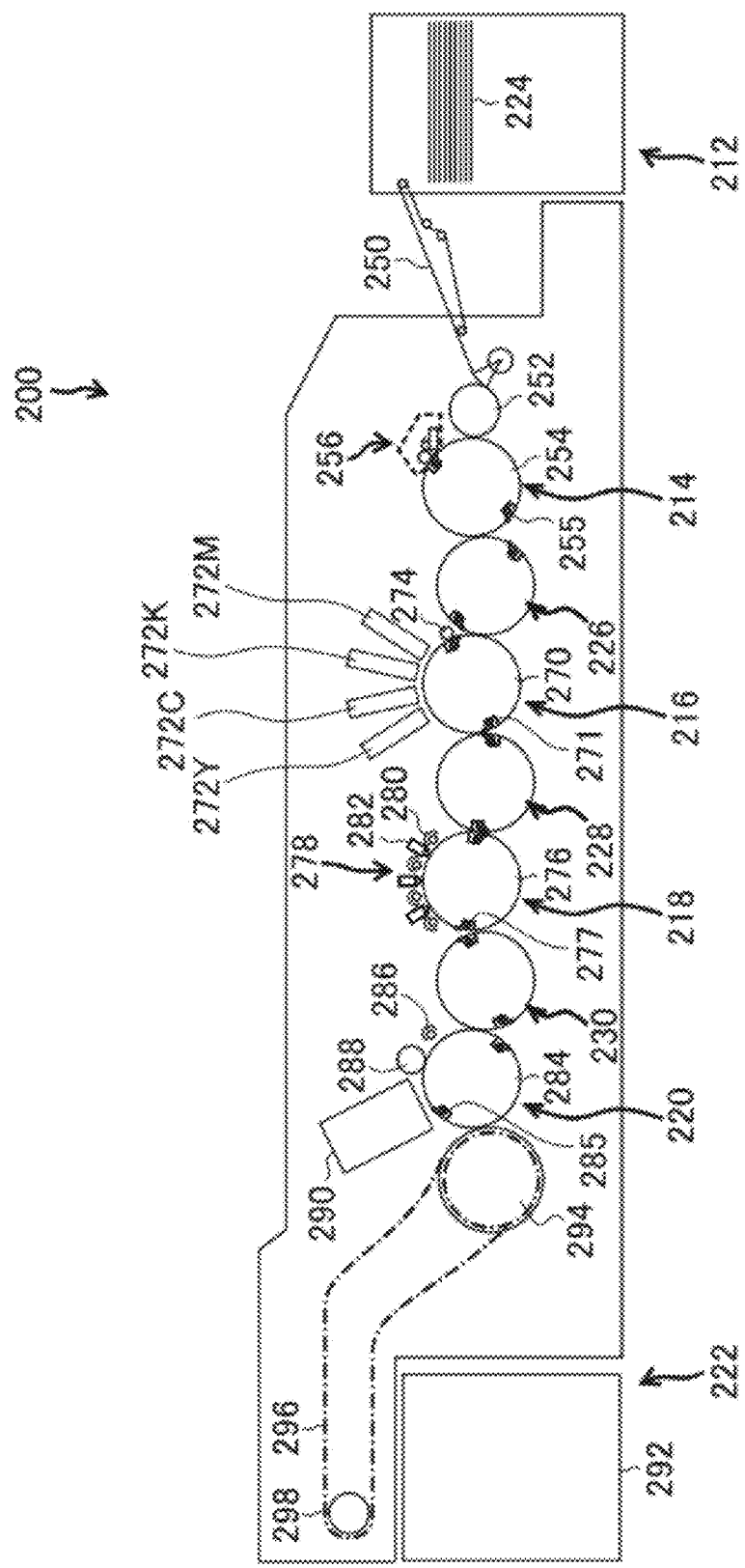
FIG. 50 is a general schematic drawing of an inkjet recording apparatus relating to an embodiment of the present invention.

FIG. 50 is a diagram showing a configuration example of an inkjet recording apparatus 200 according to an embodiment of the present invention. The inkjet recording apparatus 200 primarily includes a paper supply unit 212, a treatment liquid deposition unit 214, a rendering unit 216, a drying unit 218, a fixing unit 220, and a discharging unit 222. The inkjet recording apparatus 200 is an on-demand drop type image forming apparatus which deposits ink of a plurality of colors from inkjet heads (corresponding to "rendering heads") 272M, 272K, 272C, and 272Y onto a recording medium 224 (hereinafter, sometimes referred to as "paper" for convenience) held by an impression cylinder (rendering drum 270) of a rendering unit 216 to form a desired color image.

Paper Supply Unit

The recording media 224 that are sheets of paper are stacked on the paper supply unit 212. The recording medium 224 is sent one sheet at a time from a paper supply tray 250 of the paper supply unit 212 to the treatment liquid deposition unit 214. While sheets of paper (cut paper) are used as the recording media 224 in the present example, a configuration can also be adopted in which continuous-form paper (a roll of paper) is cut down to a necessary size and then supplied.

Treatment Liquid Deposition Unit

The treatment liquid deposition unit 214 is a mechanism which deposits treatment liquid onto a recording surface of the recording medium 224. The treatment liquid includes a coloring material aggregating agent which aggregates the coloring material (in the present embodiment, the pigment) in the ink deposited by the rendering unit 216, and the separation of the ink into the coloring material and the solvent is promoted due to the treatment liquid and the ink making contact with each other.

The treatment liquid deposition unit 214 includes a paper supply drum 252, a treatment liquid drum 254 and a treatment liquid application apparatus 256. The treatment liquid drum 254 includes a hook-shaped holding device (gripper) 255 provided on the outer circumferential surface thereof, and is devised in such a manner that the leading end of the recording medium 224 can be held by gripping the recording medium 224 between the hook of the holding device 255 and the circumferential surface of the treatment liquid drum 254. The treatment liquid drum 254 may include suction holes provided in the outer circumferential surface thereof, and be connected to a suctioning device which performs suctioning via the suction holes. By this means, it is possible to hold the recording medium 224 tightly against the circumferential surface of the treatment liquid drum 254.

A treatment liquid application apparatus 256 is provided opposing the circumferential surface of the treatment liquid drum 254, to the outside of the drum. The treatment liquid application apparatus 256 includes a treatment liquid vessel in which treatment liquid is stored, an anilox roller which is partially immersed in the treatment liquid in the treatment liquid vessel, and a rubber roller which transfers a dosed amount of the treatment liquid to the recording medium 224, by being pressed against the anilox roller and the recording medium 224 on the treatment liquid drum 254. According to this treatment liquid application apparatus 256, it is possible to apply treatment liquid to the recording medium 224 while measuring the amount of the treatment liquid. In the present embodiment, an example is described which uses a roller-based application method, but the method is not limited to this, and it is also possible to employ various other methods, such as a spray method, an inkjet method, or the like.

The recording medium 224 onto which treatment liquid has been deposited by the treatment liquid deposition unit 214 is transferred from the treatment liquid drum 254 to the rendering drum 270 of the rendering unit 216 via the intermediate conveyance unit 226.

Rendering Unit

The rendering unit 216 includes a rendering drum 270, a paper pressing roller 274, and inkjet heads 272M, 272K, 272C and 272Y. Similarly to the treatment liquid drum 254, the rendering drum 270 includes a hook-shaped holding device (gripper) 271 on the outer circumferential surface of the drum. The rendering drum 270 according to the present example is configured so that grippers 271 are provided at two locations on a peripheral surface at 180 degree intervals with respect to a direction of rotation and two sheets of the recording medium 224 can be conveyed by one rotation.

A large number of suction holes, not shown, are formed in a predetermined pattern on the peripheral surface of the rendering drum 270. As air is sucked inward through the suction holes, the recording medium 224 is suctioned and held onto the peripheral surface of the rendering drum 270. Moreover, in addition to a configuration in which the recording medium 224 is suctioned and held by negative pressure suction, for example, a configuration in which the recording medium 224 is suctioned and held by electrostatic adsorption can also be adopted.

The inkjet heads 272M, 272K, 272C and 272Y are each full-line type inkjet rendering heads having a length corresponding to the maximum width of the image forming region on the recording medium 224, and a nozzle row of nozzles for ejecting ink arranged throughout the whole width of the image forming region is formed in the ink ejection surface of each head. The inkjet heads 272M, 272K, 272C and 272Y are disposed so as to extend in a direction perpendicular to the conveyance direction of the recording medium 224 (the direction of rotation of the rendering drum 270).

When droplets of the corresponding colored ink are ejected from the inkjet heads 272M, 272K, 272C and 272Y toward the recording surface of the recording medium 224 which is held tightly on the rendering drum 270, the ink makes contact with the treatment liquid which has previously been deposited onto the recording surface by the treatment liquid deposition unit 214, the coloring material (pigment) dispersed in the ink is aggregated, and a coloring material aggregate is thereby formed. By this means, flowing of coloring material, and the like, on the recording medium 224 is prevented and an image is formed on the recording surface of the recording medium 224.

The recording medium 224 is conveyed at a uniform speed by the rendering drum 270, and it is possible to record an image on an image forming region of the recording medium 224 by performing just one operation of moving the recording medium 224 and the respective inkjet heads 272M, 272K, 272C and 272Y relatively in the conveyance direction (in other words, by a single sub-scanning operation). This single-pass type image formation with such a full line type (page-wide) head can achieve a higher printing speed compared with a case of a multi-pass type image formation with a serial (shuttle) type of head which moves back and forth reciprocally in the direction (the main scanning direction) perpendicular to the conveyance direction of the recording medium (sub-scanning direction), and hence it is possible to improve the print productivity.

Although the configuration with the CMYK standard four colors is described in the present embodiment, combinations of the ink colors and the number of colors are not limited to those. As required, light inks, dark inks and/or special color inks can be added. For example, a configuration in which inkjet heads for ejecting light-colored inks such as light cyan and light magenta are added is possible. Moreover, there are no particular restrictions of the sequence in which the heads of respective colors are arranged.

The recording medium 224 onto which an image has been formed in the rendering unit 216 is transferred from the rendering drum 270 to the drying drum 276 of the drying unit 218 via the intermediate conveyance unit 228.

Drying Unit

The drying unit 218 is a mechanism which dries the water content contained in the solvent which has been separated by the action of aggregating the coloring material, and includes a drying drum 276 and a solvent drying apparatus 278. Similarly to the treatment liquid drum 254, the drying drum 276 includes a hook-shaped holding device (gripper) 277 provided on the outer circumferential surface of the drum. The solvent drying apparatus 278 is disposed in a position opposing the outer circumferential surface of the drying drum 276, and is constituted by a plurality of halogen heaters 280 and hot air spraying nozzles 282 disposed respectively between the halogen heaters 280. It is possible to achieve various drying conditions, by suitably adjusting the temperature and air flow volume of the hot air flow which is blown from the hot air flow spraying nozzles 282 toward the recording medium 224, and the temperatures of the respective halogen heaters 280.

The recording medium 224 on which a drying process has been carried out in the drying unit 218 is transferred from the drying drum 276 to the fixing drum 284 of the fixing unit 220 via the intermediate conveyance unit 230.

Fixing Unit

The fixing unit 220 is constituted by a fixing drum 284, a halogen heater 286, a fixing roller 288 and an in-line sensor 290. Similarly to the treatment liquid drum 254, the fixing drum 284 includes a hook-shaped holding device (gripper) 285 provided on the outer circumferential surface of the drum.

By means of the rotation of the fixing drum 284, the recording medium 224 is conveyed with the recording surface facing to the outer side, and preliminary heating by the halogen heater 286, a fixing process by the fixing roller 288 and inspection by the in-line sensor 290 are carried out in respect of the recording surface.

The fixing roller 288 is a roller member for melting self-dispersing polymer micro-particles contained in the ink and thereby causing the ink to form a film, by applying heat and pressure to the dried ink, and is composed so as to heat and pressurize the recording medium 224. More specifically, the fixing roller 288 is disposed so as to press against the fixing drum 284, in such a manner that a nip is created between the fixing roller and the fixing drum 284. By this means, the recording medium 224 is sandwiched between the fixing roller 288 and the fixing drum 284 and is nipped with a prescribed nip pressure (for example, 0.15 MPa), whereby a fixing process is carried out.

Furthermore, the fixing roller 288 is constituted by a heated roller formed by a metal pipe of aluminum, or the like, having good thermal conductivity, which internally incorporates a halogen lamp, and is controlled to a prescribed temperature (for example, 60° C. to 80° C.). By heating the recording medium 224 by means of this heating roller, thermal energy equal to or greater than the Tg temperature (glass transition temperature) of the latex contained in the ink is applied and the latex particles are thereby caused to melt. By this means, fixing is performed by pressing the latex particles into the unevenness in the recording medium 224, as well as leveling the unevenness in the image surface and obtaining a glossy finish.

On the other hand, the in-line sensor 290 is a measuring device which measures an ejection failure check pattern, an image density, a defect in an image, and the like of an image (including a test pattern for non-ejection detection, a test pattern for density correction, and a printed image) recorded on the recording medium 224. A CCD line sensor or the like is applied as the in-line sensor 290. The in-line sensor 290 corresponds to the test pattern reading unit described by reference numeral 136 in FIG. 48.

Instead of an ink which includes a high-boiling-point solvent and polymer micro-particles (thermoplastic resin particles), it is also possible to include a monomer which can be polymerized and cured by exposure to UV light. In this case, the inkjet recording apparatus 200 includes a UV exposure unit for exposing the ink on the recording medium 224 to UV light, instead of a heat and pressure fixing unit (fixing roller 288) based on a heat roller. In this way, if using an ink containing an active light-curable resin, such as an ultraviolet-curable resin, a device which irradiates the active light, such as a UV lamp or an ultraviolet LD (laser diode) array, is provided instead of the fixing roller 288 for heat fixing.

Paper Output Unit

A paper output unit 222 is provided subsequently to the fixing unit 220. The paper output unit 222 includes an output tray 292, and a transfer drum 294, a conveyance belt 296 and a tensioning roller 298 are provided between the output tray 292 and the fixing drum 284 of the fixing unit 220 so as to oppose same. The recording medium 224 is sent to the conveyance belt 296 by the transfer drum 294 and output to the output tray 292. The details of the paper conveyance mechanism created by the conveyance belt 296 are not shown, but the leading end portion of a recording medium 224 after printing is held by a gripper on a bar (not illustrated) which spans between endless conveyance belts 296, and the recording medium is conveyed about the output tray 292 due to the rotation of the conveyance belts 296.

Furthermore, although not shown in FIG. 50, the inkjet recording apparatus 200 according to the present embodiment includes, in addition to the composition described above, an ink storing and loading unit which supplies ink to the inkjet heads 272M, 272K, 272C and 272Y, and a device which supplies treatment liquid to the treatment liquid deposition unit 214, as well as including a head maintenance unit which carries out cleaning (nozzle surface wiping, purging, nozzle suctioning, nozzle cleaning and the like) of the inkjet heads 272M, 272K, 272C and 272Y, a position determination sensor which determines the position of the recording medium 224 in the paper conveyance path, a temperature sensor which determines the temperature of the respective units of the apparatus, and the like.

Examples of Structure of Inkjet Head

Next, the structure of inkjet heads is described. The respective inkjet heads 272M, 272K, 272C and 272Y have the same structure, and a reference numeral 350 is hereinafter designated to any of the heads.

Figure 51A:
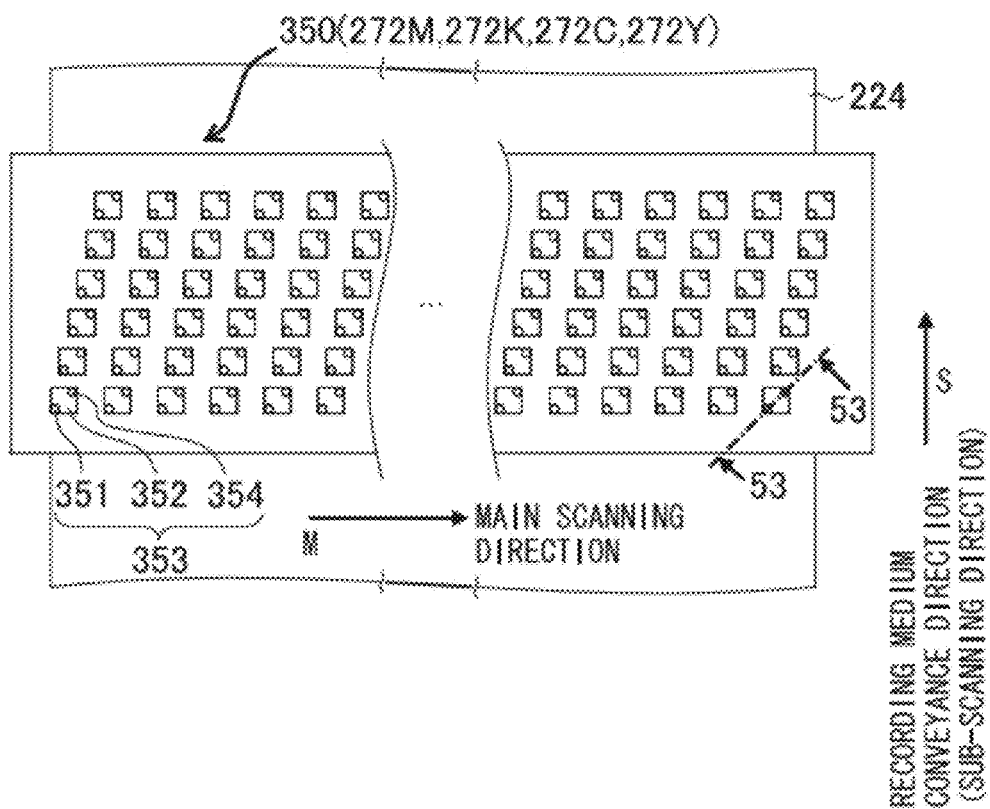
FIGS. 51A and 51B are plan view perspective diagrams showing an example of the composition of an inkjet head.
Figure 51B:
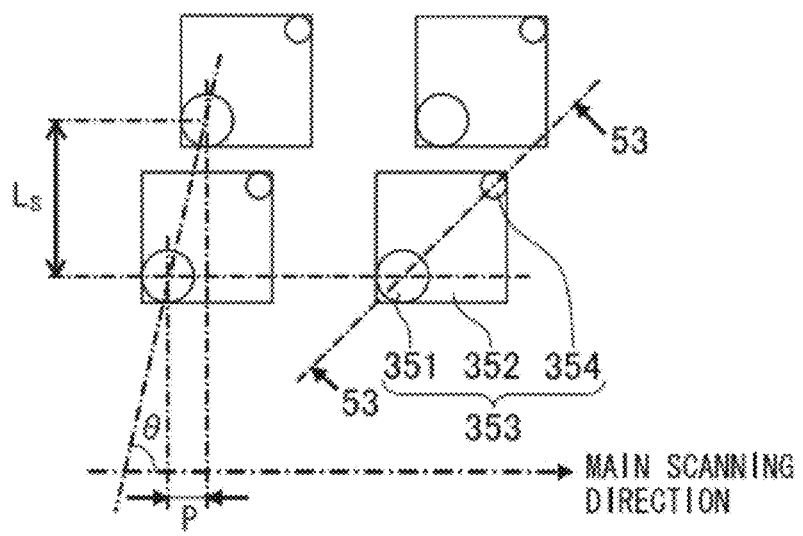
Figure 52A:
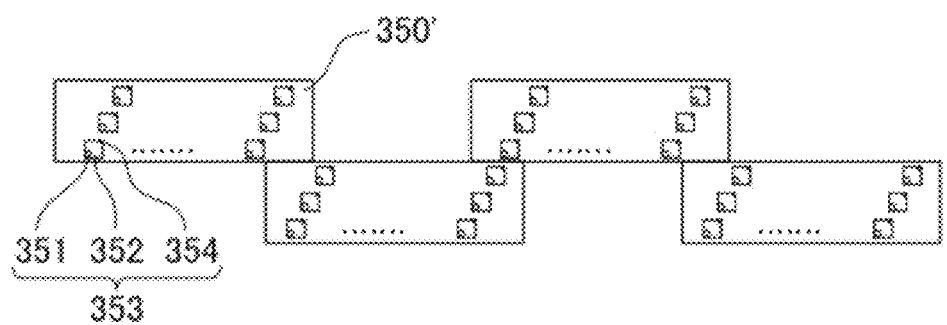
FIGS. 52A and 52B are diagrams showing examples of an inkjet head composed by joining together a plurality of head modules.
Figure 52B:
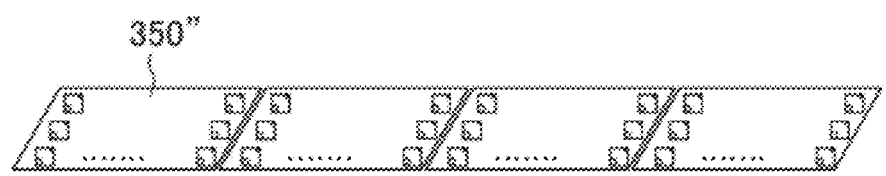
Figure 53:
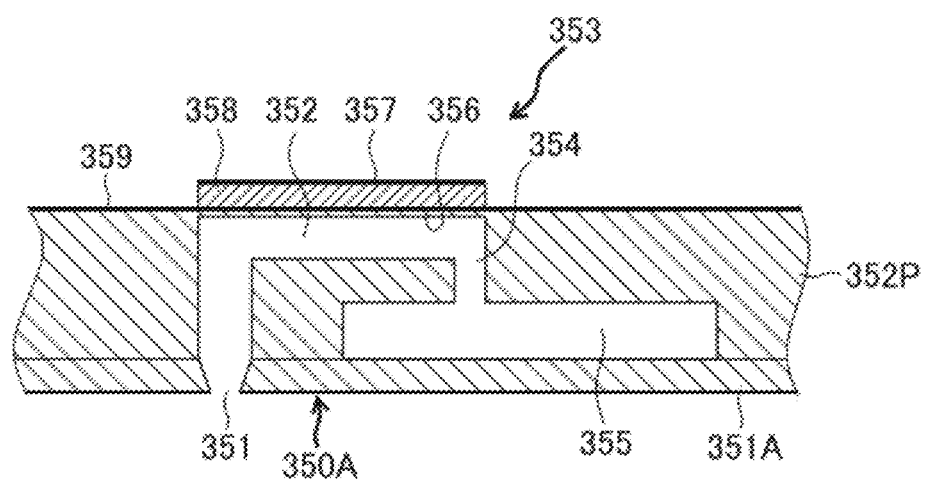
FIG. 53 is a cross-sectional diagram along line 53-53 in FIGS. 51A and 51B.

FIG. 51A is a plan perspective diagram illustrating an example of the structure of a head 350, and FIG. 51B is a partial enlarged diagram of same. FIGS. 52A and 52B each show an arrangement example of a plurality of head modules forming the head 350. Moreover, FIG. 53 is a cross-sectional diagram (a cross-sectional diagram along line 53-53 in FIGS. 51A and 51B) illustrating a structure of a liquid droplet ejection element for one channel being a recording element unit (ejection element unit).

As illustrated in FIGS. 51A and 51B, the head 350 according to the present embodiment has a structure in which a plurality of ink chamber units (liquid droplet ejection elements) 353, each having a nozzle 351 forming an ink droplet ejection aperture, a pressure chamber 352 corresponding to the nozzle 351, and the like, are disposed two-dimensionally in the form of a staggered matrix, and hence the effective nozzle interval (the projected nozzle pitch) as projected (orthographically-projected) in the lengthwise direction of the head (the direction perpendicular to the paper conveyance direction) is reduced and high nozzle density is achieved. In other words, the pitch P of the projected nozzles (see FIG. 51B) obtained by projecting the nozzles 351 to a straight line parallel to the main scanning direction can be treated equivalently to the recording pixel pitch WP described in relation to FIG. 8.

In the case of a head in which nozzles are arranged two-dimensionally as in the head 350, the number of detection pitches PP described in relation to FIG. 8 indicates a detection unit in which a pixel series of a prescribed number of print pixels aligned continuously in the projected nozzles is grouped together as one unit. For example, in a case where lines 103 are formed using a detection pitch number PP=6, as shown in FIG. 8, then the projected nozzles per detection pitch number PP=6 are selected from among the projected nozzles, (namely, projected nozzles separated by intervals of the detection pitch number PP are selected), and the lines 103 should be formed using the nozzles corresponding to the projected nozzles thus selected.

In order to form a row of nozzles that is equal to or longer than a length accommodating an entire width of a rendering area of the recording medium 224 in a direction (a direction of an arrow M; corresponding to the "x-direction") which is approximately perpendicular to a feed direction (a direction of an arrow S; corresponding to the "y-direction") of the recording medium 224, for example, as shown in FIG. 52A, short head modules 350' having a plurality of nozzles 351 in a two-dimensional arrangement are disposed in a staggered pattern to form a long linear head. Alternatively, as shown in FIG. 52B, a mode can be adopted in which head modules 350" are aligned in single rows and then joined together.

Moreover, with a single-pass printing full-line print head, in a case not only where an entire surface of the recording medium 224 is set as a rendering range, but also where a portion on the surface of the recording medium 224 is set as a rendering range, a row of nozzles necessary for rendering within a predetermined rendering area need only be formed.

The pressure chamber 352 provided to each nozzle 351 has substantially a square planar shape (see FIGS. 51A and 51B), and has an outlet port for the nozzle 351 at one of diagonally opposite corners and an inlet port (supply port) 354 for receiving the supply of the ink at the other of the corners. The planar shape of the pressure chamber 352 is not limited to this embodiment and can be various shapes including quadrangle (rhombus, rectangle, etc.), pentagon, hexagon, other polygons, circle, and ellipse.

As illustrated in FIG. 53, the head 350 is configured by stacking and joining together a nozzle plate 351A, in which the nozzles 351 are formed, a flow channel plate 352P, in which the pressure chambers 352 and the flow channels including the common flow channel 355 are formed, and the like. The nozzle plate 351A constitutes a nozzle surface (ink ejection surface) 350A of the head 350 and has formed therein a plurality of two-dimensionally arranged nozzles 351 communicating respectively to the pressure chambers 352.

The flow channel plate 352P constitutes lateral side wall parts of the pressure chamber 352 and serves as a flow channel formation member, which forms the supply port 354 as a limiting part (the narrowest part) of the individual supply channel leading the ink from a common flow channel 355 to the pressure chamber 352. FIG. 53 is simplified for the convenience of explanation, and the flow channel plate 352P may be structured by stacking one or more substrates.

The nozzle plate 351A and the flow channel plate 352P can be made of silicon and formed in the prescribed shapes by means of the semiconductor manufacturing process.

The common flow channel 355 is connected to an ink tank (not shown), which is a base tank for supplying ink, and the ink supplied from the ink tank is delivered through the common flow channel 355 to the pressure chambers 352.

A piezo-actuator (piezoelectric element) 358 having an individual electrode 357 is connected on a diaphragm 356 constituting a part of faces (the ceiling face in FIG. 53) of the pressure chamber 352. The diaphragm 356 in the present embodiment is made of silicon (Si) having a nickel (Ni) conductive layer serving as a common electrode 359 corresponding to lower electrodes of a plurality of piezo-actuators 358, and also serves as the common electrode of the piezo-actuators 358, which are disposed on the respective pressure chambers 352. The diaphragm 356 can be formed by a non-conductive material such as resin; and in this case, a shared electrode layer made of a conductive material such as metal is formed on the surface of the diaphragm member. It is also possible that the diaphragm is made of metal (an electrically-conductive material) such as stainless steel (SUS), which also serves as the shared electrode.

When a drive voltage is applied to the individual electrode 357, the piezo-actuator 358 is deformed, the volume of the pressure chamber 352 is thereby changed, and the pressure in the pressure chamber 352 is thereby changed, so that the ink inside the pressure chamber 352 is ejected through the nozzle 351. When the displacement of the piezo-actuator 358 is returned to its original state after the ink is ejected, new ink is refilled in the pressure chamber 352 from the shared flow channel 355 through the supply port 354.

As illustrated in FIG. 51B, the plurality of ink chamber units 353 having the above-described structure are arranged in a prescribed matrix arrangement pattern in a line direction along the main scanning direction and a column direction oblique at a given angle of θ, which is not orthogonal to the main scanning direction, and thereby the high density nozzle head is formed in the present embodiment. In this matrix arrangement, the nozzles 351 can be regarded to be equivalent to those substantially arranged linearly at a fixed pitch $P=L_s/\tan\theta$ along the main scanning direction, where $L_s$ is a distance between the nozzles adjacent in the sub-scanning direction.

In implementing the present invention, the mode of arrangement of the nozzles 351 in the head 350 is not limited to the embodiments in the drawings, and various nozzle arrangement structures can be employed. For example, instead of the matrix arrangement as described in FIG. 53, it is also possible to use a V-shaped nozzle arrangement, or an undulating nozzle arrangement, such as zigzag configuration (staggered configuration; W-shape arrangement), which repeats units of V-shaped nozzle arrangements.

The means which generate pressure (ejection energy) applied to eject droplets from the nozzles in the inkjet head is not limited to the piezo-actuator (piezoelectric element), and can employ various pressure generation devices (ejection energy generation devices), such as heaters (heating elements) in a thermal system (which uses the pressure resulting from film boiling by the heat of the heaters to eject ink), static actuators, and various actuators in other systems. According to the ejection system employed in the head, the suitable energy generation elements are arranged in the flow channel structure.

Description of Control System

Figure 54:
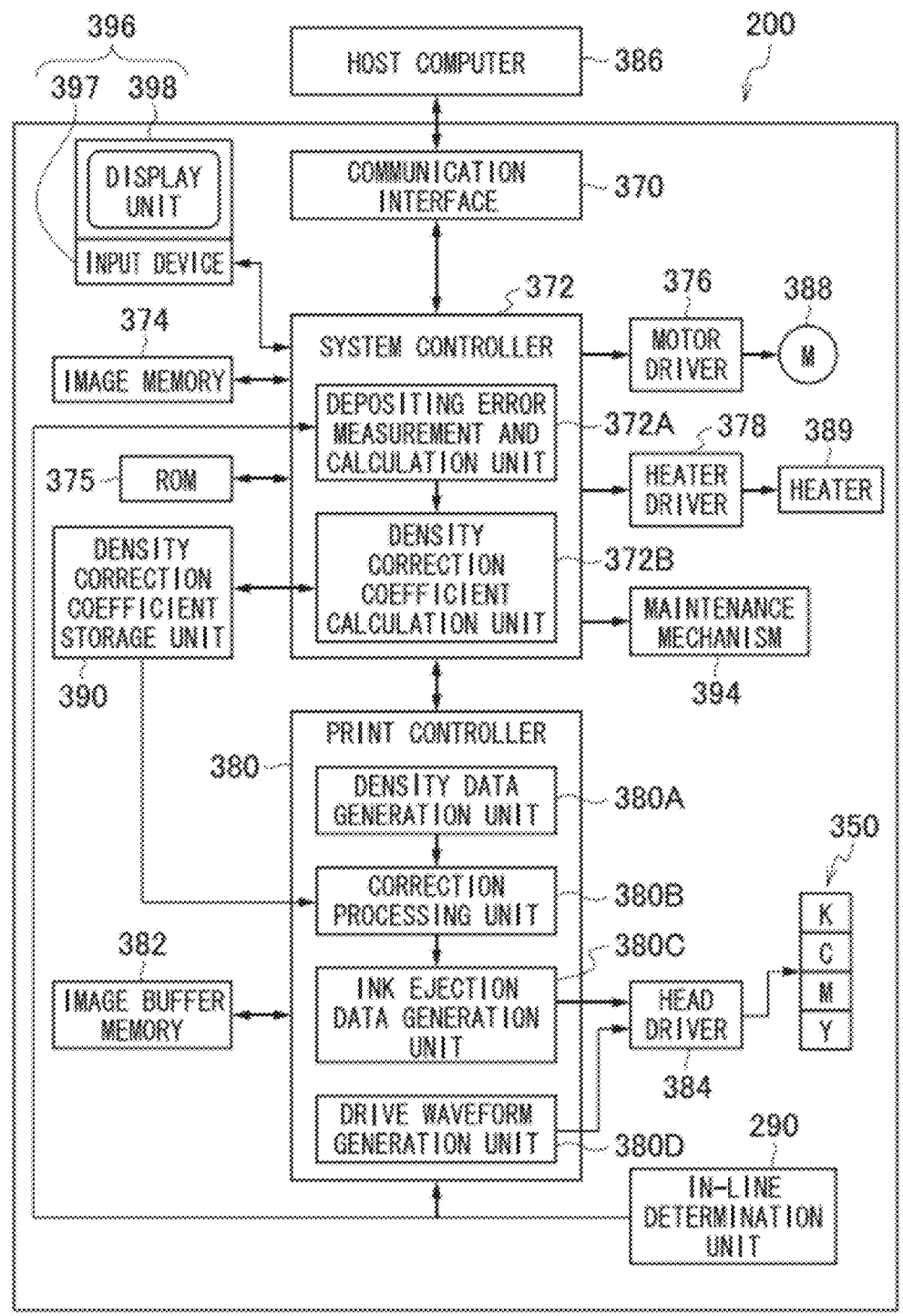
FIG. 54 is a block diagram showing the composition of a control system of an inkjet recording apparatus.

FIG. 54 is a block diagram showing the system configuration of the inkjet recording apparatus 200. As shown in FIG. 54, the inkjet recording apparatus 200 includes a communication interface 370, a system controller 372, an image memory 374, a ROM 375, a motor driver 376, a heater driver 378, a print controller 380, an image buffer memory 382, a head driver 384 and the like.

The communication interface 370 is an interface unit (image input device) for receiving image data sent from a host computer 386. A serial interface such as USB (Universal Serial Bus), IEEE1394, Ethernet (registered trademark), and wireless network, or a parallel interface such as a Centronics interface may be used as the communication interface 370. A buffer memory (not shown) may be mounted in this portion in order to increase the communication speed.

The image data sent from the host computer 386 is received by the inkjet recording apparatus 200 through the communication interface 370, and is temporarily stored in the image memory 374. The image memory 374 is a storage device for storing images inputted through the communication interface 370, and data is written and read to and from the image memory 374 through the system controller 372. The image memory 374 is not limited to a memory composed of semiconductor elements, and a hard disk drive or another magnetic medium may be used.

The system controller 372 is constituted of a central processing unit (CPU) and peripheral circuits thereof, and the like, and it functions as a control device for controlling the whole of the inkjet recording apparatus 200 in accordance with a prescribed program, as well as a calculation device for performing various calculations. More specifically, the system controller 372 controls the various sections, such as the communication interface 370, image memory 374, motor driver 376, heater driver 378, and the like, as well as controlling communications with the host computer 386 and writing and reading to and from the image memory 374 and the ROM 375, and it also generates control signals for controlling the motor 388 and heater 389 of the conveyance system.

Furthermore, the system controller 372 includes a depositing error measurement and calculation unit 372A, which performs calculation processing for generating data indicating the positions of defective nozzles, depositing position error data, data indicating the density distribution (density data) and other data from the image data read in from the test chart by the in-line sensor (in-line determination unit) 290, and a density correction coefficient calculation unit 372B, which calculates density correction coefficients from the information relating to the measured depositing position error and the density information. The processing functions of the depositing error measurement and calculation unit 372A and the density correction coefficient calculation unit 372B can be realized by means of an ASIC (application specific integrated circuit), software, or a suitable combination of same. Further, the system controller 372 functions as the device for analyzing the read image which has been described using FIG. 17 to FIG. 46. The data of the correction factor (correction coefficient) of density obtained by the calculation unit 372B of the correction factor of density is stored in the storage unit 390 of correction factor of density.

The program executed by the CPU of the system controller 372 and the various types of data (including data for deposition to form the test chart for detecting defective ejection nozzles, information on defective ejection nozzles and the like) which are required for control procedures are stored in the ROM 375. A rewriteable storage device, such as an EEPROM may be employed as the ROM 375. By utilizing the storage region of this ROM 375, the ROM 375 can be configured to be able to serve also as the density correction coefficient storage unit 390.

The image memory 374 is used as a temporary storage region for the image data, and it is also used as a program development region and a calculation work region for the CPU.

The motor driver (drive circuit) 376 drives the motor 388 of the conveyance system in accordance with commands from the system controller 372. The heater driver (drive circuit) 378 drives the heater 389 of the drying unit 218 or the like in accordance with commands from the system controller 372.

The print controller 380 function as a signal processing device of performing various treatment processes, corrections, and the like, in order to generate a signal for controlling droplet ejection from the image data (multiple-value input image data) in the image memory 374, in accordance with the control implemented by the system controller 372. Also, the print controller 380 function as a device of driving control that it controls the ejection driving of the head 350 by supplying the data of ink ejection generated to the head driver 384.

In other words, the print controller 380 includes a density data generation unit 380A, a correction processing unit 380B, an ink ejection data generation unit 380C and a drive waveform generation unit 380D. These functional units (380A to 380D) can be realized by a device of an ASIC, software or a suitable combination of same.

The density data generation unit 380A is a signal processing device that generates initial density data of the respective ink colors from the input image data and it carries out density conversion processing (including UCR processing and color conversion) and, where needed, it also performs pixel number conversion processing.

The correction processing unit 380B is a processing device which performs density correction calculations using the density correction factor (coefficients) stored in the density correction coefficient storage unit 390, and it carries out the non-uniformity correction processing for eliminating an image defect attributable to a defective ejection nozzle or the like.

The ink ejection data generation unit 380C is a signal processing device including a halftoning device which converts the corrected image data (density data) generated by the correction processing unit 380B into binary or multiple-value dot data. Also the ink ejection data generation unit 380C carries out binarization (multiple-value conversion) processing on the image data.

The ink ejection data generated by the ink ejection data generation unit 380C is supplied to the head driver 384 and it controls the ink ejection operation of the head 350 accordingly.

The drive waveform generation unit 380D is a device for generating drive signal waveforms for driving the piezo-actuators 358 (see FIG. 53) corresponding to the respective nozzles 351 of the head 350. The signal (drive waveform) generated by the drive waveform generation unit 380D is supplied to the head driver 384. The signal outputted from the drive waveforms generation unit 380D may be digital waveform data, or it may be an analog voltage signal.

The drive waveform generation unit 380D selectively generates a recording waveform drive signal and an abnormal nozzle detection waveform drive signal. The various waveform data is stored in advance in a ROM 375 and, when needed, waveform data to be used is selectively outputted. The inkjet recording apparatus 200 described in the present example adopts a drive system in which a shared driving power waveform signal is applied to each piezo-actuator 358 of a module that constitutes the head 350, and a switching element (not shown) connected to an individual electrode of each piezo-actuator 358 is turned on/off according to an ejection timing of each nozzle 351 to cause the nozzle 351 corresponding to each piezo-actuator 358 to eject ink.

The print controller 380 is provided with the image buffer memory 382, which temporarily stores data such as image data and parameters during image data processing performed by the print controller 380. While FIG. 54 shows a mode in which the image buffer memory 382 accompanies the print controller 380, the image memory 374 can function as the image buffer memory 382. In addition, a mode can be adopted in which the print controller 380 and the system controller 372 are integrated and configured by a single processor.

To give a general description of the sequence of processing from image input to print output, image data to be printed is inputted from an external source through the communication interface 370, and is accumulated in the image memory 374. At this stage, multiple-value RGB image data is stored in the image memory 374, for example.

In this inkjet recording apparatus 200, an image which appears to have a continuous tonal graduation to the human eye is formed by changing the deposition density of fine dots created by ink (coloring material) and the dot size of the fine dots, and therefore, it is necessary to convert the input digital image into a dot pattern which reproduces the tonal graduations of the image (namely, the light and shade toning of the image) as similarly as possible. Therefore, original image data (RGB data) stored in the image memory 374 is sent to the print controller 380, through the system controller 372, and is converted to the dot data per ink color by passing through the density data generation unit 380A, the correction processing unit 380B, and the ink ejection data generation unit 380C of the print controller 380.

Dot data is generally generated by performing color conversion and halftone processing on image data. The processing of color conversion is that the image data expressed as sRGB and the like (for example, RGB 8-bit image data) into color data of each color of ink used by an inkjet printer (in the present example, color data of KCMY).

Halftone processing is processing that the each color data generated by color conversion processing is changed into dot data of each color (in the present example, KCMY dot data) by an error diffusion method, a threshold matrix method, and the like.

In other words, the print controller 380 performs processing for converting the input RGB image data into dot data for the four colors of K, C, M and Y. Processing for correcting ejection failure, in order to correct an image defect attributable to a defective ejection nozzle, is performed when the processing of conversion to dot data is carried out.

The dot data thus generated by the print controller 380 is stored in the image buffer memory 382. This dot data of the respective colors is converted into CMYK droplet ejection data for ejecting ink from the nozzles of the head 350, thereby establishing the ink ejection data to be printed.

The head driver 384 includes an amplifier circuit (power amplifier circuit) and outputs drive signals for driving the piezo-actuators 358 corresponding to the nozzles 351 of the head 350 in accordance with the print contents, on the basis of the ink ejection data and the drive waveform signals supplied by the print controller 380. A feedback control system for maintaining constant drive conditions in the head may be included in the head driver 384.

By supplying the drive signals outputted by the head driver 384 to the head 350 in this way, ink is ejected from the corresponding nozzles 351. By controlling ink ejection from the print head 350 in synchronization with the conveyance speed of the recording medium 224, an image is formed on the recording medium 224.

As described above, the ejection volume and the ejection timing of the ink droplets from the respective nozzles are controlled through the head driver 384, on the basis of the ink ejection data generated by implementing prescribed signal processing in the print controller 380, and the drive signal waveform. By this means, prescribed dot size and dot positions can be achieved.

As described with reference to FIG. 50, the in-line sensor (determination unit) 290 is a block including an image sensor, which reads in the image printed on the recording medium 224, performs various signal processing operations, and the like, and determines the print situation (presence/absence of ejection, variation in droplet ejection, optical density, and the like), these determination results being supplied to the print controller 380 and the system controller 372.

The print controller 380 implements various corrections with respect to the head 350, on the basis of the information obtained from the in-line sensor (determination unit) 290, according to requirements, and it implements control for carrying out cleaning operations (nozzle restoring operations), such as preliminary ejection, suctioning, or wiping, as and when necessary.

The maintenance mechanism 394 includes members used to head maintenance operation, such as an ink receptacle, a suction cap, a suction pump, a wiper blade, and the like.

The operating unit 396 which forms a user interface is constituted of an input device 397 through which an operator (user) can make various inputs, and a display unit 398. The input device 397 may employ various formats, such as a keyboard, mouse, touch panel, buttons, or the like. The operator is able to input print conditions, select image quality modes, input and edit additional information, search for information, and the like, by operating the input device 397, and is able to check various information, such as the input contents, search results, and the like, through a display on the display unit 398. The display unit 398 also functions as a warning notification device which displays a warning message, or the like.

Moreover, the color conversion processing unit 110, the non-ejection nozzle correction image processing unit 112, the half-tone processing unit 114, the image memory 116, the image analyzing unit 124, the test pattern synthesizing unit 118, the head driver 128, the defective ejection nozzle determining unit 130, the defective ejection nozzle detection unit 132, the defective nozzle information accumulating unit 126, the defective ejection correction judgement unit 122, the correction information setting unit 120 and the like, which are described using FIG. 48, are configured as a single component or a combination of a plurality of components of the control system shown in FIG. 54.

The image memory 116, the head driver 128, and the head 50 shown in FIG. 48 correspond to the image memory 374, the head driver 384, and the head 350 shown in FIG. 54.

A combination of the system controller 372 and the print controller 380 in FIG. 54 functions as a "signal processing device", a "dividing device", a "prediction signal generation device", a "threshold value determination device", a "change signal calculation device", an "error distance calculation device", a "defective recording element judgement device", a "test pattern output control device", an "image correction device" and a "recording control device".

It is also possible to adopt a mode in which the host computer 386 is equipped with all or a portion of the processing functions carried out by the depositing error measurement and calculation unit 372A, the density correction coefficient calculation unit 372B, the density data generation unit 380A and the correction processing unit 380B as shown in FIG. 54.

As described above, with the inkjet recording apparatus according to the present embodiment, since a deposited position of ink drops ejected from each nozzle on a recording paper can be accurately grasped by analyzing a read image of a test pattern, a position of a defective ejection nozzle can be identified with high accuracy. As a result, precise correction that compensates for an image defect attributable to a defective ejection nozzle can be performed on input image data. An overall processing flow based on the various processes described above will now be described.

Description of Image Printing Process

Figure 55:
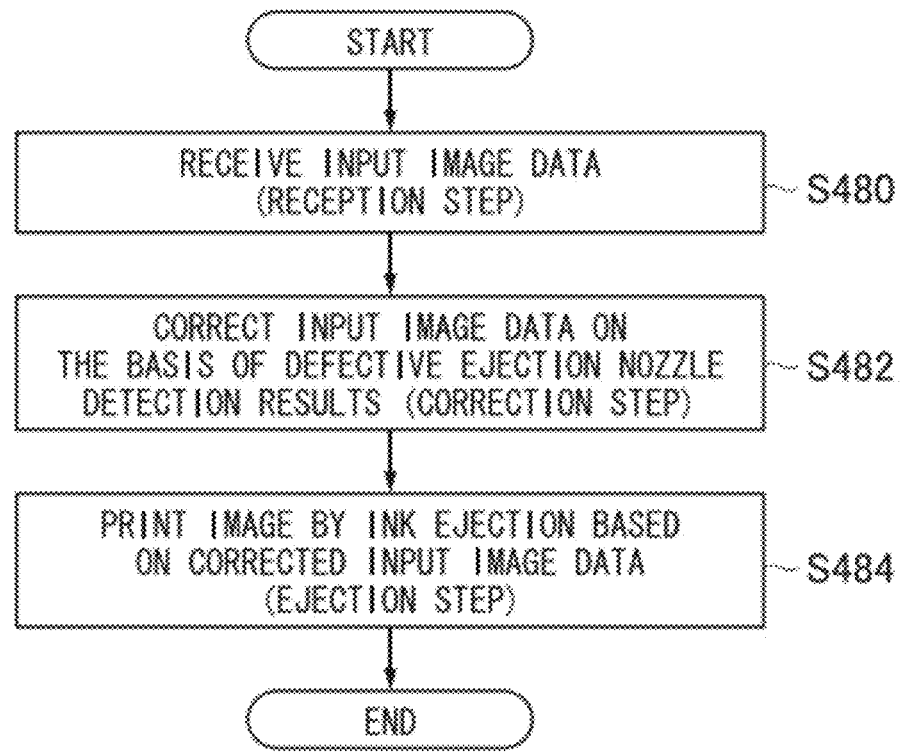
FIG. 55 is a flowchart showing a flow of image printing according to an embodiment of the present invention.

FIG. 55 is a flow chart showing an entire flow of image printing. When input image data of a desired image that is sent from the host computer 386 (refer to FIG. 54) is received via the communication interface (receiving device) 370 (the receiving step shown as S480 in FIG. 55), the input image data is corrected (the correcting step shown as S482 in FIG. 55) through color conversion (the color conversion processing unit 110 shown in FIG. 48), defective ejection nozzle correction (the non-ejection nozzle correction image processing unit 112), halftone processing (the half-tone processing unit 114), and test pattern synthesis (the test pattern synthesizing unit 118).

Subsequently, based on the corrected input image data, by having the head driver 384 (reference numeral 128 in FIG. 48) cause ink drops to be ejected toward the recording medium 224 from a nozzle 351 of each head 350 (the ejection step shown as S484 in FIG. 55), a desired image can be vividly printed on the recording medium 224.

In the correcting step (S482) described above, ejection of ink drops from a defective ejection nozzle is compensated by another normal nozzle and, at the same time, defective ejection nozzle correction (non-ejection nozzle correction image processing unit 112) for preventing ink drops from being ejected from the defective ejection nozzle is performed on the input image data. Defective ejection nozzle correction is performed at the defective ejection nozzle detection unit 132 (refer to FIG. 48) based on read image data of the test pattern 102 sent from the test pattern reading unit 136.

Moreover, there are various methods for performing ejection suspension on a defective ejection nozzle and compensating a rendering defect of the defective ejection nozzle by another nozzle such as (1) correcting an output image and (2) increasing ejection signal strength and correcting an ejection dot diameter to a larger size.

(1) Method of Correcting Output Image

If Ddefault denotes an image density of rendering in a periphery of a non-ejection correction nozzle, by setting an image density at the non-ejection correction nozzle to DNo-Print (>Ddefault), rendering density of the non-ejection correction nozzle can be increased and white noise visibility can be reduced. A ratio between the image densities can be defined as a non-ejection correction nozzle image density amplification amount P density.

(2) Method of Increasing Ejection Signal and Increasing Ejection Dot Diameter

If Rdefault denotes a dot diameter of rendering in a periphery of a non-ejection correction nozzle, by setting a dot diameter at the non-ejection correction nozzle to R No Print (>Rdefault), rendering density of the non-ejection correction nozzle can be increased and white noise visibility can be reduced. A ratio between the dot diameters can be defined as a non-ejection correction nozzle dot density amplification amount P dot.

If amounts of increase of rendering by a non-ejection correction nozzle such as the non-ejection correction nozzle image density amplification amount P density and the non-ejection correction nozzle dot density amplification amount P dot in the two representative examples described above or similar compensation amounts are collectively defined as a non-ejection correction parameter P, then image correction is performed using the non-ejection correction parameter P.

Modification

A 1-on n-off line pattern has been exemplified as the test pattern 102. However, in addition to a line corresponding to a single nozzle, a pattern may be used in which band-like blocks or the like in which a plurality of (for example, two to three) lines are integrally combined are aligned approximately regularly.

Configuration Example of Using Off-Line Scanner

While an example in which an in-line sensor 290 built into an inkjet recording apparatus 200 is used to read a test pattern and an apparatus for analyzing the read image is also mounted in the inkjet recording apparatus 200 has been described with reference to FIGS. 50 to 55, the present invention can be implemented by a configuration in which a print result of a test pattern is read using an off-line scanner that is independent of the inkjet recording apparatus 200 and data of the read image is analyzed by an apparatus such as a personal computer.

Recording Medium

"Recording medium" is a collective term for media on which dots are recorded by a recording element and include variously named media such as a print medium, a recorded medium, an image-formed medium, an image-receiving medium, and an ejection-receiving medium. When implementing the present invention, materials, shapes, and the like of the recorded medium are not particularly restricted. The present invention can be applied to various types of media regardless of material or shape including continuous-form paper, a cut sheet, a printer label, a resin sheets such as an OHP sheet, film, cloth, a print board on which a wiring pattern or the like can be formed, and a rubber sheet.

Device for Relatively Moving Head and Paper

While a configuration in which a recorded medium is conveyed with respect to a stationary head has been exemplified in the embodiment described above, the present invention can also be implemented with a configuration in which a head is moved with respect to a stationary recorded medium. While a single-pass full-line recording head is normally disposed along a direction perpendicular to a feed direction (conveying direction) of a recorded medium, a mode is also possible in which the head is disposed along an oblique direction having a predetermined angle with respect to a direction perpendicular to the conveying direction.

Modification of Head Configuration

While an inkjet recording apparatus using a page-wide full-line head having a row of nozzles that is long enough to accommodate an entire width of a recording medium has been described in the embodiment described above, a range of application of the present invention is not restricted thereto. The present invention can also be applied to an inkjet recording apparatus which moves a short recording head such as a serial (shuttle scan) head and which records an image by performing a plurality of scanning operations using the head. Moreover, when forming a color image using an inkjet printing head, a head may be disposed for each of a plurality of color inks (recording fluids) or a configuration maybe adopted in which a single recording head is capable of ejecting a plurality of color inks.

Application of the Present Invention

In the embodiments described above, application to the inkjet recording apparatus for graphic printing has been described, but the scope of application of the present invention is not limited to this. For example, the present invention can be applied widely to inkjet systems which forms various shapes or patterns using liquid function material, such as a wire printing apparatus, which forms an image of a wire pattern for an electronic circuit, manufacturing apparatuses for various devices, a resist printing apparatus, which uses resin liquid as a functional liquid for ejection, a color filter manufacturing apparatus, a fine structure forming apparatus for forming a fine structure using a material for material deposition, or the like.

Utilization Except Inkjet Recording Heads

While an inkjet recording apparatus has been exemplified as an image forming apparatus using a recording head in the description above, a range of application of the present invention is not restricted thereto. In addition to inkjet systems, the present invention can also be applied to various types of image forming apparatuses which perform dot recording such as a thermal transfer recording apparatus having a recording head that uses a thermal element as a recording element, an LED electronic photograph printer having a recording head that uses an LED element as a recording element, and a silver halide photography printer having an LED line exposure head.

It should be understood that there is no intention to limit the invention to the specific forms disclosed, but on the contrary, the invention is to cover all modifications, alternate constructions and equivalents falling within the spirit and scope of the invention as expressed in the appended claims.

APPENDIX

As has become evident from the detailed description of the embodiments of the invention given above, the present specification includes disclosure of various technical ideas including the inventions described below.

(Aspect 1)

One aspect of the invention is directed to a recording position error measurement apparatus, comprising: a read image signal acquisition device which acquires a read image signal of a test pattern recorded on a recording medium by a plurality of recording elements while causing relative movement between the recording medium and a recording head in which the plurality of recording elements are arranged; and a signal processing device which carries out processing for analyzing the read image signal so as to identify recording position errors of the plurality of recording elements, wherein: the test pattern includes line-shaped patterns which are recorded by operating the recording elements corresponding to projected recording elements selected at an interval of a fixed detection pitch number PP, from among an alignment of projected recording elements obtained by projecting the plurality of recording elements of the recording head onto a straight line parallel to a first direction that is orthogonal to a direction of the relative movement; when an interval between the projected recording elements aligned in the first direction is represented by a recording pixel pitch WP, a pixel size in the first direction of read image data acquired by the read image signal acquisition device is represented by a read pixel pitch WS, and a group of a plurality of read pixels aligned continuously in the first direction which forms an analysis unit for analyzing the read image signal is represented by an analysis pitch number PS, then a period T determined by $T=WP \times PP \div |WS \times PS - WP \times PP|$ is three or greater in units of pixels of the read image signal; and the signal processing device has: a dividing device which divides pixel series of the read image signal into sequences having different remainder values so as to generate image signals of the respective sequences, the remainder values being obtained respectively by dividing read pixel numbers by the analysis pitch number PS, the read pixel numbers being respectively assigned as consecutive integers, in alignment sequence, to pixels which are aligned in the first direction with respect to the acquired read image signal; a prediction signal generation device which calculates regular prediction signals which are predicted with respect to the respective sequences, according to the read image signal; a threshold value determination device which determines tone value differences corresponding to respective distances representing recording position errors from the prediction signals, and which determines threshold values corresponding respectively to the recording position errors, from the tone value differences; a change signal calculation device which calculates a change signal indicating a difference between the prediction signal and the image signal of each of the sequences; and an error distance calculation device which specifies the recording position errors of the plurality of recording elements in the recording head according to comparing the change signal with each of the threshold values.

According to this aspect of the invention, a read image signal is obtained in which a line-shaped test pattern recorded by operating recording elements at intervals of the detection pitch number PP apart, from among recording elements arranged at a recording pitch WP, is read in at a pitch WS. This read image signal is divided into a plurality of sequences and a regular signal predicted in each sequence is calculated. Since the test pattern is aligned in broadly regular fashion, the signals of each sequence show periodic variation. A prediction signal is determined by using the periodicity (regularity) of the read image signal corresponding to this regular pattern arrangement. One period of the prediction signal for each sequence can be associated with an image profile corresponding to one line, and respective threshold values for measurement are determined from the relationship between the amount of change in the signal value of the prediction signal and the recording position error.

Furthermore, in each sequence, a change signal indicating the difference between the original signal and the prediction signal is calculated, and the recording position errors (distance) of the recording elements are identified on the basis of change signals measured in each sequence and the respective threshold values. By this means, it is possible to identify defective recording elements accurately, even though read image signal of low resolution.

With regard to the interpretation of the term "regular" when it is stated that the line-shaped patterns are arranged in regular fashion (with periodicity), considering the case of an ideal test pattern in which all of the recording elements are functioning correctly, although the test pattern (for example, a line pattern formed at uniform line pitch) ought to be formed as a regular pattern (namely, with a uniform line pitch), the test pattern that is actually recorded suffers disturbance of the regularity of the pattern due to the effects of defective recording elements, and the like. However, in overall terms, the pattern broadly has regularity. Reference here to "regular" includes the case of patterns which are broadly regular and where disturbance of the regularity as described above is accepted.

The test pattern may be, for example, a pattern which includes a plurality of lines formed by a dot series corresponding to respective recording elements on the recording medium, by recording dots in continuous fashion by the recording elements while moving the recording head and the recording medium relatively. The lines in this case are formed by line segments which are parallel to the relative movement direction of the recording medium with respect to the recording head (the second direction). A desirable example of a test pattern is one which employs a so-called 1-on n-off type of line pattern.

For the "read image signal acquisition device", it is possible to employ an image reading device which reads in a test pattern recorded on a recording medium and generates a read image signal by converting to electronic image data. Furthermore, it is also possible to adopt a composition in which read image data generated by the image reading device is acquired via an external storage medium, such as a memory card, or via another communication interface, such as a USB, LAN or other interface (wired or wireless). In this case, the media interface and the communication interface correspond to the "read image signal acquisition device".

(Aspect 2)

Desirably, the prediction signal generation device creates average profiles indicating average characteristics of the respective sequences, from the image signals which are divided into the respective sequences, and generates the prediction signals from the average profiles.

In creating the average profile, it is possible to use a low-pass filtering process, a smoothing process, and the like.

(Aspect 3)

Desirably, the threshold value determination device determines the threshold values by associating one period of the prediction signals with a profile corresponding to one line of the line-shaped patterns.

The prediction signal of one period can be considered as a substitute for the image profile of one line, based on the pitch difference $\Delta P$ between the analysis pitch (WS×PS) and the detection pitch (WP×PP), and the periodicity of the regularly arranged line-shaped patterns.

(Aspect 4)

Desirably, the read pixel pitch WS is larger than the recording pixel pitch WP.

This mode of the invention is able to measure the recording position error (distance) of recording elements suitably, even if the reading resolution of the image reading device which reads in the test pattern is lower than the recording resolution of the recording head.

(Aspect 5)

Another aspect of the invention is directed to a recording position error measurement method, comprising: a read image signal acquisition step of acquiring a read image signal of a test pattern recorded on a recording medium by a plurality of recording elements while causing relative movement between the recording medium and a recording head in which the plurality of recording elements are arranged; and a signal processing step of carrying out processing for analyzing the read image signal so as to identify recording position errors of the plurality of recording elements, wherein: the test pattern includes line-shaped patterns which are recorded by operating the recording elements corresponding to projected recording elements selected at an interval of a fixed detection pitch number PP, from among an alignment of projected recording elements obtained by projecting the plurality of recording elements of the recording head onto a straight line parallel to a first direction that is orthogonal to a direction of the relative movement; when an interval between the projected recording elements aligned in the first direction is represented by a recording pixel pitch WP, a pixel size in the first direction of read image data is represented by a read pixel pitch WS, and a group of a plurality of read pixels aligned continuously in the first direction which forms an analysis unit for analyzing the read image signal is represented by an analysis pitch number PS, then a period T determined by $T=WP\times PP\div|WS\times PS-WP\times PP|$ is three or greater in units of pixels of the read image signal; and the signal processing step includes: a dividing step of dividing pixel series of the read image signal into sequences having different remainder values so as to generate image signals of the respective sequences, the remainder values being obtained respectively by dividing read pixel numbers by the analysis pitch number PS, the read pixel numbers being respectively assigned as consecutive integers, in alignment sequence, to pixels which are aligned in the first direction with respect to the acquired read image signal; a prediction signal generating step of calculating regular prediction signals which are predicted with respect to the respective sequences, according to the read image signal; a threshold value determination step of determining tone value differences corresponding to respective distances representing recording position errors from the prediction signals, and determining threshold values corresponding respectively to the recording position errors, from the tone value differences; a change signal calculation step of calculating a change signal indicating a difference between the prediction signal and the image signal of each of the sequences; and an error distance calculation step of specifying the recording position errors of the plurality of recording elements in the recording head according to comparing the change signal with each of the threshold values.

(Aspect 6)

Desirably, the recording position error measurement method further comprises: a test pattern forming step of recording the test pattern on the recording medium by the recording head having the plurality of recording elements; and an image reading step of generating the read image signal by reading the test pattern recorded on the recording medium in the test pattern forming step, by an image reading device.

The method aspects (aspects 5 and 6) of the inventions described above may also adopt modes which combine the characteristic features of aspects 2-4.
(Aspect 7)

Another aspect of the invention is directed to an image forming apparatus, comprising: a recording head in which a plurality of recording elements are arranged; a medium conveyance device which causes relative movement between a recording medium and the recording head; a test pattern output control device which controls a recording operation of the recording head in such a manner that a test pattern is formed on the recording medium by the recording head; an image reading device which reads the test pattern recorded on the recording medium and generates a read image signal, wherein: the test pattern includes line-shaped patterns which are recorded by operating the recording elements corresponding to projected recording elements selected at an interval of a fixed detection pitch number PP, from among an alignment of projected recording elements obtained by projecting the plurality of recording elements of the recording head onto a straight line parallel to a first direction that is orthogonal to a direction of the relative movement; when an interval between the projected recording elements aligned in the first direction is represented by a recording pixel pitch WP, a pixel size in the first direction of read image data is represented by a read pixel pitch WS, and a group of a plurality of read pixels aligned continuously in the first direction which forms an analysis unit for analyzing the read image signal is represented by an analysis pitch number PS, then a period T determined by T=WP×PP÷|WS×PS−WP×PP| is three or greater in units of pixels of the read image signal; and the image forming apparatus further comprises: a dividing device which divides pixel series of the read image signal into sequences having different remainder values so as to generate image signals of the respective sequences, the remainder values being obtained respectively by dividing read pixel numbers by the analysis pitch number PS, the read pixel numbers being respectively assigned as consecutive integers, in alignment sequence, to pixels which are aligned in the first direction with respect to the acquired read image signal; a prediction signal generation device which calculates regular prediction signals which are predicted with respect to the respective sequences, according to the read image signal; a threshold value determination device which determines tone value differences corresponding to respective distances representing recording position errors from the prediction signals, and which determines threshold values corresponding respectively to the recording position errors, from the tone value differences; a change signal calculation device which calculates a change signal indicating a difference between the prediction signal and the image signal of each of the sequences; an error distance calculation device which specifies the recording position errors of the plurality of recording elements in the recording head according to comparing the change signal with each of the threshold values; an image correction device which corrects the image data according to information about the recording position errors specified by the error distance calculation device; and a recording control device which implements image recording by controlling a recording operation of the recording elements of the recording head in accordance with the image data which has been corrected by the image correction device.

According to this mode, by adopting a composition for an image forming apparatus which includes an image reading device and a read image analysis processing function, then it is possible to output a test chart and to read in the output results. By this means, it is possible to achieve efficient analysis, measure the recording position errors on the basis of this analysis, and perform image correction on the basis of the measurement results, and so on.
(Aspect 8)

Desirably, the image forming apparatus further comprises: a defective recording element judgement device which identifies a defective recording element from the plurality of recording elements in the recording head, according to the information about the recording position errors specified by the error distance calculation device; and a memory device which stores information about the defective recording element identified by the defective recording element judgement device, wherein: the image correction device corrects the image data so as to record a desired image by halting a recording operation of the identified defective recording element and compensating for a recording omission of the defective recording element by the recording elements other than the defective recording element; and the recording control device implements the image recording by controlling the recording operation of the recording elements other than the defective recording element in accordance with the image data which has been corrected by the image correction device.

In order to make up for an image formation defect in any one defective recording element, the output of one or a plurality of recording elements which carry out recording of pixels in the vicinity of the defective recording element is corrected, but the range of recording elements which are the object of this output correction (the defective recording correction recording elements) desirably include two recording elements which carry out image formation at recording positions (pixels) that are adjacent on either side of the non-recording position of the defective recording element.

As an example of the configuration of a print head (recording head) used in an image forming apparatus, it is possible to use a full-line type head (page-wide head) having a nozzle row in which a plurality of ejection ports (nozzles) are arranged through a length of not less than the full width of the image formation medium, by joining together a plurality of head modules. A full line type head of this kind is normally arranged in a direction perpendicular to the relative feed direction of the recording medium (the medium conveyance direction), but a mode is also possible in which a head is arranged in an oblique direction forming a certain prescribed angle with respect to the direction perpendicular to the conveyance direction.
(Aspect 9)

Desirably, the plurality of recording elements are droplet ejection elements which eject droplets from nozzles and deposit the ejected droplets onto the recording medium so as to record dots.

One example of the recording head may employ an inkjet head. The defective recording elements in the inkjet head, in other words, the defective ejection nozzles, may have abnormal recording position error or be suffering ejection failure, or the like. The defective recording elements include at least one of elements having large recording position error and elements suffering ejection failure.
(Aspect 10)

Desirably, the image reading device is a line sensor in which a plurality of photoelectric transducer elements are arranged at the read pixel pitch WS in the first direction.

It is also possible to compose an apparatus using a line sensor having a lower resolution than the recording resolution of the recording head. The image forming apparatus in aspects 7 to 10 may also combine the characteristic features described in aspects 2 to 4.

(Aspect 11)

Another aspect of the invention is directed to an image forming method of forming an image on a recording medium by a recording head while causing relative movement between the recording medium and the recording head in which a plurality of recording elements are arranged, the image forming method comprising: a test pattern output control step of controlling a recording operation of the recording head in such a manner that a test pattern is formed on the recording medium by the recording head; and an image reading step of reading the test pattern recorded on the recording medium and generating a read image signal, wherein: the test pattern includes line-shaped patterns which are recorded by operating the recording elements corresponding to projected recording elements selected at an interval of a fixed detection pitch number PP, from among an alignment of projected recording elements obtained by projecting the plurality of recording elements of the recording head onto a straight line parallel to a first direction that is orthogonal to a direction of the relative movement; when an interval between the projected recording elements aligned in the first direction is represented by a recording pixel pitch WP, a pixel size in the first direction of read image data is represented by a read pixel pitch WS, and a group of a plurality of read pixels aligned continuously in the first direction which forms an analysis unit for analyzing the read image signal is represented by an analysis pitch number PS, then a period T determined by $T = WP \times PP \div |WS \times PS - WP \times PP|$ is three or greater in units of pixels of the read image signal; and a dividing step of dividing pixel series of the read image signal into sequences having different remainder values so as to generate image signals of the respective sequences, the remainder values being obtained respectively by dividing read pixel numbers by the analysis pitch number PS, the read pixel numbers being respectively assigned as consecutive integers, in alignment sequence, to pixels which are aligned in the first direction with respect to the acquired read image signal; a prediction signal generating step of calculating regular prediction signals which are predicted with respect to the respective sequences, according to the read image signal; a threshold value determination step of determining tone value differences corresponding to respective distances representing recording position errors from the prediction signals, and determining threshold values corresponding respectively to the recording position errors, from the tone value differences; a change signal calculation step of calculating a change signal indicating a difference between the prediction signal and the image signal of each of the sequences; an error distance calculation step of specifying the recording position errors of the plurality of recording elements in the recording head according to comparing the change signal with each of the threshold values; an image correction step of correcting the image data according to information about the recording position errors specified in the error distance calculation step; and a recording control step of implementing image recording by controlling a recording operation of the recording elements of the recording head in accordance with the image data which has been corrected in the image correction step.

In this aspect 11, it is also possible to include the respective characteristic features described in aspects 2 to 4 and aspects 8 to 10, as appropriate.

(Aspect 12)

Another aspect of the invention is directed to a computer-readable medium containing programming instructions that cause a computer processor to perform the read image signal acquisition device and the signal processing device having the dividing device, the prediction signal generation device, the threshold value determination device, the change signal calculation device and the error distance calculation device of the recording position error measurement apparatus defined above.

The respective devices in the recording position error measurement apparatus according to aspects 1 to 4 (the read image signal acquisition device, the signal processing device, the dividing device, the prediction signal generation device, the threshold value determination device, the change signal calculation device, and the error distance calculation device) can be achieved by means of a computer. A program for achieving a function of analyzing the read image by means of a computer can be applied to an operational program of a central processing apparatus (CPU) which is incorporated in an image forming apparatus, or the like, and can also be applied to a computer system, such as a personal computer. The analysis processing program of this kind can be recorded on a CD-ROM, a magnetic disk, or another information storage medium (non-transitory computer-readable media such as an external storage apparatus), and the program can be provided to a third party by means of this information recording medium, or a download service for the program can be provided via a communications circuit, such as the Internet, or the program can be provided as a service of an ASP (Application Service Provider).

What is claimed is:

1. A recording position error measurement apparatus, comprising:
    a read image signal acquisition device which acquires a read image signal of a test pattern recorded on a recording medium by a plurality of recording elements while causing relative movement between the recording medium and a recording head in which the plurality of recording elements are arranged; and
    a signal processing device which carries out processing for analyzing the read image signal so as to identify recording position errors of the plurality of recording elements, wherein:
    the test pattern includes line-shaped patterns which are recorded by operating the recording elements corresponding to projected recording elements selected at an interval of a fixed detection pitch number PP, from among an alignment of projected recording elements obtained by projecting the plurality of recording elements of the recording head onto a straight line parallel to a first direction that is orthogonal to a direction of the relative movement;
    when an interval between the projected recording elements aligned in the first direction is represented by a recording pixel pitch WP, a pixel size in the first direction of read image data acquired by the read image signal acquisition device is represented by a read pixel pitch WS, and a group of a plurality of read pixels aligned continuously in the first direction which forms an analysis unit for analyzing the read image signal is represented by an analysis pitch number PS, then a period T determined by $T = WP \times PP \div |WS \times PS - WP \times PP|$ is three or greater in units of pixels of the read image signal; and
    the signal processing device has:
    a dividing device which divides pixel series of the read image signal into sequences having different remainder values so as to generate image signals of the respective sequences, the remainder values being obtained respectively by dividing read pixel numbers by the analysis pitch number PS, the read pixel numbers being respectively assigned as consecutive integers, in alignment sequence, to pixels which are aligned in the first direction with respect to the acquired read image signal;
a prediction signal generation device which calculates regular prediction signals which are predicted with respect to the respective sequences, according to the read image signal;
a threshold value determination device which determines tone value differences corresponding to respective distances representing recording position errors from the prediction signals, and which determines threshold values corresponding respectively to the recording position errors, from the tone value differences;
a change signal calculation device which calculates a change signal indicating a difference between the prediction signal and the image signal of each of the sequences; and
an error distance calculation device which specifies the recording position errors of the plurality of recording elements in the recording head according to comparing the change signal with each of the threshold values.

2. The recording position error measurement apparatus as defined in claim 1, wherein the prediction signal generation device creates average profiles indicating average characteristics of the respective sequences, from the image signals which are divided into the respective sequences, and generates the prediction signals from the average profiles.

3. The recording position error measurement apparatus as defined in claim 1, wherein the threshold value determination device determines the threshold values by associating one period of the prediction signals with a profile corresponding to one line of the line-shaped patterns.

4. The recording position error measurement apparatus as defined in claim 1, wherein the read pixel pitch WS is larger than the recording pixel pitch WP.

5. A computer-readable medium containing programming instructions that cause a computer processor to perform the read image signal acquisition device and the signal processing device having the dividing device, the prediction signal generation device, the threshold value determination device, the change signal calculation device and the error distance calculation device of the recording position error measurement apparatus defined in claim 1.

6. A recording position error measurement method, comprising:
a read image signal acquisition step of acquiring a read image signal of a test pattern recorded on a recording medium by a plurality of recording elements while causing relative movement between the recording medium and a recording head in which the plurality of recording elements are arranged; and
a signal processing step of carrying out processing for analyzing the read image signal so as to identify recording position errors of the plurality of recording elements, wherein:
the test pattern includes line-shaped patterns which are recorded by operating the recording elements corresponding to projected recording elements selected at an interval of a fixed detection pitch number PP, from among an alignment of projected recording elements obtained by projecting the plurality of recording elements of the recording head onto a straight line parallel to a first direction that is orthogonal to a direction of the relative movement;
when an interval between the projected recording elements aligned in the first direction is represented by a recording pixel pitch WP, a pixel size in the first direction of read image data is represented by a read pixel pitch WS, and a group of a plurality of read pixels aligned continuously in the first direction which forms an analysis unit for analyzing the read image signal is represented by an analysis pitch number PS, then a period T determined by $T=WP \times PP \div |WS \times PS - WP \times PP|$ is three or greater in units of pixels of the read image signal; and the signal processing step includes:
a dividing step of dividing pixel series of the read image signal into sequences having different remainder values so as to generate image signals of the respective sequences, the remainder values being obtained respectively by dividing read pixel numbers by the analysis pitch number PS, the read pixel numbers being respectively assigned as consecutive integers, in alignment sequence, to pixels which are aligned in the first direction with respect to the acquired read image signal;
a prediction signal generating step of calculating regular prediction signals which are predicted with respect to the respective sequences, according to the read image signal;
a threshold value determination step of determining tone value differences corresponding to respective distances representing recording position errors from the prediction signals, and determining threshold values corresponding respectively to the recording position errors, from the tone value differences;
a change signal calculation step of calculating a change signal indicating a difference between the prediction signal and the image signal of each of the sequences; and
an error distance calculation step of specifying the recording position errors of the plurality of recording elements in the recording head according to comparing the change signal with each of the threshold values.

7. The recording position error measurement method as defined in claim 6, further comprising:
a test pattern forming step of recording the test pattern on the recording medium by the recording head having the plurality of recording elements; and
an image reading step of generating the read image signal by reading the test pattern recorded on the recording medium in the test pattern forming step, by an image reading device.

8. An image forming apparatus, comprising:
a recording head in which a plurality of recording elements are arranged;
a medium conveyance device which causes relative movement between a recording medium and the recording head;
a test pattern output control device which controls a recording operation of the recording head in such a manner that a test pattern is formed on the recording medium by the recording head;
an image reading device which reads the test pattern recorded on the recording medium and generates a read image signal, wherein:
the test pattern includes line-shaped patterns which are recorded by operating the recording elements corresponding to projected recording elements selected at an interval of a fixed detection pitch number PP, from among an alignment of projected recording elements obtained by projecting the plurality of recording elements of the recording head onto a straight line parallel to a first direction that is orthogonal to a direction of the relative movement;
when an interval between the projected recording elements aligned in the first direction is represented by a recording pixel pitch WP, a pixel size in the first direction of read image data is represented by a read pixel pitch WS, and a group of a plurality of read pixels aligned continuously in the first direction which forms an analysis unit for analyzing the read image signal is represented by an analysis pitch number PS, then a period T determined by T=WP×PP÷|WS×PS−WP×PP| is three or greater in units of pixels of the read image signal; and the image forming apparatus further comprises:

a dividing device which divides pixel series of the read image signal into sequences having different remainder values so as to generate image signals of the respective sequences, the remainder values being obtained respectively by dividing read pixel numbers by the analysis pitch number PS, the read pixel numbers being respectively assigned as consecutive integers, in alignment sequence, to pixels which are aligned in the first direction with respect to the acquired read image signal;

a prediction signal generation device which calculates regular prediction signals which are predicted with respect to the respective sequences, according to the read image signal;

a threshold value determination device which determines tone value differences corresponding to respective distances representing recording position errors from the prediction signals, and which determines threshold values corresponding respectively to the recording position errors, from the tone value differences;

a change signal calculation device which calculates a change signal indicating a difference between the prediction signal and the image signal of each of the sequences;

an error distance calculation device which specifies the recording position errors of the plurality of recording elements in the recording head according to comparing the change signal with each of the threshold values;

an image correction device which corrects the image data according to information about the recording position errors specified by the error distance calculation device; and a recording control device which implements image recording by controlling a recording operation of the recording elements of the recording head in accordance with the image data which has been corrected by the image correction device.

9. The image forming apparatus as defined in claim 8, further comprising:

a defective recording element judgement device which identifies a defective recording element from the plurality of recording elements in the recording head, according to the information about the recording position errors specified by the error distance calculation device; and a memory device which stores information about the defective recording element identified by the defective recording element judgement device, wherein:

the image correction device corrects the image data so as to record a desired image by halting a recording operation of the identified defective recording element and compensating for a recording omission of the defective recording element by the recording elements other than the defective recording element; and the recording control device implements the image recording by controlling the recording operation of the recording elements other than the defective recording element in accordance with the image data which has been corrected by the image correction device.

10. The image forming apparatus as defined in claim 8, wherein the plurality of recording elements are droplet ejection elements which eject droplets from nozzles and deposit the ejected droplets onto the recording medium so as to record dots.

11. The image forming apparatus as defined in claim 8, wherein the image reading device is a line sensor in which a plurality of photoelectric transducer elements are arranged at the read pixel pitch WS in the first direction.

12. An image forming method of forming an image on a recording medium by a recording head while causing relative movement between the recording medium and the recording head in which a plurality of recording elements are arranged, the image forming method comprising:

a test pattern output control step of controlling a recording operation of the recording head in such a manner that a test pattern is formed on the recording medium by the recording head; and an image reading step of reading the test pattern recorded on the recording medium and generating a read image signal, wherein:

the test pattern includes line-shaped patterns which are recorded by operating the recording elements corresponding to projected recording elements selected at an interval of a fixed detection pitch number PP, from among an alignment of projected recording elements obtained by projecting the plurality of recording elements of the recording head onto a straight line parallel to a first direction that is orthogonal to a direction of the relative movement;

when an interval between the projected recording elements aligned in the first direction is represented by a recording pixel pitch WP, a pixel size in the first direction of read image data is represented by a read pixel pitch WS, and a group of a plurality of read pixels aligned continuously in the first direction which forms an analysis unit for analyzing the read image signal is represented by an analysis pitch number PS, then a period T determined by T=WP×PP÷|WS×PS−WP×PP| is three or greater in units of pixels of the read image signal; and a dividing step of dividing pixel series of the read image signal into sequences having different remainder values so as to generate image signals of the respective sequences, the remainder values being obtained respectively by dividing read pixel numbers by the analysis pitch number PS, the read pixel numbers being respectively assigned as consecutive integers, in alignment sequence, to pixels which are aligned in the first direction with respect to the acquired read image signal;

a prediction signal generating step of calculating regular prediction signals which are predicted with respect to the respective sequences, according to the read image signal;

a threshold value determination step of determining tone value differences corresponding to respective distances representing recording position errors from the prediction signals, and determining threshold values corresponding respectively to the recording position errors, from the tone value differences;

a change signal calculation step of calculating a change signal indicating a difference between the prediction signal and the image signal of each of the sequences;

an error distance calculation step of specifying the recording position errors of the plurality of recording elements in the recording head according to comparing the change signal with each of the threshold values;

an image correction step of correcting the image data according to information about the recording position errors specified in the error distance calculation step; and a recording control step of implementing image recording by controlling a recording operation of the recording elements of the recording head in accordance with the image data which has been corrected in the image correction step.

* * * * *